US012175830B2

(12) United States Patent
Higgins et al.

(10) Patent No.: US 12,175,830 B2
(45) Date of Patent: Dec. 24, 2024

(54) DIGITAL SHOE FOR VIDEO DISPLAY PROGRAMMABLE PLAYING CARDS

(71) Applicant: IGT, Las Vegas, NV (US)

(72) Inventors: Kevin Higgins, Reno, NV (US); Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 57 days.

(21) Appl. No.: 17/864,053

(22) Filed: Jul. 13, 2022

(65) Prior Publication Data

US 2024/0021042 A1 Jan. 18, 2024

(51) Int. Cl.
*G07F 17/32* (2006.01)

(52) U.S. Cl.
CPC ...... *G07F 17/3211* (2013.01); *G07F 17/3293* (2013.01)

(58) Field of Classification Search
None
See application file for complete search history.

(56) References Cited

U.S. PATENT DOCUMENTS 6,890,260 B2 5/2005 Ollins
7,097,108 B2 8/2006 Zellner et al.
7,762,887 B1 7/2010 House et al.
8,419,535 B2 4/2013 Miller et al.
8,512,137 B2 8/2013 Hayes et al.
10,706,667 B1 7/2020 Shepherd et al.
10,765,929 B2 9/2020 Jones et al.
11,551,507 B2 * 1/2023 Danielson ........... G07F 17/3211
2004/0002387 A1 1/2004 Grady
2004/0248073 A1 12/2004 Pinkerman et al.
2006/0058082 A1 3/2006 Crawford et al.
2008/0234024 A1 9/2008 Connors et al.
2008/0303782 A1 12/2008 Grant et al.
2011/0065081 A1 3/2011 Wen
2013/0109455 A1 * 5/2013 Grauzer .............. G07F 17/3225 463/22
2013/0296008 A1 11/2013 Hardison
2016/0063797 A1 3/2016 Shepherd et al.

(Continued)

OTHER PUBLICATIONS

"E-paper to be enabled by flexible processor," Ziff Davis, LLC., Feb. 17, 2005, 8 pages [retrieved online from: www.geek.com/blurb/e-paper-to-be-enabled-by-flexible-processor-558200/].

(Continued)

*Primary Examiner* — Ronald Laneau
(74) *Attorney, Agent, or Firm* — Sheridan Ross P.C.

(57) ABSTRACT

The present disclosure relates generally to a gaming table system and method that identifies a shuffle event based on one or more of a position of a next eligible virtual card in a plurality of virtual playing cards, a position in the plurality of virtual cards of a shuffle card relative to the position of the next eligible virtual card, a counter value indicating a number of ineligible virtual cards, and a counter value indicating a number of remaining eligible virtual cards and in response to identifying a shuffle event, shuffles the plurality of virtual playing cards to form a shuffled plurality of virtual playing cards for assignment to a plurality of physical playing cards, each physical playing card comprising an on-board power source, microprocessor, memory, and digital display to receive and render a value of a corresponding assigned virtual playing card.

20 Claims, 25 Drawing Sheets

(56) References Cited

U.S. PATENT DOCUMENTS

| | | | | |
|---|---|---|---|---|
| 2017/0270964 | A1* | 9/2017 | Kelly | A63F 1/18 |
| 2019/0371110 | A1 | 12/2019 | Higgins et al. | |
| 2021/0319649 | A1* | 10/2021 | Danielson | G07F 17/3293 |
| 2022/0080293 | A1* | 3/2022 | Shigeta | G07F 17/3293 |
| 2023/0112066 | A1* | 4/2023 | Danielson | G07F 17/3211 463/11 |

OTHER PUBLICATIONS

AnandTech "A look at LG G Flex's Flexible OLED display," YouTube, Dec. 3, 2013, pp. [retrieved online from: www.youtube.com/watch?v=JmewQRNhILw].

Kevin Darrah, "E-Paper + ESP8266 Tutorial—Easy Text & Images," YouTube, Aug. 17, 2018, 0:45-1:10, pp. [retrieved online from: www.youtube.com/watch?v=0luqL-4UftA].

* cited by examiner

DIGITAL SHOE FOR VIDEO DISPLAY PROGRAMMABLE PLAYING CARDS

CROSS REFERENCE TO RELATED APPLICATION

Cross reference is made to U.S. patent application Ser. No. 17/220,063, filed Apr. 1, 2021, entitled "Video Display Programmable Playing Cards".

BACKGROUND

The present disclosure is directed generally toward gaming systems and devices and, in particular, card shoes and playing cards associated with gaming systems and devices.

A standard 52-card deck of French playing cards (54 counting wild cards) is the most common deck of playing cards. It includes thirteen ranks in each of the four French suits: clubs (♣), diamonds (♦), hearts (♥) and spades (♠), with reversible "court" or face cards, Each suit includes an ace, a king, queen and jack, each depicted with a symbol of its suit; and ranks two through ten, with each card depicting that many symbols (pips) of its suit. Anywhere from one to six jokers or wild cards are added to commercial decks.

While the most popular standard pattern of the French deck is sometimes referred to as "English" or "Anglo-American" pattern, other types of card decks are in use. For example, in Central Europe, German suited cards are widely used, whereas Italian suited cards are common in Italy and Spanish suited cards on the Iberian Peninsula. In addition, tarot cards are required for games such as French Tarot, which is widely played in France, and the Tarock family of games played in countries like Austria and Hungary. Unicode playing card decks have been introduced for many card games.

Card games using the standard 52-card deck are popular at casinos. Examples of casino card games include blackjack, 3- and 4-card poker, baccarat, pai gow poker, Caribbean stud poker, let it ride poker, Spanish 21, casino war, super fun 21, Vegas three card rummy, Texas holdem, Omaha, solitaire, and 7 card stud. While card games are typically played at casino table games using a physical deck of cards, online casinos use virtual playing cards rendered to the player on a display.

The use of physical cards in casinos typically require random shuffling of the cards, such as using a shuffling machine, and adequate precautions to be taken to detect instances of cheating by players, such as by marking or bending cards to perform card counting.

A "dealing shoe" or "dealer's shoe" is a gaming device, mainly used in casinos, to hold multiple decks of playing cards to address cheating. The shoe allows for more games to be played by reducing the time between shuffles and less chance of dealer cheating. In some games, such as blackjack (where card counting is a possibility), using multiple decks of cards can increase the house edge.

BRIEF SUMMARY

In certain embodiments, the present disclosure relates to a gaming system, comprising: a communication interface; a microprocessor coupled with the communication interface; and a computer-readable storage medium coupled with the microprocessor. The computer-readable storage medium stores data thereon that enables the microprocessor to: (a) identify a shuffle event based on one or more of a position of a next eligible virtual card in a plurality of virtual playing cards, a relative position in the plurality of virtual cards of a shuffle card to the position of the next eligible virtual card, a counter value indicating a number of ineligible virtual cards, and a counter value indicating a number of remaining eligible virtual cards; (b) in response to identifying a shuffle event, shuffle the plurality of virtual playing cards to form a shuffled plurality of virtual playing cards; (c) identify a value assignment event; and (d) in response to identifying the value assignment event, assign selected virtual playing cards of the shuffled plurality of virtual playing cards to a corresponding one of a plurality of physical playing cards, each physical playing card comprising an on-board power source, microprocessor, memory, and digital display to receive and render a value of a corresponding assigned virtual playing card.

In some embodiments, the present disclosure also relates to a method of playing a card game, comprising: (a) identifying a shuffle event based on one or more of a position of a next eligible virtual card in a plurality of virtual playing cards, a position in the plurality of virtual cards of a shuffle card relative to the position of the next eligible virtual card, a counter value indicating a number of ineligible virtual cards, and a counter value indicating a number of remaining eligible virtual cards; in response to identifying a shuffle event, (b) shuffling the plurality of virtual playing cards to form a shuffled plurality of virtual playing cards; and (c) assigning selected virtual playing cards of the shuffled plurality of virtual playing cards to a corresponding one of a plurality of physical playing cards, each physical playing card comprising an on-board power source, microprocessor, memory, and digital display to receive and render a value of a corresponding assigned virtual playing card.

In some embodiments, the present disclosure also relates to a card shoe comprising: a housing to hold a plurality of physical playing cards for dealing to players of a card game, the housing having an input to receive and an output to discharge the plurality of physical playing cards, each physical playing card of the plurality of physical playing cards comprising an on-board power source, microprocessor, memory, and digital display to receive and render a value of an assigned virtual playing card; a communication interface; a physical playing card sensor to detect that a selected physical playing card has been one or more of inserted into the input and removed from the output; a microprocessor coupled with the communication interface and the physical playing card sensor; and a computer-readable storage medium coupled with the microprocessor, the computer-readable storage medium comprising microprocessor-executable instructions that, when executed by the microprocessor, cause the microprocessor to: (a) receive input from the physical playing card sensor that the selected physical playing card has been one or more of inserted into the input and removed from the output; (b) in response to the input from the physical playing card sensor, assign a selected virtual playing card of a shuffled plurality of virtual playing cards to the selected physical playing card; and (c) update a data structure to associate the assigned selected virtual playing card with the selected physical playing card.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

An Electronic Gaming Machine (EGM) as used herein refers to any suitable electronic gaming device which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk.

An Electronic Gaming Table or Electronic Table Game (EGT) as used herein refers to a gaming device in the form of a table that enables a player to play a game (including but not limited to a game of chance, a game of skill, and/or a game of partial skill), such as roulette, poker, blackjack or Baccarat, to potentially win one or more awards. There can be multiple player seats in the electronic gaming table for tournament or side game play, and each player can operate or play the game in the electronic gaming table.

A "gaming system" as used herein refers to various configurations of: (a) one or more central servers, central controllers, or remote hosts; (b) one or more gaming devices such as those located on a casino floor; and/or (c) one or more personal gaming devices, such as desktop computers, laptop computers, tablet computers or computing devices, personal digital assistants, mobile phones, and other mobile computing devices.

Additional features and advantages are described herein and will be apparent from the following Description and the figures.

DETAILED DESCRIPTION

Figures 1A, 1B, 1C, 1D, 1E:
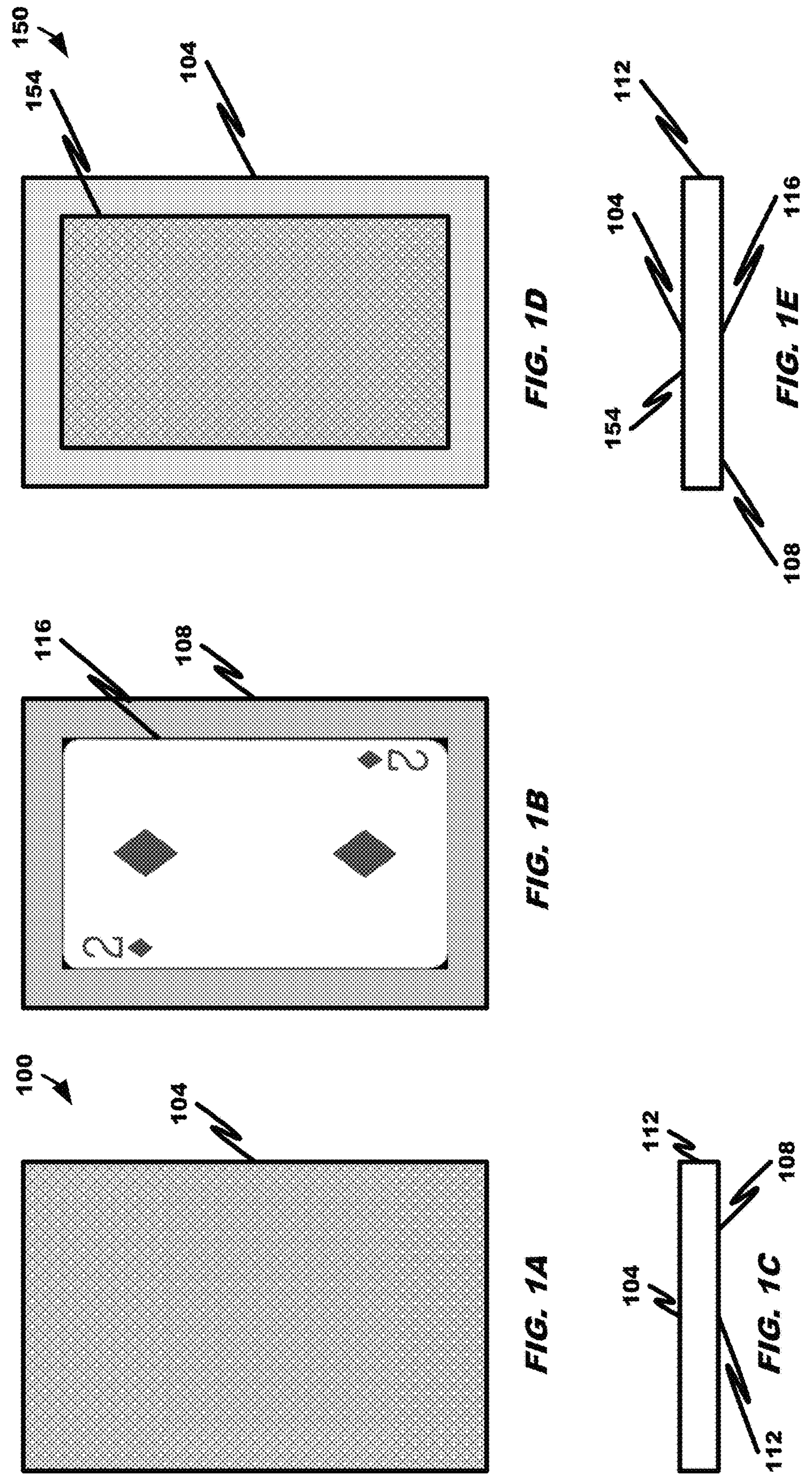
FIG. 1A illustrates a top view of a video programmable playing card ("VDPPC") in accordance with embodiments of the present disclosure.
FIG. 1B illustrates a bottom view of a VDPPC in accordance with embodiments of the present disclosure.
FIG. 1C illustrates a side view of a VDPPC in accordance with embodiments of the present disclosure.
FIG. 1D illustrates a top view of a VDPPC in accordance with embodiments of the present disclosure.
FIG. 1E illustrates a side view of a VDPPC in accordance with embodiments of the present disclosure.

The video display programmable playing card ("VDPPC") of the present disclosure can have the dimensions of a standard playing card and include one or more digital displays to render or provide selected content. By way of illustration, a standard playing card is about 2 to about 3 inches in width, about 3 to about 4 inches high, and about 0.0025 to about 0.025 inches in thickness. The selected content can be a playing card parameter, such as a type (e.g., suit) or value (rank) of a playing card, a casino logo or other customized casino content, an advertisement, or other selected content. VDPPCs can have the appearance of a playing card, have a substantially uniform size, shape, and pattern, be bendable and flexible in a player's fingers in a manner substantially similar to the bendability and flexibility of a standard playing card, be stackable as typical or standard playing cards to form a deck that can be shuffled manually or mechanically, and have a substantially uniform weight to allow them to be handled in a manner similar to standard playing cards.

Digital Shoes can interact with the VDPPCs in many ways.

For example, the digital shoe can receive, hold, and discharge VDPPCs in the same manner a conventional card shoe receives, holds, and discharges conventional playing cards.

The digital shoe can communicate with a remote game server or gaming device to automatically enroll VDPPCs, check out VDPPCs to players, monitor VDPPC usage during gameplay, and unenroll VDPPCs at the conclusion of the game. When a VDPPC is inserted into the digital shoe, the digital shoe can determine whether the VDPPC is currently enrolled with the digital shoe and, if not, automatically enroll the VDPPC. When a VDPPC is removed from the digital shoe, the digital shoe can determine an identity of a player to receive the VDPPC (e.g., via dealer input, player seating locations and order in which cards are being dispensed to each location, wireless location of each VDPPC mapped to player seating location, and the like) and automatically check out the VDPPC to the player. When a table game is complete, the dealer simply collects all the VDPPCs dealt during the previous game and works with a component of the system (such as a digital shoe) to re-start the game. At the conclusion of the card game, end of a dealer's shift, or in response to a dealer's command received through a digital shoe user interface, the digital shoe can automatically unenroll one or more VDPPCs.

The digital shoe can receive sets of playing card parameters from a virtual deck of cards (which typically corresponds to multiple card decks and has more virtual cards than VDPPCs in the digital shoe) and communicate (wirelessly or through other electronic means) each set of playing card parameters to a corresponding VDPPC. The gaming system managing the cards for the table and assigning a virtual card to a VDPPC can track N decks (where N is greater than 1) and assign playing card parameters (e.g., rank and suit values) to each VDPPC at the appropriate point in time. This ability can support scenarios where a number of VDPPCs required to play a game can be materially smaller than a number of digital "decks" of cards being used to run the table game to prevent or make card counting difficult. For example, a blackjack table may use 20 decks of shuffled cards to prevent card counting, but only have 52 VDPPCs assigned to the table, and the system assigns the appropriate card rank and suit to a given VDPPC when required (a card assignment or check out event).

Through the ability to provide players with assigned playing card parameters using modern display technologies, VDPPCs can avoid the complexity associated with the secure and random shuffling of standard playing cards, avoid fraud caused by players marking cards and performing card counting, increase player privacy and security by providing players with greater control over potential viewing of playing card parameters by other players during a card game, and provide increased player satisfaction by providing a controllable digital display for on-demand content. VDPPCs can use random number generation not only to generate playing card parameters randomly, thereby enabling automatic and secure shuffling, but also to disassociate a physical card with a specific card issued to a player during a game, thereby making card counting difficult, if not impossible. VDPPCs can beneficially allow for further enhancements to the play of card games, such as allowing in-game bonuses, dynamic wild cards, and custom card branding of a card or cards. It should be appreciated that such bonuses associated with the VDPPC may include a non-monetary award (such as an award of a bonus set of playing card parameter(s)) and/or a monetary award. VDPPCs can be used as a replacement to physical cards, or in conjunction with physical cards at a casino table.

The use of virtual decks can eliminate the need for manual or card shuffling by a dealer, which can slow down the rate of play at a table and has been shown to occasionally favor certain players. It can also eliminate the need for an automated electro-mechanical card shuffler, such as the One2six™ by Scientific Games Corporation or the Shufflestar by Sci Entertainment Group plc, which can be expensive. The shuffling of multiple virtual deck of cards, using random or pseudorandom number generator(s), can make card counting and marking difficult, if not impossible, make it unlikely that the dealer could "game" a game by secretly dealing "bottom of the deck" cards to his or her friends at the table, and obviate the need for a dealer to perform the shuffle, which could be a flawed shuffle, and the step of requiring a dealer to perform a shuffle slowed down the rate of play on a busy table.

A number of examples will demonstrate other benefits associated with VDPPCs. In the examples, the dealer has a collection of VDPPCs appropriate for a given table game, typically a collection of 52 VDPPCs to represent a typical deck, though the count may not be limited to 52 cards. The VDPPCs may be loaded into a stack for consumption by the dealer or loaded into a digital card shoe device to hold the VDPPCs, or a device that looks like a traditional card shuffler.

With the introduction of VDPPCs, casinos are no longer limited to leveraging the cards in a traditional deck of cards. Instead, the contents of cards can change dynamically based upon many different triggers. For example, players could be dealt a "bonus card". In an embodiment, the "bonus card" could act as a "wild card" to help the player get a better hand. Alternatively or additionally, the player could win a bonus (triggered based upon time, win/loss/or amount bet thresholds). Alternatively or additionally, the bonus could negatively change a player's hand to turn it into a loser. Players may be required to make it to a certain level or point in the hand in order for their bonus to be revealed, such as making it through the last betting round.

In another example, a dealer, in a blackjack game, has a collection of VDPPCs held in a digital shoe or stack and dealt to players and the dealer, as needed, during the game. When the dealer deals a card to a player, the digital shoe may assign a value to the card (which can occur wirelessly, or through other electronic means) from the digital collection of decks managed by the shoe or table system for that table. For example, the digital shoe may manage 20 shuffled decks with a random or fixed re-shuffling point towards the last 50% or 25% of the cards. When a dealer removes a VDPPC from the digital shoe, then a card is removed from the digital collection of 20 shuffled decks managed by the digital shoe (or a component in communications with the digital shoe) and wirelessly or electronically transmitted to the VDPPC being removed from the shoe. In another embodiment, the value of the card could be randomly assigned when the dealer loads the VDPPCs into the digital shoe and no card assignment occurs as the dealer deals cards throughout the game (load triggered assignment of card values by the digital card shoe instead of deal triggered card value assignment by the digital shoe). For example, the dealer may collect all of the cards at the start of a shift, or at the end of a game, place the cards in a shoe or stack, and touch a button on the digital card shoe to trigger a digital shuffle and to assign a value to each VDPPC, and then the dealer would deal the VDPPCs as needed to players (and the dealer or community cards) as needed during the course of the game. Alternatively, the digital assignment of card value could occur when the dealer collects the VDPPCs from the previous game and inserts them or places them into or on the digital shoe. In another embodiment, the digital assignment of value could occur when the digital shoe or stack the VDPPCs are placed into hits some high watermark, such as 52 cards being inserted or stacked.

The gaming system commonly has two primary events: a digital deck shuffling event, and a VDPPC value assignment event.

In some embodiments, a digital deck shuffling event is what triggers the gaming table system or digital shoe to shuffle the pre-configured number of decks managed for the table. The number of decks to shuffle can be fixed (e.g., 4 decks, 8 decks, or 12 decks, etc.), or the number of decks to shuffle and be eligible for use can be randomly selected to make card counting more difficult. The number of decks to shuffle may also be based upon the configured game being played at the table. A digital deck shuffling event can be triggered by any gaming event, such as the dealer starting his or her shift, by hitting a user interface button on a touch-screen, or a physical shuffling button at the table. A digital deck shuffling event can be triggered by the dealer inserting VDPPCs into a device, such as a digital shoe, or placing cards in a specific location or on top of a physical device at the table. A digital deck shuffling event can also be triggered when the digital collection of shuffled decks hits some point in the deck that triggers a re-shuffle, such as a re-shuffle trigger somewhere in the deck selected to occur at a fixed place in the shuffled deck, or at a randomly selected location, such as somewhere between the middle of the shuffled decks and the end of the shuffled decks. A digital deck shuffling event can also be triggered when a game starts and the anticipated number of cards required for the game are not available in the collection of shuffled digital decks maintained by the system or the digital shoe.

In some embodiments, a VDPPC value assignment event is what assigns a card value to a VDPPC. While the VDPPC value assignment event can be any suitable gaming event, the simplest VDPPC value assignment events can occur when a VDPPC is dealt, although other options are possible, such as when a VDPPC is collected by the dealer, then stacked, used or touched by the player, or inserted into a digital shoe. In another embodiment, a value assignment event can occur when a dealer places the card in a certain location of the table, or within proximity of a wireless device, or within the energy field of another device.

In another example, a dealer, in a blackjack game, has a collection of VDPPCs held in a digital shoe or stack and dealt to players and the dealer, as needed, during the game. When the dealer deals a card to a player, the digital shoe may assign a value to the card (which can occur wirelessly, or through other electronic means) from the digital collection of decks managed by the shoe or table system for that table. For example, the digital shoe may manage 20 shuffled decks with a random or fixed re-shuffling point towards the last 50% or 25% of the cards. When a dealer removes a VDPPC from the digital shoe, then a card is removed from the digital collection of 20 shuffled decks managed by the digital shoe (or a component in communications with the digital shoe) and wirelessly or electronically transmitted to the VDPPC being removed from the shoe.

In another embodiment, the value of the card could be randomly assigned when the dealer loads the VDPPCs into the digital shoe and no card assignment occurs as the dealer deals cards throughout the game (load triggered assignment of card values by the digital card shoe instead of deal triggered card value assignment by the digital shoe). For example, the dealer may collect all of the cards at the start of a shift, or at the end of a game, place the cards in a shoe or stack, and touch a button on the digital card shoe to trigger a digital shuffle and to assign a value to each VDPPC, and then the dealer would deal the VDPPCs as needed to players (and the dealer or community cards) as needed during the course of the game. Alternatively, the digital assignment of card value could occur when the dealer collects the VDPPCs from the previous game and inserts them or places them into or on the digital shoe. In another embodiment, the digital assignment of value could occur when the digital shoe or stack the VDPPCs are placed into hits some high watermark, such as 52 cards being inserted or stacked.

In another embodiment, the value of the card is assigned to a VDPPC when the card is touched, activated or otherwise assigned to player (rather than when the dealer removes the card from the shoe). When a digital card is used by a player, the correct value of the card is shown to the player. For example, no matter which physical card is given to player 3, the correct value of the card for player 3 is shown on the card. For example, if the dealer deals in the wrong order, players exchange physical cards, etc. the player will still have the correct digital card's value. In one embodiment, cameras detect which players are using which cards. In one embodiment, the card position is detected by a sensor (such as NFC or RFID) on the table for each player seat location. In one embodiment, the player is identified by bio metrics such as fingerprint or facial recognition. In some embodiments the card might show information when handled by the wrong player. For example, if player 3 is dealt an ace of spades and hands the digital card to player 4, the card might show "Please return this card to player 3". Once the card is handed back to player 3, it returns to showing Ace of Spades. In all these embodiments, the dealer is simply a show person. A computer system has picked the card outcomes/values and no matter how the physical cards are moved around, the correct card values will be shown to each player. These embodiments can prevent cheating and also serve a purpose in the event of a video card malfunction, such as a loss of battery power. In the event of a failure, giving a player any physical video card would yield the correct display of the card value.

A gaming table can leverage a combination of physical cards and VDPPCs to increase levels of player excitement. For example, a player could be dealt one or more physical playing cards plus one or more VDPPCs where the VDPPCs are assigned playing card parameters. To avoid duplication and player cheating, the playing card parameters of physical playing cards and VDPPCs are tracked. Stated differently, a virtual deck can be maintained in memory with the set of possible playing card parameters with each subset of playing card parameters associated with a potential card having a queue or deck position relative to other cards, a status indicator indicating whether or not the card has been dealt to a player with an identity of the player or player seating position, and a card source indicator indicating whether the card was dealt as a physical card from the physical deck or as a displayed image on a VDPPC.

Near Field Communication ("NFC") or other wireless technologies and protocols, such as Bluetooth Low Energy (BLE), can be used to send and receive data between a control unit (or antenna connected to a table-level control unit) to change the state on the VDPPCs for the various use cases above, such as: to display the card type and/or value on the face of the card, to present advertisement or one or more custom graphics on the back of the card, to present an advertisement on either the face or back of a card, to present bonus messaging on the face or the back of a card, or to enhance one or more aspects of a traditional card game with one or more VDPPCs.

The use of VDPPCs in computer-enabled gaming can address a variety of technical problems, including how to attract the attention of a player and have that player choose to interact with a gaming system, how to provide an improved gaming experience such as by providing improved graphics for playing card parameters, and enhanced entertainment opportunities, and/or how to monitor cheating by players. VDPPCs can not only provide an enhanced card playing modality to increase player excitement and casino revenue but also strengthen security measures against cheating by players. By using a random number generator, computer monitoring, and VDPPC display state changes, known cheating techniques, such as colluding with the dealer, looking at the dealer's hand movements, replacing cards with better ones, card marking, card swapping between players (as each VDPPC is associated with a specific player), and edge sorting, can be detected and/or prevented.

Referring to FIGS. 1A-C, a VDPPC 100 is illustrated in accordance with an embodiment. The VDPPC 100 comprises opposing first and second planar surfaces 104 and 108 and a circumferential edge 112. While the first surface 104 comprises a standard decorative pattern visible to other players (as in the case of a standard physical playing card), the second surface 108 comprises a digital display 116 for displaying selected content. The selected content can be changed dynamically such that the digital display renders a first selected content at a first time and a different second selected content at a second time.

Referring to FIGS. 1D-E, a VDPPC 150 is illustrated in accordance with a different embodiment. While the VDPPC 100 comprises a digital display 116 only on the second surface 108, the VDPPC 150 comprises a first digital display 154 on the first planar surface 104 and a separate second digital display 116 on the second planar surface 108. When VDPPC 150 is viewed by a player associated with the VDPPC, the first planar surface 104 faces away from the associated player and is viewable by other players and the second planar surface 108 is viewable only by the associated player. While the second digital display 116 normally depicts one or more playing card parameters, the first digital display 154 depicts selected content that is unrelated to the one or more playing card parameters and is therefore the first and second digital displays 154 and 116 commonly depict different content. The selected content depicted by the first digital display 154 can include, for example, selected content associated with the associated player, and the selected content can be unrelated to the selected content depicted by the second digital display 116.

The selected content depicted by the first or second digital displays 154 and 116 can be a color or set of colors (e.g., blue, yellow, pink, red, purple, etc.), video (such as an advertisement or promotions of the casino, a video of the player or of a gaming event, an animation, a set of symbols, and the like), a digitally represented image (such as an assigned playing card parameter (e.g., type or rank of card parameter such as suit or rank assigned to the VDPPC)), an advertisement, content associated with the associated player (e.g., picture or identification of or other content selected by the player), logo or other customized content of the casino, gaming event information (such as a game status or outcome, wager, content associated with the card game, and the like), a symbol, and other content selected by the player, dealer, gaming system, or combination thereof.

In other embodiments, the VDPPC can be configured to include only the first digital display 154 and not the second digital display 116.

The displays can be any type of digital display, including a cathode ray tube, liquid crystal display, light-emitting diode (e.g., organic light-emitting diode or active-matrix organic light-emitting diode) display ("LED"), electronic paper or electronic ink ("E Ink") (which beneficially has a static or low frame rate image that only requires power or data to change state), electroluminescent display, plasma display, quantum dot display, and a fixed state red, green, blue ("RGB") LED display. It can be a segmented or unsegmented. In some embodiments, ultra-thin or paper-thin E-Ink or OLED display technologies are used as one or more of the digital displays. In some embodiments, fixed paper-thin LEDs/OLEDs (e.g., LCD technology that requires a constant rate of power to show content) are used as one or more of the digital displays.

Figure 2:
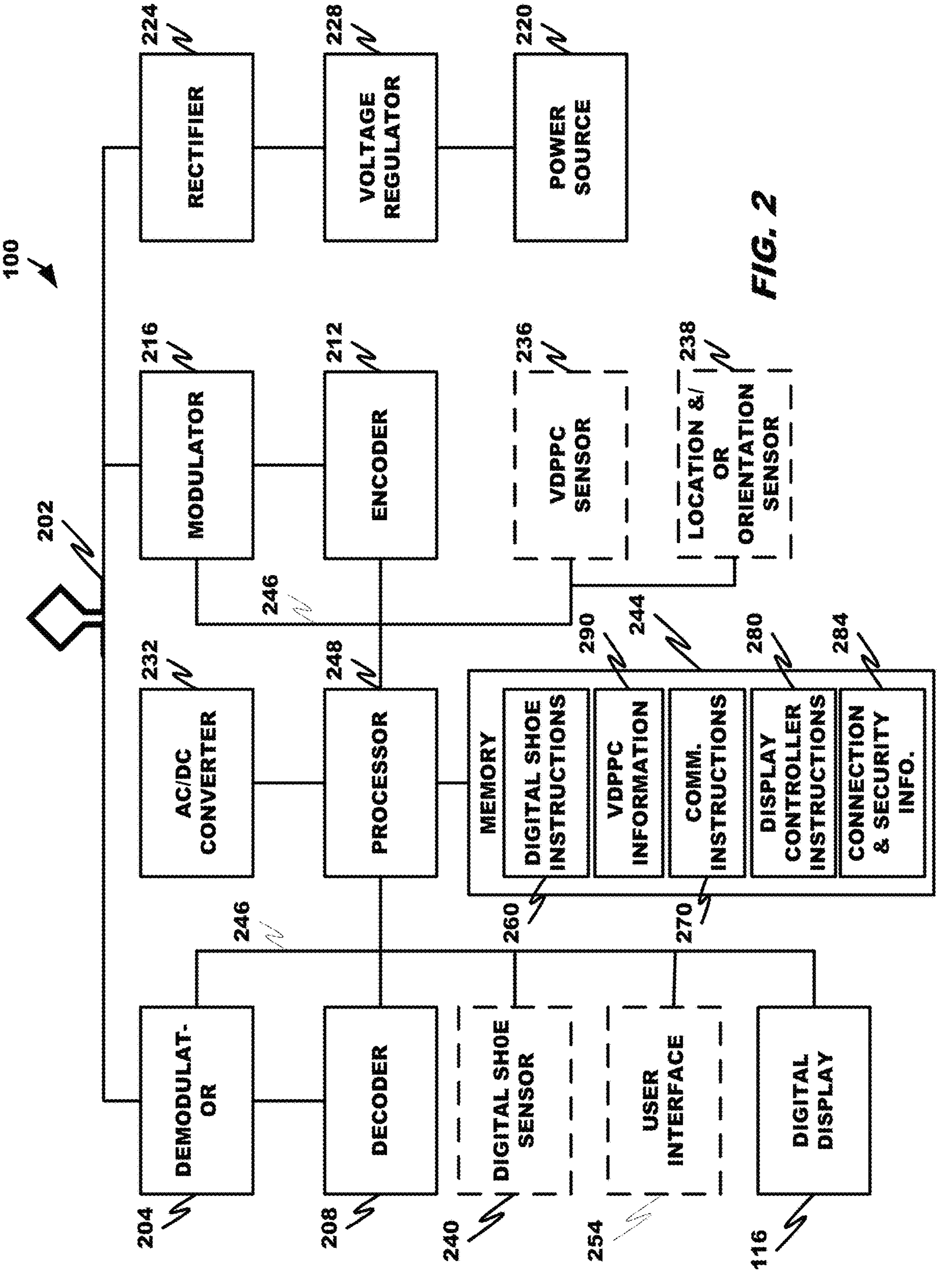
FIG. 2 illustrates components of a VDPPC in accordance with embodiments of the present disclosure.

Referring to FIG. 2, the functional components of a typical VDPPC 100 or 150 are illustrated in accordance with an embodiment. The VDPPC 100 or 150 comprises an antenna 202 (such as an RF antenna, WiFi antenna and driver circuit, Bluetooth antenna and driver circuit, or a cellular communication antenna and driver circuit) to send and receive encoded wireless signals, a demodulator 204 to demodulate received wireless signals and decoder 208 to decode the demodulated signal and perform the necessary transformations to determine the data in the signal, an encoder 212 to transform and encode data to be emitted by the antenna 202 and a modulator 216 to modulate encoded data for transmission, a power source 220, a rectifier 224 to convert received electromagnetic (charging) signals into electrical energy, such as Alternating Current ("AC") or Direct Current ("DC") power, a voltage regulator 228 that, due to the large variation in rectified voltage, automatically maintains a constant voltage level, an AC-DC converter 232 to convert an AC electrical energy input to a DC electrical energy output (or vice versa), the digital display 116, digital shoe sensor 240 to sense when the VDPPC is inserted into the digital shoe, VDPPC sensor 236 to sense when the VDPPC is in spatial proximity to another VDPPC (such as when in a stack or positioned within the digital shoe) an (optional) user interface 254, location and/or orientation sensor 238, and a memory 244, all coupled by a bus 246 to a (micro)processor 248.

In some embodiments, the various VDPPC components are configured as thinner than paper non-silica embedded electronics and processors to be used in combination with NFC technology. This VDPPC configuration can apply power to the various VDPPC components and charge them during a game, thereby overcoming the challenge of powering the digital display(s) and other electronic components in each VDPPC.

The power supply 220 may correspond to an internal power supply that provides AC and/or DC power to components of the VDPPC 100 or 150. In some embodiments, the power source 220 may correspond to one or multiple batteries or capacitors or other electromagnetic energy storage devices. Alternatively or additionally, the power source 220 may include a power adapter or wireless charger that converts AC power into DC power for direct application to components of the VDPPC 100 or 150, for charging a battery, for charging a capacitor, or a combination thereof.

The power supply 220 can be wirelessly rechargeable. As will be appreciated, the electromagnetic (charging) signals can be any frequency, such as radio frequency, and includes inductive charging, which is a type of wireless or cordless charging that uses an electromagnetic field to transfer energy between two objects using electromagnetic induction. In some embodiments, NFC near field power and communications and lower power processor and I/O interface can be employed to reduce VDPPC power requirements and increase power supply 220 life. Additionally or alternatively, power source life can be extended by deactivating the digital display when not being viewed, such as deactivating the second digital display when the VDPPC is face down on the table, deactivating the first digital display when the VDPPC is in covered by another VDPPC in a VDPPC stack and the like. Additionally or alternatively, power source life can be extended by deactivating the first or second digital display after a certain time interval has elapsed since the display was activated to render selected content. Additionally or alternatively, player or dealer gaze detection by the gaming system may be used to deactivate the first or second digital display when one or more players or the dealer in the card game are not gazing at the digital display. Additionally or alternatively, the power source metrics can be used to trigger generation of a warning by a digital display or to a gaming device of a player that a selected VDPPC has a low charge and requires charging. The trigger can be a detection that the stored energy level of a battery in the power source has fallen below a selected threshold. Additionally or alternatively, the battery metrics can be used to control selected content display or in the selection of content to be displayed by the VDPPC. For instance, advertisements or certain types of sensory feedback may not be provided when the charge level of the battery falls below a selected threshold.

In some embodiments, the brightness level of the first or second digital display can be auto-adjusted when the charge level of the battery falls below a selected threshold. By way of illustration, when the charge level falls below the selected threshold, the brightness of the first and/or second digital display can automatically be decreased from a higher level to a lower level and, conversely when the charge level is above the selected threshold, the brightness of the associated first or second digital display, respectively, can be automatically increased to a higher level or maintained at an existing higher level.

In some embodiments, the brightness level of the first or second digital display can be auto-adjusted based upon a level of light detected for the VDPPC surface comprising the associated one of the first or second digital display. By way of illustration, a light sensor located on or in proximity to the first VDPPC surface can sense a first level of light incident on the first surface at a first time and a second level of light incident on the first surface at a second time. Likewise, a light sensor located on or in proximity to the second VDPPC surface can sense a first level of light incident on the second surface at a first time and a second level of light incident on the second surface at a second time. When either the first or second level of light is less than a selected threshold, the brightness of the associated first or second digital display, respectively, can be automatically decreased from a higher level to a lower level and, conversely when either the first or second level of light is more than a selected threshold, the brightness of the associated first or second digital display, respectively, can be automatically increased to a higher level or maintained at an existing higher level.

Additional charging embodiments are also possible. While wireless charging may be more convenient for the dealer and players, wired VDPPC charging modes may also be used. In this embodiment, a wired charging port, or set of ports, may be placed at each seat in the table or within the digital shoe. In some embodiments, the wired charging port acts also as a communications port to exchange data (e.g., session keys, assigned playing card parameter values, assigned player information, and/or assigned gaming table information) with the VDPPC. The charging port could accommodate one or more VDPPCs, including dedicated VDPPCs, or the mobile devices of players that run an application which can hold VDPPCs.

The optional user interface 254 may include a combination of user input devices and user output devices. For instance, the user interface 254 may be implemented as one or more buttons located on a surface of the VDPPC 100 or 150, as a touch sensitive display 116, or as any other device that is capable of enabling tactile player interaction with the VDPPC 100 or 150.

While some display technologies, such as LCD display technology, may require the VDPPC to have a power source, other display technologies may only require the VDPPC to have power when the state of the display on the VDPPC is changed, such as E-Ink technology. In the case of E-Ink technology, the VDPPC could only be powered when it is inserted into a digital shoe or other designated area and when a VDPPC value assignment event occurs.

The VDPPC sensor 236 can include any device for detecting and interacting with a VDPPC by a suitable wireless or wired communication protocol. The device can be a device for determining signal strength of one or more wireless signals emitted by another VDPPC (e.g., Received Signal Strength Indicator or RSSI or dBm or, in the case of NFC, detecting an NFC reader field and operating reader receiver circuitry at the NFC-enabled device so as to at least determine the strength of a signal received from the reader field, and the like).

The digital shoe sensor 240 can be any device that senses when the VDPPC is positioned in the digital shoe. The sensor 240, like the VDPPC sensor 236, can include any device for determining signal strength of one or more wireless signals emitted by the digital shoe. The sensor 240 can include one or more ports that physically engage one or more ports when positioned in the digital shoe. In some embodiments, the digital shoe emits both internal and external wireless signals, with the internal signals comprising different content than external wireless signals and having shorter transmission ranges. The differing signals and signal strengths can inform the VDPPC whether it is external or internal to the digital shoe.

The location and/or orientation sensor 238 can be any device that can sense a spatial location and/or orientation of the VDPPC. In one embodiment, the sensor 238 and/or context collect a current spatial position or location of the VDPPC 100 or 150 to enable the VDPPC to compare a current spatial position or location of the digital shoe and determine whether the VDPPC is currently positioned within or outside of the shoe. The position can be relative to a coordinate system or selected object or location. By way of illustration, the sensor 238 can be a satellite positioning system (such as a Global Positioning system), a magnetic positioning device, an inertial measurement device, a Wi-Fi based positioning system (which measures the intensity of received wireless signals (or received signal strength)) and fingerprinting location system (such as the use of SSID and MAC address of a nearby access point), Bluetooth location device, RFID tag, or other location device. Alternatively or additionally, VDPPC location can be determined using triangulation techniques.

In another embodiment, the location and/or orientation sensor 238 collects displacement and/or orientation (relative to a coordinate system or selected plane) information associated with the VDPPC or a surface thereof. The displacement information, for instance, can be a fact or instance of spatial displacement of the VDPPC, a rate of displacement of the VDPPC, a distance of displacement of the VDPPC, and a direction of displacement of the VDPPC. The orientation information, for instance, can be an angle between a surface of the VDPPC and a vertical or horizontal axis or plane. Orientation information can enable the VDPPC to determine whether it is positioned in the digital shoe, which typically holds cards such that an angle between the cards and a vertical or horizontal reference plane lies within a specified range of angles. The sensor 238 can be, for instance, a motion sensor, such as a gyro sensor, accelerometer, magnetometer, or other motion detecting devices.

The memory 244 may include one or multiple computer memory devices that are volatile or non-volatile. The memory 244 may store VDPPC information 290.

The associated VDPPC information 290 can be any information relating to the VDPPC 100 or 150 or an operation thereof. Examples include a unique VDPPC identifier, session connection and security information, VDPPC state (including what selected content is currently being displayed by each digital display), object ID information, and/or VDPPC software and hardware requirements and configuration specifications. The VDPPC unique identifier can be any unique or substantially unique identifier or image associated with the VDPPC 100 or 150, such as a digital signature data structure (such as an RFID, a QR code, a barcode, or the like) or an image based on a software and/or hardware configuration of the VDPPC 100 or 150 or a variable computed by selected software executed by the VDPPC (such as hash valuer calculated by a secure hash algorithm). The VDPPC information 290 can further include information regarding the player currently assigned to the VDPPC 100 or 150 (e.g., player identification (such as a customer or customer account identifier maintained by the casino)), the gaming device or table to which the VDPPC is currently assigned (e.g., a gaming table object such as a dealer identity, table identity, seating position identity, and the like), and a current spatial location of the VDPPC 100 or 150.

Examples of connection and security information 284 include a communication address (such as a universally or locally administered address) associated with the VDPPC itself, a mobile device of the player, or another gaming system component (such as an electronic gaming table or gaming server), and secure session information (e.g., one or more symmetric or asymmetric multi- or single-use, private or public cryptographic keys, such as a session key, content encryption key, traffic encryption key, multicast key, key encryption key, key wrapping key, etc.) relating to a communication session with another gaming system component (such as an electronic gaming table or gaming server or player mobile device).

The memory can include any other data depending on the application, such as game credits and customer account information.

The memory 244 can further include a variety of instruction sets. An example of an instruction set that may be stored in the memory 244 includes digital shoe instructions 260 that, when executed by the processor 248, enable the VDPPC to interact with the digital shoe to perform various gaming-related functions (e.g., enrollment, unenrollment, check out, receiving and setting playing card parameter values in memory 244, and the like); display controller instructions 280 that, when executed by the processor 248, control display of the selected content by the digital display 116; and communication instructions 270 that, when executed by the processor 248, may enable the VDPPC 100 or 150 to communicate with another gaming system component or a player's mobile device or multiple mobile devices.

Although not shown, the VDPPC can also include a stored charge sensor to collect information regarding a current power level or state-of-charge or depth-of-charge of the power source 220. The stored charge sensor can use, for instance, a fuel gauge circuit and algorithm (such as a Columb counter), chemical method, voltage method, current integration method, combined approach, Kalman filtering, pressure method, or other device or method for determining or estimating the state-of-charge or depth-of-charge of the power source 220.

The display controller instructions 280 may include drivers for the digital display 116. As will be appreciated, a driver provides a software interface to hardware devices, enabling operating systems and other computer programs to access hardware functions without needing to know precise details about the hardware being used. A driver communicates with the device through a computer bus or communications subsystem to which the hardware connects. When a calling program invokes a routine in the driver, the driver issues commands to the device. Once the device sends data back to the driver, the driver may invoke routines in the original calling program. Drivers usually provide the interrupt handling required for any necessary asynchronous time-dependent hardware interface.

The VDPPC communication instruction set 270 may include instructions that enable the VDPPC 100 or 150 to pair with a mobile device of a player or another gaming system component (as the case may be) and establish a communication channel with the mobile device or gaming system component via the pairing. As an example, the VDPPC communication instruction set 270 may include instructions that enable NFC, Bluetooth®, WiFi, or other types of communication protocols. It should be appreciated that the VDPPC instruction set 270 may also be updated to reflect when the VDPPC 100 or 150 is paired with the gaming device 312 or a mobile device (as the case may be) and such pairing information may include addressing information for the VDPPC 100 or 150 and/or identification information associated with the player of the VDPPC 100 or 150. Alternatively or additionally, the VDPPC communication instruction set 270 may enable the VDPPC 100 or 150 to identify a player assigned to the VDPPC 100 or 150, identify a loyalty account associated with the player assigned to the VDPPC 100 or 150, exchange information (e.g., send or receive) with a loyalty application operating on the VDPPC 100 or 150, or combinations thereof. In some embodiments, the VDPPC communication instruction set 270 may be configured to operate or drive a network interface to facilitate direct or indirect communications with the VDPPC 100 or 150 or another gaming system component or mobile device (as the case may be). Alternatively or additionally, the VDPPC communication instruction set 270 may be configured to periodically send VDPPC information-containing status signals to the gaming server or digital shoe to synchronize the VDPPC operations, such as selected content currently being displayed by each digital display, with the VDPPC operations maintained in memory by the gaming server.

The VDPPC 100 or 150 commonly interacts with a gaming system comprising multiple gaming system components. In various embodiments, the gaming system of the present disclosure includes: (a) one or more gaming devices in combination with one or more central servers, central controllers, or remote hosts; (b) one or more personal gaming devices in combination with one or more central servers, central controllers, or remote hosts; (c) one or more personal gaming devices in combination with one or more gaming devices; (d) one or more personal gaming devices, one or more gaming devices, and one or more central servers, central controllers, or remote hosts in combination with one another; (e) a single gaming device; (f) a plurality of gaming devices in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "EGT" as used herein represents one EGT or a plurality of EGTs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts. A "gaming device" as used herein may be understood to include an EGM, multiple EGMs, an EGT, multiple EGTs, a personal gaming device, multiple personal gaming devices, a mobile device, multiple mobile devices, or combinations thereof.

As noted above, in various embodiments, the gaming system includes a gaming device in combination with a central server, central controller, or remote host. In such embodiments, the EGM or EGT (or gaming device) is configured to communicate with the central server, central controller, or remote host through a data network or remote communication link. In certain such embodiments, the EGM or EGT (or gaming device) is configured to communicate with another EGM or EGT (or gaming device) through the same data network or remote communication link or through a different data network or remote communication link. For example, the gaming system includes a plurality of gaming devices that are each configured to communicate with a central server, central controller, or remote host through a data network.

In certain embodiments in which the gaming system includes a gaming device in combination with a central server, central controller, or remote host, the central server, central controller, or remote host is any suitable computing device (such as a server) that includes at least one processor and at least one memory device or data storage device. As further described herein, the EGM or EGT (or gaming device) includes at least one EGM or EGT (or gaming device) processor configured to transmit and receive data or signals representing events, messages, commands, or any other suitable information between the EGM or EGT (or gaming device) and the central server, central controller, or remote host. The at least one processor of that EGM or EGT (or gaming device) is configured to execute the events, messages, or commands represented by such data or signals in conjunction with the operation of the EGM or EGT (or gaming device). Moreover, the at least one processor of the central server, central controller, or remote host is configured to transmit and receive data or signals representing events, messages, commands, or any other suitable information between the central server, central controller, or remote host and the EGM or EGT (or gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM or EGT (or gaming device). Further, one, more than one, or each of the functions of the at least one processor of the EGM or EGT (or gaming device) may be performed by the at least one processor of the central server, central controller, or remote host.

In certain such embodiments, computerized instructions for controlling any games displayed by the EGM or EGT (or gaming device) are executed by the central server, central controller, or remote host. In such "thin client" embodiments, the central server, central controller, or remote host remotely controls any games (or other suitable interfaces) displayed by the EGM or EGT (or gaming device), and the EGM or EGT (or gaming device) is utilized to display such games (or suitable interfaces) and to receive one or more inputs or commands. In other such embodiments, computerized instructions for controlling any games displayed by the EGM or EGT (or gaming device) are communicated from the central server, central controller, or remote host to the EGM or EGT (or gaming device) and are stored in at least one memory device of the EGM or EGT (or gaming device). In such "thick client" embodiments, the at least one processor of the EGM or EGT (or gaming device) executes the computerized instructions to control any games (or other suitable interfaces) displayed by the EGM or EGT (or gaming device).

In various embodiments in which the gaming system includes a plurality of EGMs or EGTs (or gaming devices), one or more of the EGMs or EGTs (or gaming devices) are thin client EGMs or EGTs (or gaming devices) and one or more of the EGMs or EGTs (or gaming devices) are thick client EGMs or EGTs (or gaming devices). In other embodiments in which the gaming system includes one or more EGMs or EGTs (or gaming devices), certain functions of one or more of the EGMs or EGTs (or gaming devices) are implemented in a thin client environment, and certain other functions of one or more of the EGMs or EGTs (or gaming devices) are implemented in a thick client environment. In one such embodiment in which the gaming system includes an EGM or EGT (or gaming device) and a central server, central controller, or remote host, computerized instructions for controlling any games and VDPPCs 104 displayed by the EGM or EGT (or gaming device) are communicated from the central server, central controller, or remote host to the EGM or EGT (or gaming device) in a thick client configuration, and computerized instructions for controlling any games, VDPPC 100 or 150 display, or other functions displayed by the EGM or EGT (or gaming device) are executed by the central server, central controller, or remote host in a thin client configuration.

In certain embodiments in which the gaming system includes: (a) an EGM or EGT (or gaming device) configured to communicate with a central server, central controller, or remote host through a data network; and/or (b) a plurality of EGMs or EGTs (or gaming devices) configured to communicate with one another through a communication network, the communication network may include a local area network (LAN) in which the EGMs or EGTs (or gaming devices) are located substantially proximate to one another and/or the central server, central controller, or remote host. In one example, the EGMs or EGTs (or gaming devices) and the central server, central controller, or remote host are located in a gaming establishment or a portion of a gaming establishment.

In other embodiments in which the gaming system includes: (a) an EGM or EGT (or gaming device) configured to communicate with a central server, central controller, or remote host through a data network; and/or (b) a plurality of EGMs or EGTs (or gaming devices) configured to communicate with one another through a communication network, the communication network may include a wide area network (WAN) in which one or more of the EGMs or EGTs (or gaming devices) are not necessarily located substantially proximate to another one of the EGMs or EGTs (or gaming devices) and/or the central server, central controller, or remote host. For example, one or more of the EGMs or EGTs (or gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs or EGTs (or gaming devices) are located. In certain embodiments in which the communication network includes a WAN, the gaming system includes a central server, central controller, or remote host and an EGM or EGT (or gaming device) each located in a different gaming establishment in a same geographic area, such as a same city or a same state. Gaming systems in which the communication network includes a WAN are substantially identical to gaming systems in which the communication network includes a LAN, though the quantity of EGMs or EGTs (or gaming devices) in such gaming systems may vary relative to one another.

In further embodiments in which the gaming system includes: (a) an EGM or EGT (or gaming device) configured to communicate with a central server, central controller, or remote host through a data network; and/or (b) a plurality of EGMs or EGTs (or gaming devices) configured to communicate with one another through a communication network, the communication network may include an internet (such as the Internet) or an intranet. In certain such embodiments, an Internet browser of the EGM or EGT (or gaming device) is usable to access an Internet game page from any location where an Internet connection is available. In one such embodiment, after the EGM or EGT (or gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card, VDPPC 100 or 150 uniquely identifying the player, or other smart card inserted into a card reader; by validating a unique player identification number associated with the player by the central server, central controller, or remote host; or by identifying the EGM (or gaming device), such as by identifying the MAC address or the IP address of the Internet facilitator. In various embodiments, once the central server, central controller, or remote host identifies the player, the central server, central controller, or remote host enables placement of one or more wagers via VDPPCs 104 on one or more plays of a game, and displays those VDPPCs and plays via the Internet browser of the EGM or EGT (or gaming device).

The central server, central controller, or remote host and the EGM or EGT (or gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs or EGTs (or gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Embodiments of the present disclosure will be described in connection with a player interacting with one or more gaming devices. It should be appreciated that a gaming device, as described herein, may include a gaming device, mobile device, server, and other computational device. While embodiments of the present disclosure will be described in connection with the example of an Electronic Gaming Table ("EGT"), Electronic Gaming Machine (EGM), Virtual Reality ("VR") gaming machine, Augmented Reality ("AR") gaming machine, or Video Gaming Machine (VGM) using improved VDPPCs, it should be appreciated that embodiments of the present disclosure are not so limited. For instance, other types of computational devices, such as portable user devices, smartphones, tablets, laptops, Personal Computers (PCs), wearable devices, etc. may be configured with gaming device functionality (e.g., to implement a game of chance, a game or skill, or a hybrid game of chance/game of skill), similar to a gaming device as described herein.

Figure 3:
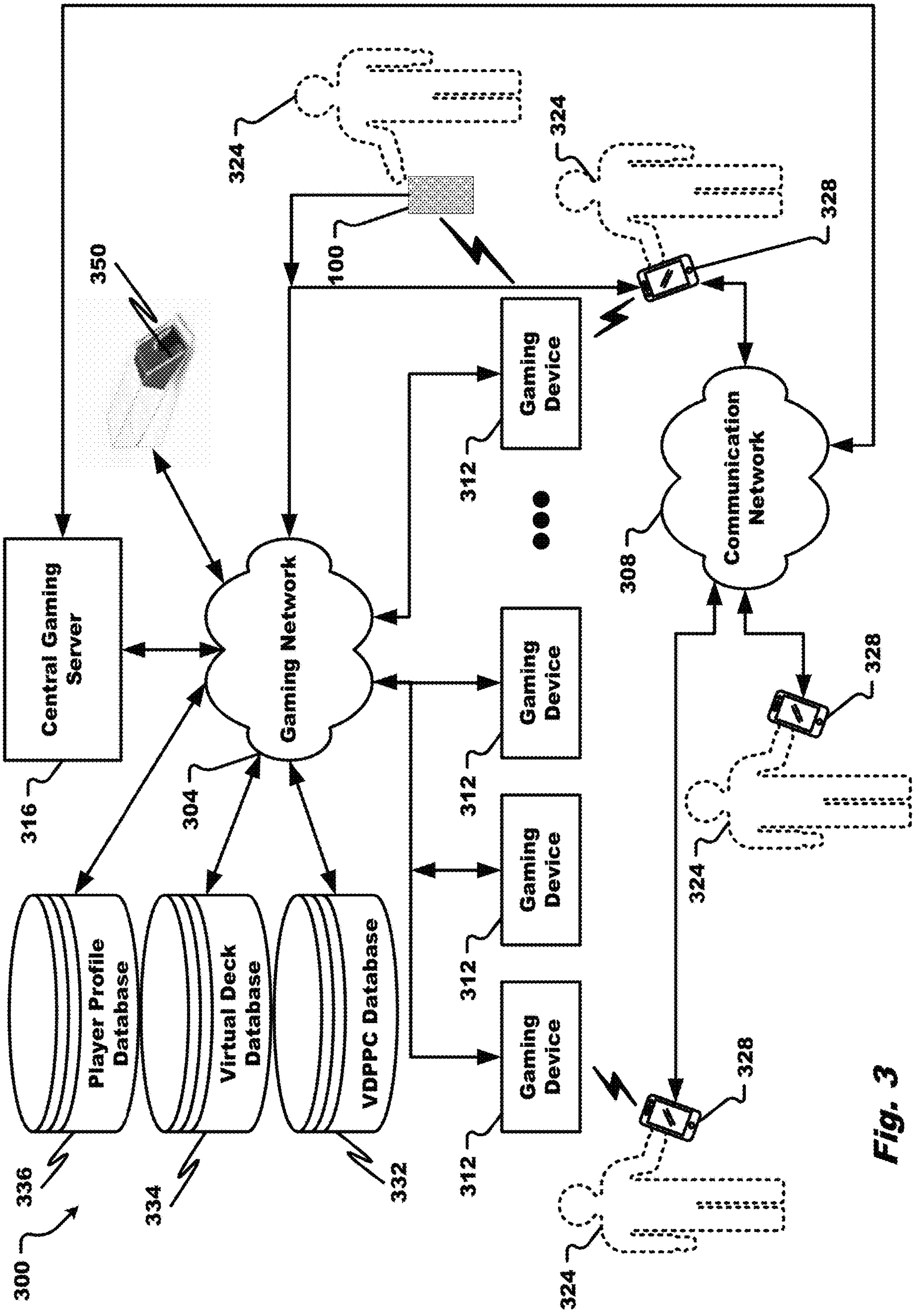
FIG. 3 illustrates a gaming system for interacting with VDPPCs in accordance with embodiments of the present disclosure.

With reference initially to FIG. 3, details of an illustrative gaming system 300 will be described in accordance with at least some embodiments of the present disclosure. The components of the gaming system 300, while depicted as having particular instruction sets and devices, is not necessarily limited to the examples depicted herein. Rather, a system according to embodiments of the present disclosure may include one, some, or all of the components depicted in the system 300 and does not necessarily have to include all of the components in a single device. The illustration of a single central gaming server 316 is for ease of discussion and should not be construed as limiting embodiments of the present disclosure to a single-server architecture.

The gaming system 300 is shown to include a gaming network 304 and a communication network 308. The gaming network 304 may correspond to a distributed set of devices that interconnect and facilitate machine-to-machine communications between one or multiple gaming devices 312 and the gaming server 316. The communication network 308 may correspond to a distributed set of devices that interconnect and facilitate machine-to-machine communications between the gaming server 316 and mobile devices 328 carried by players 324. In some embodiments, the gaming network 304 and communication network 308 may correspond to different networks administered and/or maintained by different entities. In such a scenario, one or more of a gateway, firewall, or similar network border device may reside between the gaming network 304 and the communication network 308 (e.g., to maintain security preferences/settings of each network). In another possible scenario, the gaming network 304 and communication network 308 may correspond to the same or similar network. As a non-limiting example of the second scenario, the gaming network 304 and communication network 308 may both correspond to a distributed Internet Protocol (IP)-based communication network, such as the Internet.

A gaming network 304 and communication network 308 may include any type of known communication medium or collection of communication media and may use any type of protocols to transport messages between devices. As some non-limiting examples, the gaming network 304 may correspond to a WAN or LAN in which the plurality of gaming devices 312 are configured to communicate with the gaming server 316 using devices that are owned and administered by the same entity that administers security settings of the gaming devices 312. As such, the gaming network 304 may be considered a secure or trusted network.

The communication network 308, in some embodiments, may also include a WAN or LAN. Alternatively or additionally, the communication network 308 may include one or more devices that are not administered by the same entity administering the gaming devices 312. Thus, the communication network 308 may be considered an untrusted or unsecure network from the perspective of the gaming network 304. The Internet is an example of the communication network 308 that constitutes an IP network consisting of many computers, computing networks, and other communication devices located all over the world, which are connected through many telephone systems and other means. Other examples of the communication network 308 include, without limitation, a standard Plain Old Telephone System (POTS), an Integrated Services Digital Network (ISDN), the Public Switched Telephone Network (PSTN), a cellular network, and any other type of packet-switched or circuit-switched network known in the art. In some embodiments, the communication network 408 may be administered by a Mobile Network Operator (MNO) whereas a casino entity may administer the gaming network 304.

It should be appreciated that the gaming network 304 and/or communication network 308 need not be limited to any one network type, and instead may be comprised of a number of different networks and/or network types. Moreover, the gaming network 304 and/or communication network 308 may comprise a number of different communication media such as coaxial cable, copper cable/wire, fiber-optic cable, antennas for transmitting/receiving wireless messages, wireless access points, routers, and combinations thereof.

In some embodiments, the gaming devices 312 may be distributed throughout a single property or premises (e.g., a single casino floor) or the gaming devices 312 may be distributed among a plurality of different properties. In a situation where the gaming devices 312 are distributed in a single property or premises, the gaming network 304 may include at least some wired connections between network nodes (e.g., a LAN or multiple LANs). As a non-limiting example, the nodes of the gaming network 304 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming devices 312 may utilize the same or different types of communication protocols to connect with the gaming network 304. It should also be appreciated that the gaming devices 312 may or may not present the same type of game to a player 324. For instance, the first gaming device 312 may correspond to a gaming device, such as an EGM, that presents a slot game to the player 324 whereas a second gaming device 312 may correspond to a gaming device, such as an EGT, that presents a playing card game a player 324. It should be appreciated that a gaming device 312 may correspond to one example of a gaming device. It should also be appreciated that the functions and features described in connection with a gaming device 312 may be provided in any other type of gaming device without departing from the scope of the present disclosure.

In some embodiments, the gaming devices 312 may be configured to communicate with a centralized management server in the form of the central gaming server 316. The central gaming server 316 may be configured to centrally manage games of chance, games of skill, or hybrid games of chance/skill played at the gaming devices 312 (e.g., slot games), enable execution of a different game (e.g., a card game), monitor player 324 activity at the gaming devices 312, track player 324 association with a gaming device 312, facilitate communications with players 324 via the gaming devices 312, facilitate communications with players 324 via the mobile devices 328 (or other gaming devices), and/or perform any other task in connection with games played by a player 324 at gaming devices.

The digital shoe 350 can interact with a dealer (not shown) via a user interface and the central gaming server 316 and other gaming components, such as VDPPCs 100 or 150, via the gaming network 304. The digital shoe can coordinate with the gaming server 316 to update and maintain VDPPC, player profile, and virtual deck data structures, track which VDPPCs are in the digital shoe at a given time and which VDPPCs have been dealt to players and to which player, and perform other gaming functions, such as VDPPC enrollment, unenrollment, check out, and playing parameter assignment, and monitor a current status or state of each VDPPC (e.g., discarded, folded, returned to digital shoe, and in play in a player's hand).

For example, a table game system can learn about cards dealt to specific players at the table. In one embodiment, the VDPPCs can be assigned to a specific seat at the table during the course of the game. In another embodiment, the VDPPCs can learn about what seat at the table they have been dealt to by sensing or detecting that they have been dealt to a specific seat by the detection of a specific RFID or NFC tag representing a seat or spot at the table. The VDPPCs can then communicate this information to a gaming table server or central server wirelessly when the VDPPCs are dealt. Alternatively, the digital shoe can coordinate with the gaming table server (and the dealer) during the game via a user interface, and the gaming table server could automatically assign the VDPPC to the correct spot at the table, and therefore to the appropriate player. For example, if players at all five spots at a table game need to be dealt three cards to start a game, the dealer can press a button on the display of the table gaming server to start the game, then the dealer can deal three VDPPCs to each spot, from spot 1 to spot 5, in-sequential order, and the digital shoe can communicate the information about each card dealt to each spot as the cards are dealt. Any dealer or community cards, depending upon the game, could also be tracked in a similar fashion. If players have the option of discarding certain cards, then the digital shoe, table gaming server, and dealer can coordinate the tracking of the freshly dealt replacement cards to the appropriate spot at the table as well. This information can then be leveraged by the table gaming server to track player skill, and adjust the amount of loyalty rewards earned by certain players.

In some embodiments, a player 324 may be enabled to enhance their experience with the gaming devices 312 via interactions with their personal mobile device 328. In some embodiments, a mobile device 328 may be configured to execute one or more games of chance, one or more games of skill, and/or one or more hybrid games of chance/skill that are also executable by a gamine device 312. Thus, in some embodiments, a mobile device 328 may be considered another example of a gaming device. In some embodiments, the mobile device 328 may be referred to as a personal gaming device that is configured to be owned and carried by a player 324. For instance, a player 324 may be allowed to play a game at their mobile device 328 without ever having to physically engage a gaming device 312. The mobile device 328 may correspond to a mobile communication device, such as a smartphone, tablet, laptop, PDA, wearable device, an augmented reality headset, a virtual reality headset, or the like. In other embodiments, the mobile device 328 may correspond to a PC, kiosk, or the like that facilitates improved lottery game play for the player 324. Any of the above-mentioned examples of a mobile device 328 may correspond to an example of a gaming device as described herein.

In some embodiments, a mobile device 328 may be configured to communicate directly with a gaming device 312. In some embodiments, some or all of the game play may be achieved with the mobile device 328 rather than relying on the use of a gaming device 312. Where a mobile device 328 interacts with a gaming device 312, direct machine-to-machine communications may utilize a proximity-based communication protocol such as NFC, Bluetooth®, BLE, WiFi, or the like. Alternatively or additionally, the mobile devices 328 may be configured to communicate with other mobile devices 328 and/or the central gaming server 316 via the communication network 308. Such communications may be secured (e.g., encrypted) or unsecured depending upon the nature of information exchanged during the communications. A mobile device 328 may correspond to a player's 324 personal device that uses an unsecured or untrusted communication network 308 or to a device issued to the player 324 during the player's visit at a particular casino, in which case the mobile device 328 may be administered with certain casino-approved security policies.

It should be appreciated that the central gaming server 316 may or may not be co-located with the gaming devices 312. Further still, players 324 may be allowed to carry multiple mobile devices 328, which may or may not be required to communicate or pair with a gaming device 312.

FIG. 3 also depicts the possibility of some mobile devices 328 or VDPPCs 100 or 150 being paired with a gaming device 312 or digital shoe 350, thereby enabling communications to flow between the mobile device 328 or VDPPC 100 or 150 and gaming device 312 or digital shoe 350. This communication may utilize a proximity-based communication protocol, such as Bluetooth, BLE, NFC, WiFi, etc. FIG. 3 further shows that one or more mobile devices 328 or VDPPCs 100 or 150 may not necessarily be paired with a gaming device 312, but such mobile devices 328 or VDPPCs 100 or 150 may still be configured to communicate with the central gaming server 316 via the communication network 308. Communications between the gaming device 312 and mobile device 328 may facilitate any number of combinations of gameplay opportunities.

The central gaming server 316 is in communication, via the gaming network 304, with player profile, virtual deck, and playing card databases 336, 334, and 332, respectively. The databases 336, 334, and 332 may be configured to store one or multiple data structures that are used in connection gaming interactive activities of players and VDPPCs. The databases can use any database model and compatible database management system. Examples of database models include relational databases, object-oriented databases, and non-relational databases, such as NoSQL and NewSQL databases.

Figure 4:
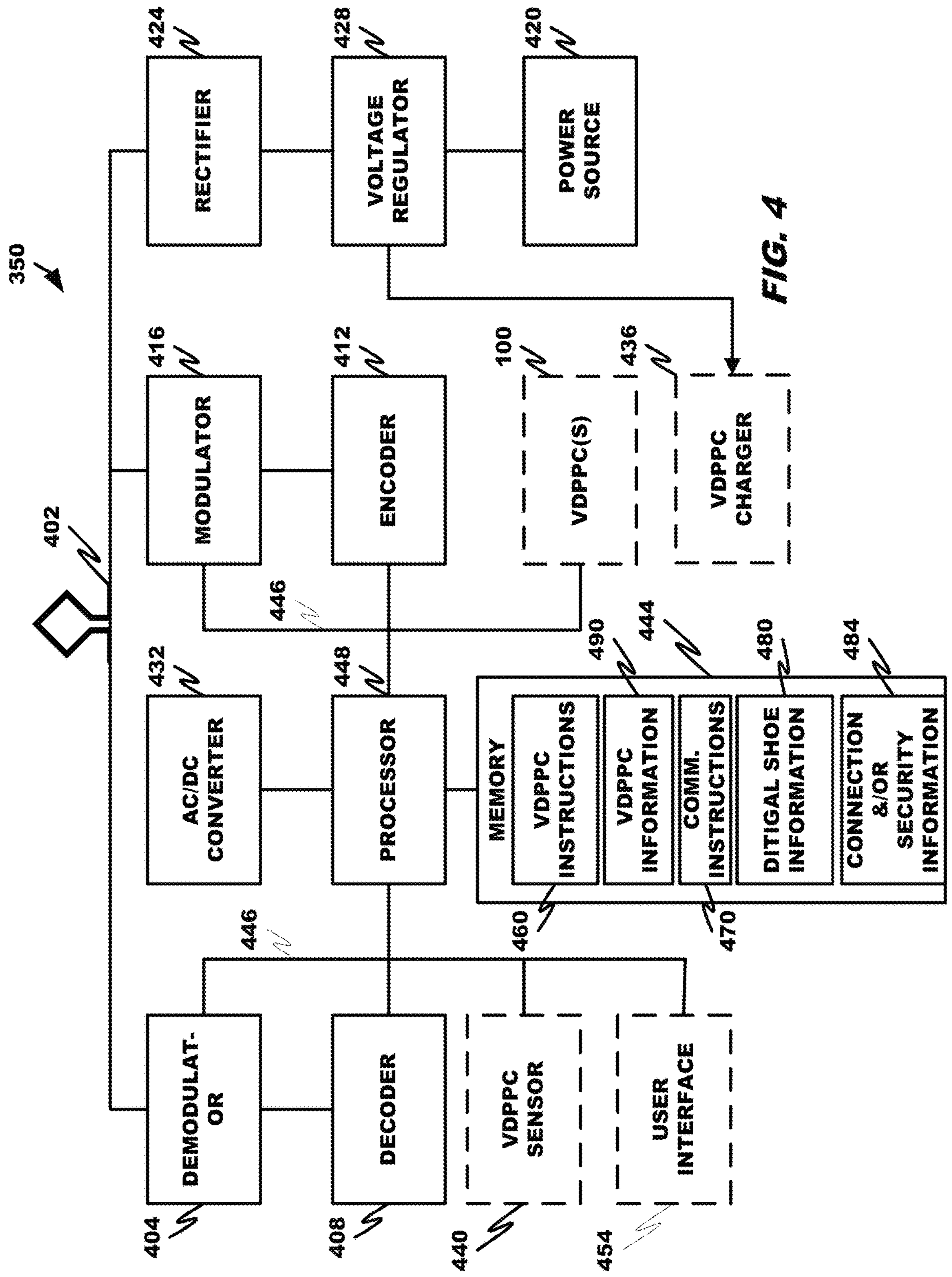
FIG. 4 illustrates components of a digital card shoe in accordance with embodiments of the present disclosure.

With reference to FIG. 4, the functional components of a typical digital shoe 350 are illustrated in accordance with an embodiment. The digital shoe 350 comprises an antenna 402 (such as an RF antenna, WiFi antenna and driver circuit, Bluetooth antenna and driver circuit, or a cellular communication antenna and driver circuit) to send and receive encoded wireless signals, a demodulator 404 to demodulate received wireless signals and decoder 408 to decode the demodulated signal and perform the necessary transformations to determine the data in the signal, an encoder 412 to transform and encode data to be emitted by the antenna 402 and a modulator 416 to modulate encoded data for transmission, a power source 420, a rectifier 424 to convert received electromagnetic (charging) signals into electrical energy, such as Alternating Current ("AC") or Direct Current ("DC") power, a voltage regulator 428 that, due to the large variation in rectified voltage, automatically maintains a constant voltage level, an AC-DC converter 232 to convert an AC electrical energy input to a DC electrical energy output (or vice versa), VDPPC sensor 440 to sense when the VDPPC 100 is inserted into the digital shoe, VDPPC charger 436 to charge the VDPPC 100 when received in the digital shoe 350, an (optional) user interface 454, and a memory 444, all coupled by a bus 446 to a (micro)processor 448.

In some embodiments the digital shoe can determine whether a VDPPC is inserted into or removed from the digital shoe based on input from the VDPPCs position and/or orientation sensor 238. As will be appreciated, the sensed orientation of the VDPPC as a function of time relative to a horizontal or vertical reference plane can indicate whether the VDPPC or is inserted into or removed from the digital shoe as the relative orientation of the VDPPC surface will change from a first orientation to a second orientation indicating insertion or removal. For example, when a VDPPC is removed from the digital shoe it moves through a predictable series of angular orientations relative to a vertical or horizontal reference plane (e.g., 45 degree angle when in the shoe to 0 degree angle when removed from the shoe). This time-dependent variation of position can be tracked by the location or orientation sensor 238 of the VDPPC.

The power supply 420 may correspond to an internal power supply that provides AC and/or DC power to components of the VDPPC 100. In some embodiments, the power source 420 may correspond to one or multiple batteries or capacitors or other electromagnetic energy storage devices. Alternatively or additionally, the power source 420 may include a power adapter or wireless charger that converts AC power into DC power for direct application to components of the VDPPC 100, for charging a battery, for charging a capacitor, or a combination thereof.

The power supply 420 can be wirelessly rechargeable and the VDPPC charger 436 can wirelessly charge the power source 220 of the VDPPCs 100. As will be appreciated, the electromagnetic (charging) signals emitted by a wireless charge coil for inductive charging (which is a type of wireless or cordless charging that uses an electromagnetic field to transfer energy between two objects using electromagnetic induction) can be any frequency, such as radio frequency, and includes. In some embodiments, NFC near field power and communications and lower power processor and I/O interface can be employed to reduce digital shoe power requirements and increase power supply 420 life. Power source metrics can be used to trigger generation of a warning that a selected VDPPC or the digital shoe itself has a low charge and requires charging. The trigger can be a detection that the stored energy level of a battery in the power source has fallen below a selected threshold.

Additional charging embodiments are also possible. While wireless charging may be more convenient for the dealer and players, wired charging modes for the VDPPCs and digital shoe may also be used. In this embodiment, a wired charging port, or set of ports, may be placed at various VDPPC receiving slots within the digital shoe such that the VDPPC is recharged when inserted into the slot and in contact with the port. In some embodiments, the wired charging port acts also as a communications port to exchange data (e.g., session keys, assigned playing card parameter values, assigned player information, and/or assigned gaming table information) with the VDPPC.

The optional user interface 454 may include a combination of user input devices and user output devices. For instance, the user interface 254 may be implemented as one or more buttons located on a surface of the VDPPC 100, as a touch sensitive display 116 or tactile shuffle button, or as any other device that is capable of enabling tactile player interaction with the VDPPC 100.

VDPPCs 100 are positioned in the digital shoe 350 is a manner similar to how traditional playing cards are positioned in a conventional card shoe. As will be appreciated, the VDPPCs need to be placed somewhere at the start of a game so that they can be dealt to players, the dealer, or to the community as needed by the rules of the game. In one embodiment, the VDPPCs are placed into the "digital shoe", which models a traditional card shoe, but can contain less than or equal to the number of cards required to be shuffled to securely play the game. If, for example, a table game requires N=8 shuffled decks to play, the digital shoe can track 8 shuffled decks of virtual cards, and one deck of VDPPCs can be inserted into the digital shoe and the appropriate virtual card value can be assigned to each VDPPC whenever a VDPPC value assignment event occurs.

The VDPPC sensor 440 can include any device for detecting and interacting with a VDPPC by a suitable wireless or wired communication protocol when located in the digital shoe 350. The sensor 440 can be an insertion sensor that determines when a VDPPC is inserted into the digital shoe, a removal sensor that determines when a VDPPC is removed from the digital shoe, or a retention sensor that determines when a VDPPC is being held within the digital shoe. The sensor 440, for example, can be mechanical (e.g., spring-loaded arm or lever displaced when the VDPPC is inserted into or removed from the shoe), electrical (voltage or current sensor sensing that a VDPPC is being charged by the VDPPC charger 436), electromechanical (load cell or force sensor responsive to a weight of the VDPPC when inserted into, removed from, or retained in the shoe 350), magnetic (detecting magnetic field variations caused by the VDPPC when inserted into, removed from, or retained in the shoe 350), optical (detecting ambient light level as indicating whether or not VDPPC blocks the sensor), a short range wireless network (e.g., RFID) that determines by signal strength when a VDPPC is in close spatial proximity to the VDPPC thereby indicating insertion, removal or retention, an image processing system that captures images of VDPPCs being inserted into or removed from the digital shoe, and the like.

In some embodiments, the sensor 440 determines that a VDPPC is being retained within the shoe using a device for determining signal strength of one or more wireless signals emitted by a VDPPC (e.g., Received Signal Strength Indicator or RSSI or dBm or, in the case of NFC, detecting an NFC reader field and operating reader receiver circuitry at the NFC-enabled device so as to at least determine the strength of a signal received from the reader field, and the like). The sensor 440 can include one or more communication ports that physically engage one or more ports when positioned in the digital shoe.

The memory 444 may include one or multiple computer memory devices that are volatile or non-volatile. The memory 444 may store digital shoe information 480 and VDPPC information 490.

The associated digital shoe information 480 can be any information relating to the digital shoe or an operation thereof and VDPPC information 490 relating to VDPPCs 100 in the shoe. Examples of digital shoe information 480 include a unique digital shoe identifier, session connection and security information, and/or digital shoe software and hardware requirements and configuration specifications. Examples of VDPPC information 490 include VDPPC identifier for VDPPC 100 currently in the shoe and a current state and status of each and a current set of assigned playing parameters for each, and a current stored charge level. The digital shoe unique identifier can be any unique or substantially unique identifier or image associated with the digital shoe, such as a digital signature data structure (such as an RFID, a QR code, a barcode, or the like) or an image based on a software and/or hardware configuration of the digital shoe or a variable computed by selected software executed by the digital shoe (such as hash valuer calculated by a secure hash algorithm). The digital shoe information 480 can further include information regarding the gaming device or table to which the digital shoe is currently assigned (e.g., a gaming table object such as a dealer identity, table identity, and the like), and a current spatial location of the digital shoe.

Examples of connection and security information 484 include a communication address (such as a universally or locally administered address) associated with the digital shoe itself, a mobile device of the player, a VDPPC, or another gaming system component (such as an electronic gaming table or gaming server), and secure session information (e.g., one or more symmetric or asymmetric multi- or single-use, private or public cryptographic keys, such as a session key, content encryption key, traffic encryption key, multicast key, key encryption key, key wrapping key, etc.) relating to a communication session with another gaming system component (such as an electronic gaming table or gaming server or player mobile device) or a VDPPC.

The memory can include any other data depending on the application, such as game credits and customer account information.

The memory 444 can further include a variety of instruction sets.

An example of an instruction set that may be stored in the memory 444 includes VDPPC instructions 460 that, when executed by the processor 448, enable the digital shoe to interact with the VDPPC 100 inside the digital shoe to perform various gaming-related functions (e.g., enrollment, unenrollment, check out, receiving and setting playing card parameter values in VDPPC memory 244, and the like) and communication instructions 470 that, when executed by the processor 448, may enable the digital shoe to communicate with another gaming system component or a player's mobile device or multiple mobile devices.

The communication instruction set 470 may include instructions that enable the digital shoe to pair with a mobile device of a player or another gaming system component (as the case may be) and establish a communication channel with the mobile device or gaming system component via the pairing. As an example, the communication instruction set 470 may include instructions that enable NFC, Bluetooth®, WiFi, or other types of communication protocols. It should be appreciated that the instruction set 470 may also be updated to reflect when the digital shoe is paired with the gaming device 312 or a mobile device (as the case may be) and such pairing information may include addressing information for the digital shoe. In some embodiments, the communication instruction set 470 may be configured to operate or drive a network interface to facilitate direct or indirect communications with the digital shoe or another gaming system component or mobile device (as the case may be). Alternatively or additionally, the communication instruction set 470 may be configured to periodically send digital shoe information-containing status signals to the gaming server to synchronize the digital shoe operations with the digital shoe operations maintained in memory by the gaming server.

Although not shown, the digital shoe can also include a stored charge sensor to collect information regarding a current power level or state-of-charge or depth-of-charge of the power source 420.

Figure 5:
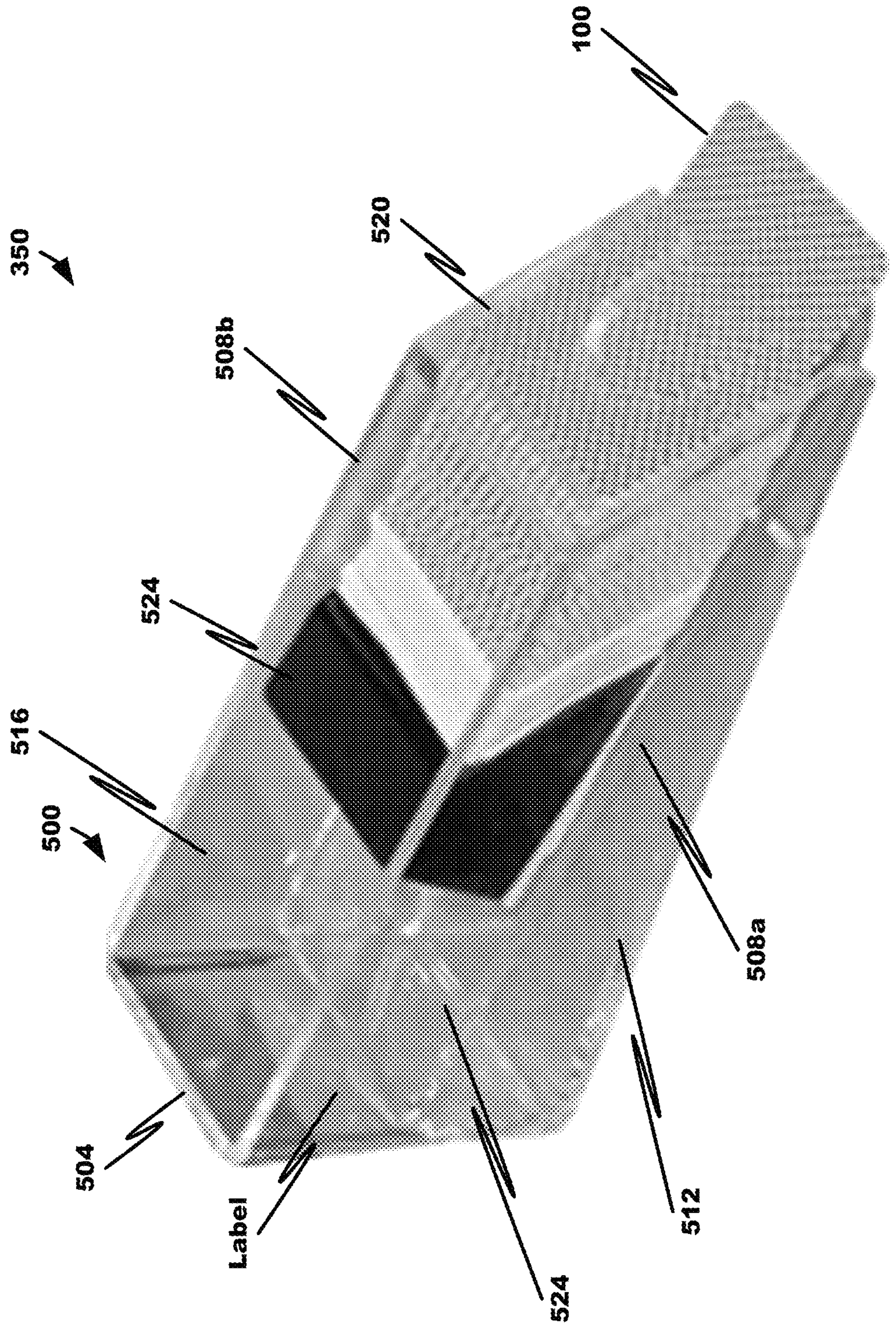
FIG. 5 is a perspective view of a digital card shoe in accordance with embodiments of the present disclosure.

FIG. 5 shows a perspective view of the digital shoe 350. The shoe 350 comprises exterior housing 500 comprising rear 504, side 508*a,b*, bottom 512, and top 516 panels and a sloped front cover 520 and VDPPC support surface 524 that cause VDPPCs 100 to be removed VDPPC at a time at an angle to maintain privacy of the playing card parameters for each withdrawn VDPPC. The sloped front cover includes an opening into which a dealer may insert a finger to remove slidably a VDPPC. The front cover 520 is placed at an angle to facilitate extraction of a VDPPC. A wedge 524 having an angled front surface sits on the VDPPC support surface 524 behind the VDPPCs. The wedge 524 moves forward under the force of gravity and/or other biasing or elastic member (e.g., a spring) as VDPPCs are removed to prevent VDPPCs from moving back away from the opening as VDPPCs are removed.

The VDPPCs are input into the digital shoe 350 by lifting an upper cover or the upper portion of the exterior housing 500 (e.g., top 516). The upper cover can be hinged and rotated open and closed, opened and closed by complete removal from a lower portion of the exterior housing 500, and the like. The VDPPC sensor 440 can include a sensor (e.g., a contact sensor, such as one using an internal reed switch that closes when in direct proximity to a magnet and opens when not in direct proximity) to indicate when the input is open and/or closed.

Figure 6:
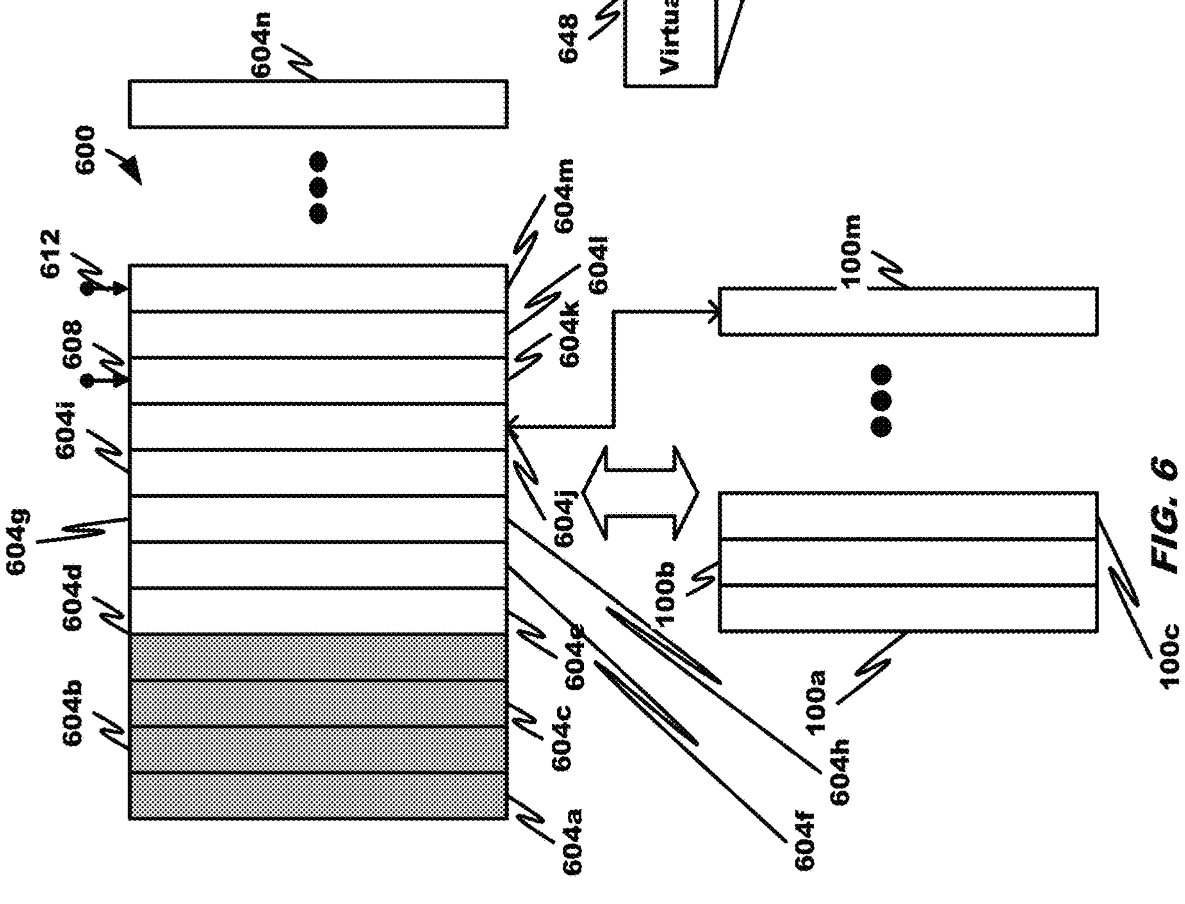
FIG. 6 illustrates a mapping of a virtual playing card deck against a set of VDPPCs in accordance with embodiments of the present disclosure.

Referring to FIG. 6, a mapping of a virtual deck 600 against VDPPCs 100*a-m* is shown. The virtual deck comprises a plurality of virtual cards 604*a-n*, each corresponding to a data structure comprising a deck position relative to a reference point (e.g., a first virtual card in the deck), a respective set of playing card parameters (which vary from virtual card to virtual card), and a status indicator. Status changes for instance include discards, folds, and/or card game conclusions.

Virtual playing cards 600*a-d* are no longer active and ineligible for further play in the card game until a shuffling event as having been discarded, folded, or used in a prior card game. As shown, virtual playing card 600*e* has been assigned to VDPPC 100*a*, card 600*f* to VDPPC 100*b*, card 600*g* to VDPPC 600*h*, and card 600*i* to VDPPC 100*m*. While the number of VDPPCs shown is less than the number of virtual cards, any number of VDPPCs may be used, whether more, the same as, or less than the number of virtual cards.

A shuffle event determines a beginning of a new deck or shuffle cycle and causes generation of a randomized ordering of the virtual cards that may be the same as or different from the randomized ordering or a prior deck or shuffle cycle. The shuffle event can be based on one or more of a position of a next eligible virtual card in the plurality of virtual playing cards, a relative position in the plurality of virtual cards of a shuffle card to the position of the next eligible virtual card, a counter value indicating a number of ineligible virtual cards, and a counter value indicating a number of remaining eligible virtual cards.

In some embodiments, the position of a next eligible virtual card is tracked by a first flag (or mark or other position indicator) 608 that indicates a next (unassigned) virtual card to be assigned to a VDPPC. The virtual card values 604*a-j* are ineligible as having been played in a prior card game or discarded or folded in a current card game or as being in play in the current card game. Eligible virtual card values 604*k-n* have not yet been assigned to a player and/or are not currently in play.

In some embodiments, the position of a shuffle card is tracked by a second flag (or mark or other indicator) 612 that indicates when the virtual deck is to be reshuffled. As will be appreciated, each of the first and second flags corresponds to a value that can determine a next step of the game instructions. A flag can be binary or contain a Boolean value (true or false) or non-binary and store a range of values that can indicate, for example, a type of card game, a number of virtual decks to be reshuffled, and the like.

In some embodiments, the interaction of the first and second flags is used to trigger a shuffle event. When the set of playing card parameters is assigned, the first flag 608 is advanced to the next virtual card in the deck. The second flag 612 triggers a digital deck reshuffling event when the first flag 608 moves in response to status changes of VDPPCs to the virtual card associated with the second flag 612.

In other embodiments, a counter is used to trigger a virtual deck shuffle event. The counter can be incremented or decremented as a virtual card is assigned or associated with each VDPPC such when the counter has a predetermined value (e.g., a counter value indicating a number of ineligible virtual cards or a counter value indicating a number of remaining eligible virtual cards) a shuffle event is triggered.

As will be appreciated, the dealer can also trigger a shuffling event by interacting with a touch screen on the digital shoe or a gaming table or by pressing a physical tactile button. Such a button is useful in certain scenarios, such as when a dealer opens the table for their shift.

As noted earlier, the cards in the shuffled decks of playing cards are shuffled upon the occurrence of a shuffling event and values can be assigned to VDPPCs based upon occurrence of a VDPPC value assignment event. Virtual cards are removed from the set of shuffled cards upon occurrence of a VDPPC value assignment event. In one embodiment, this is done without replacement and a new set of shuffled virtual cards only is created upon occurrence of a digital deck shuffling event. The first flag 608 indicates the set of playing card parameters to be assigned to a VDPPC in the event of a value assignment event.

Figure 7A:
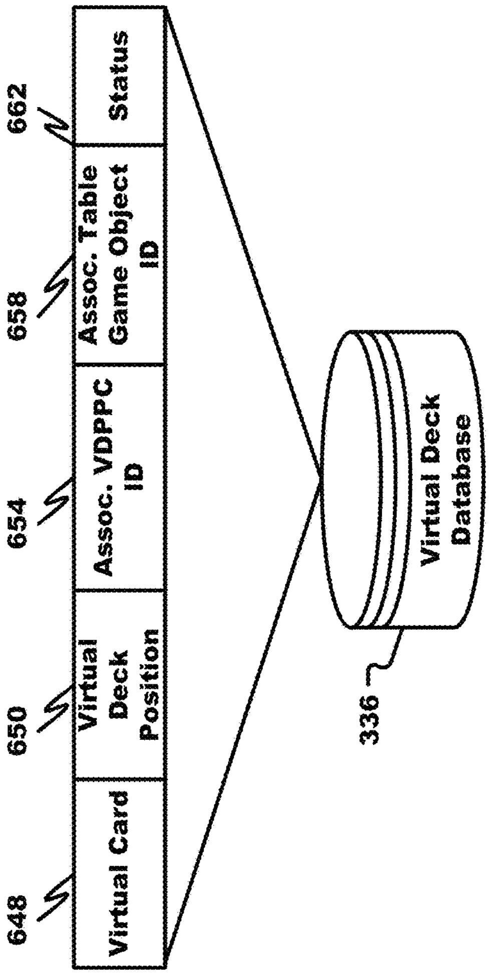
FIG. 7A illustrates data structures in a player profile database configured for use with VDPPCs in accordance with embodiments of the present disclosure.

Referring to FIG. 7A, the data structures in the virtual deck database 336 will be discussed. As will be appreciated, the virtual deck can be maintained in memory with the set of possible playing card parameters in virtual card fields 648 with each subset of playing card parameters for each virtual card field 648 being associated with a potential virtual card having a queue or deck position relative to other virtual cards, a status indicator indicating a status of the corresponding virtual card. Accordingly, for each virtual card 604*a-n*, the data structures comprised a virtual deck position field 650, an associated VDPPC identifier field 654, an associated table game object identifier field 658, and a status field 662. The virtual deck position field 650 comprises a queue or deck position of the corresponding virtual card relative to a point of reference in the deck (which is typically the first or last virtual card). The associated VDPPC identifier field 654 comprises an identifier of the VDPPC, if any, to which the virtual card has been assigned. The VDPPC identifier typically can map to an identity of the player or player seating position to which the VDPPC has been assigned or dealt. The associated table game object identifier field 654 comprises an identifier of the table game, if any, to which the virtual card has been checked out. The status field 662 comprises a current status of the virtual playing card. In addition to the statuses noted above, the status can include enrolled by game table, unenrolled by game table, assigned to VDPPC, not assigned to VDPPC, whether or not the card has been dealt to a player, the virtual card has been discarded, folded, or played in a card game that is now completed, and the like.

Figure 7B:
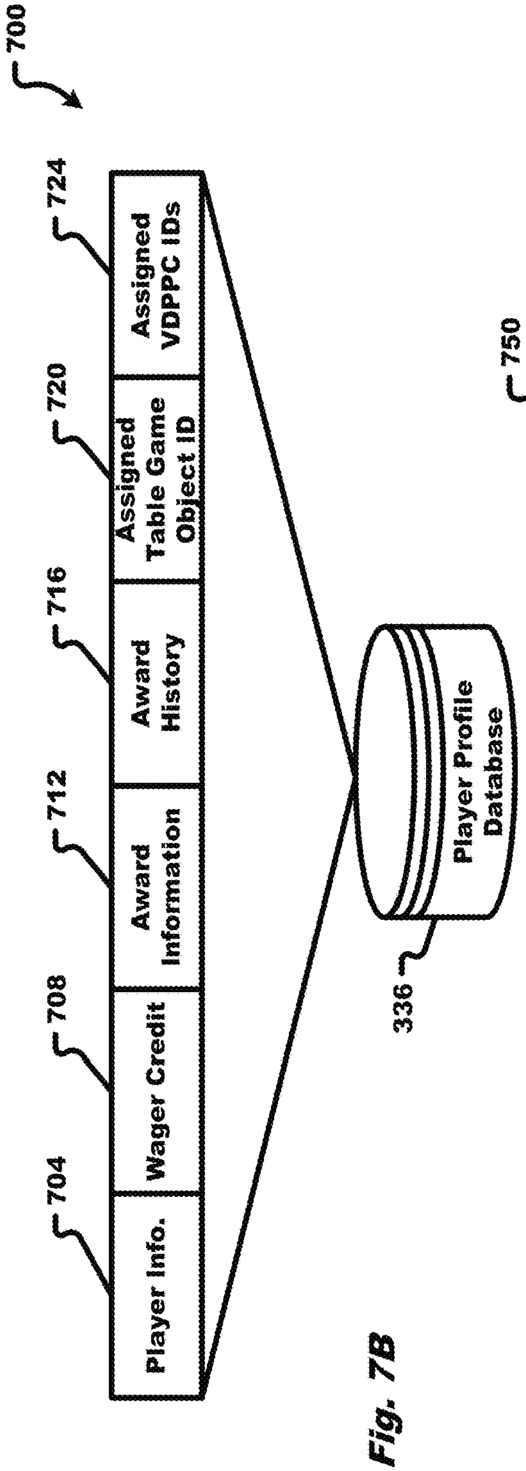
FIG. 7B illustrates data structures in a player profile database configured for use with VDPPCs in accordance with embodiments of the present disclosure.

Referring now to FIGS. 7B and C, the data structures in the player profile and playing card databases 336 and 332 will be discussed.

With reference to FIG. 7B, the data stored in the data structures 700 may be stored for a plurality of different player profiles or for a single player profile. The data structure 700 may include a plurality of data fields that include, for instance, a player information field 704, wager credit field 708, award information field 712, award history field 716, assigned table game object identifier field 720, and assigned VDPPC identifiers field 724.

The player information field 704 may be used to store any type of information that identifies a player. In some embodiments, the player information field 404 may store one or more of username information for a player 324, contact information for the player (such as email address, phone number, social website webpage universal resource locator, and the like), password information for a player account, player status information, accommodations associated with the player 324, and any other type of customer service management data that may be stored with respect to a player 324.

The wager credit field 708 may be used to store data about a player's 324 available credit with a casino or a plurality of casinos. For instance, the wager credit field 708 may store an electronic record of available credit in the player's account and whether any restrictions are associated with such credit. The wager credit field 708 may further store information describing a player's available credit over time, wagers made over time, cash out events for the player, winning events for the player, and the like.

The award information field 712 may be used to store information describing awards that have been paid to the player 324 or that are available to be paid in response to particular events occurring within the gaming system. As a non-limiting example, the award information field 712 may be used to store electronic records for values of awards that are available to or have been paid to the player 324.

The award history field 716 may store data related to awards, bonuses, mini bonuses, jackpots, side bets, etc. granted to the player 324. The award history field 716 may also indicate when such awards were granted to the player 324, whether the awards have been redeemed, whether the awards are being funded by a game of chance or skill, a mini bonus associated with an event, or a side bet award.

The assigned table game object ID field 720 may store data related to a table game or game table with which the player 324 is currently or historically associated. The assigned table game object ID field 720, for instance, may indicate a table game identifier of the gaming table at which the player 324 is currently playing, a dealer identifier of the dealer associated with the gaming table, and/or a seating position identifier of the player's 324 seating position at the gaming table.

The assigned VDPPC IDs field 724 may store data related to the VDPPCs currently and historically associated with the player 324. The VDPPC ID field 724, for instance, may indicate the VDPPC identifiers currently assigned to the player 324. This can be done by referencing or linking to the VDPPC ID field 740 corresponding to the VDPPC 100 or 150 assigned to the player 324.

Figure 7C:
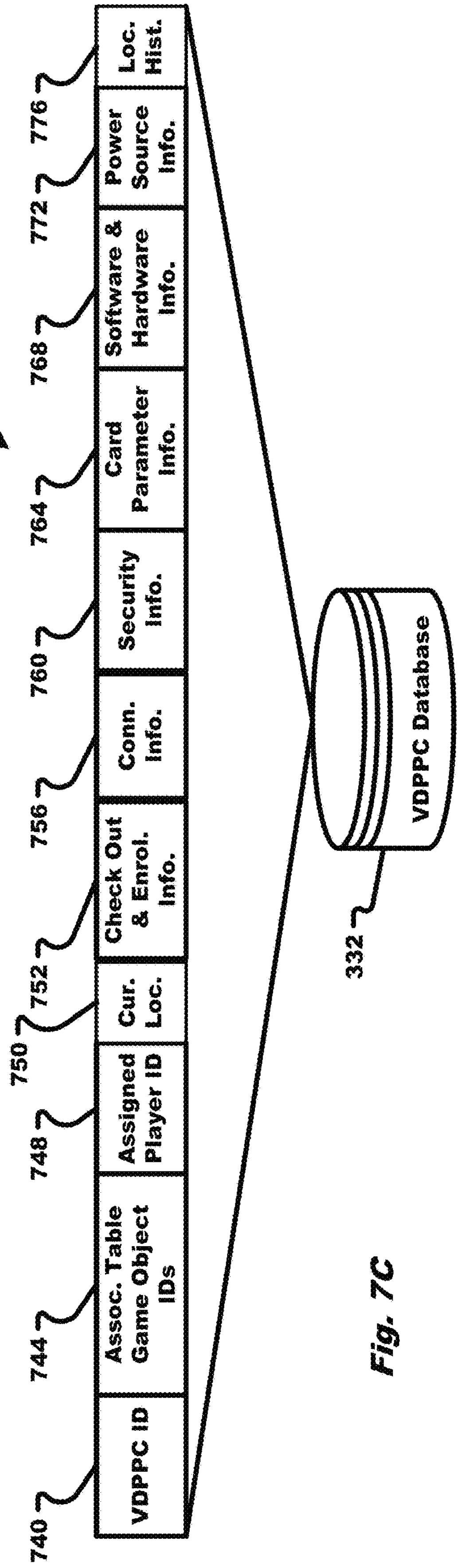
FIG. 7C illustrates data structures in a playing card database configured for use with VDPPCs in accordance with embodiments of the present disclosure.

With reference to FIG. 7C, the data stored in the data structures 750 may be stored for a plurality of different VDPPCs or for a single VDPPC. The data structure 750 may include a plurality of data fields that include, for instance, a VDPPC ID field 740, associated table game object IDs field 744, assigned player ID field 748, current VDPPC spatial location field 750, check out and enrollment information field 752, connection information field 756, security information field 760, card parameter information field 764, software and hardware information field 768, power source information field 772, and spatial location history field 776.

The VDPPC ID field 740 may be used to store any type of information that identifies a VDPPC. In some embodiments, the VDPPC ID field 740 may store a VDPPC identifier, such as the VDPPC identifier(s) described above. Alternatively or additionally, the VDPPC identifier can be a communication or network address, such as an IP or MAC address.

The associated table game object ID field 744 may be used to store one or more identifiers regarding one or more table game objects to which the VDPPC is currently or has been previously assigned.

The assigned player ID field 748 may be used to store one or more player information identifiers regarding one or more players 324 to which the VDPPC is currently or has been previously assigned. This can be done by referencing or linking to the player information field 404 corresponding to the assigned one or more players 324.

The current spatial location field 750 provides a current spatial location of the VDPPC relative to a selected coordinate system as noted above.

The check out and enrollment information field 752 may be used to store check out and enrollment information regarding the VDPPC. The check out and enrollment information may include, for instance, a gaming table object identifier with which the VDPPC is currently or was checked out and/or enrolled along with a beginning and ending timestamp for the check out and/or enrollment and an identifier of the dealer or player that checked out and/or enrolled the VDPPC.

The connection information field 756 may be used to store connection information regarding current or prior communication sessions between the VDPPC and a gaming system component, such as the central gaming server 316 or a gaming device 312 or a mobile device 328.

The security information field 760 may be used to store security information regarding current or prior communication sessions between the VDPPC and a gaming system component, such as the central gaming server 316 or a gaming device 312 or a mobile device 328.

The card parameter information field 764 may be used to store playing card parameters currently or previously generated and provided to the VDPPC along with an associated timestamp indicating for what period the corresponding set of playing card parameters was active.

The software and hardware information field 768 may be used to store information regarding the software and hardware requirements and specifications of the VDPPC 100 or 150 and/or a current software and hardware configuration of the VDPPC 100 or 150.

The power source information field 772 may be used to store a current power level or state-of-charge or depth-of-charge of the power source 220 of the VDPPC.

Finally, the location history field 776 may be used to store a current or prior spatial location of the VDPPC along with an associated timestamp. The location history field 776 can include a listing of communication links or VDPPC IDs of VDPPCs in communication range of the selected VDPPC.

Figure 8:
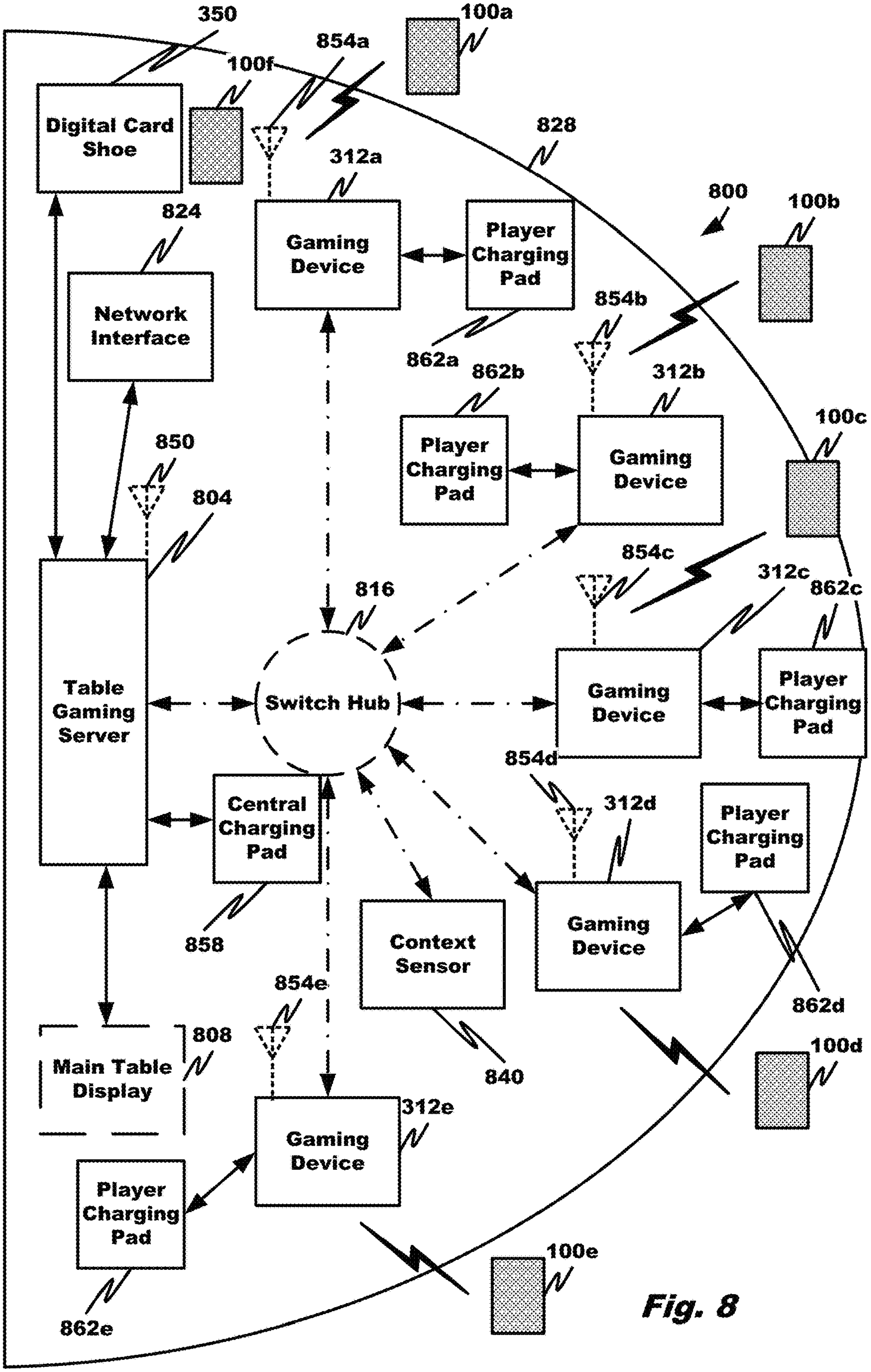
FIG. 8 depicts a table gaming system configured for use with VDPPCs in accordance with embodiments of the present disclosure.

Referring to FIG. 8, a multi-player EGT system 800 according to another embodiment is depicted. The EGT system 800 includes an EGT 828 having a table gaming server 804 or master table controller (MTC), an optional main multi-touch table display system 808, and a plurality of player station gaming devices 312*a-e* and digital shoe 350, which, for example, may be connected to the table gaming server 804 via at least one switch or hub 816. In at least one embodiment, the table gaming server 804 may include at least one processor and memory (not shown). Additionally, the EGT system 800 may also include one or more network interfaces 824 (discussed below) for communicating with other devices and/or systems in a casino network, such as the central gaming server 316. The EGT system 800 can be used with card games alone (using only VDPPCs or VDPPCs coupled with physical cards or virtual or digital cards displayed by a gaming system component) or combined with other games of chance or skill, including dice games, such as craps and sic bo, and roulette and wheel games. While the EGT system 800 is shown to have only five gaming devices, it is understood that the EGT system may have more or fewer gaming devices depending on the application.

The EGT system 800 may further comprise a table gaming server antenna 850 and gaming device antennas 854*a-e* to communicate wirelessly with the VDPPCs 100 or 150 assigned to each player station gaming device in accordance with a suitable wireless protocol such as those described above. One or more VDPPCs 100 or 150 have been enrolled by the EGT system 800 but not yet checked out to a player.

The EGT system 800 may further comprise a central charging pad 858 and each player station may alternatively or additionally comprise a player charging pad 862*a-e* to charge VDPPCs 100 or 150. While the charging pads may be by a wired charger, such as a powered USB port, the charging pads typically are configured to charge the VDPPCs 100 or 150 wirelessly as described above. For example, the charging pads can emit an NFC field that not only exchanges data but also can power the VDPPCs 100 or 150.

By way of illustration, the EGT can be a blackjack table with the central charging pad 858 being positioned near the dealer to charge the enrolled VDPPCs 100 or 150 that have not yet been checked out and stored by the dealer.

The various charging pads can exchange VDPPC or game information with the table gaming server 804. For example, VDPPC identifiers ("VDPPC IDs") could be relayed from the VDPPCs, via the charging pads, to the table gaming server 804 to keep track of the winning and losing hand analytics, along with data being transferred to the VDPPC processor and memory to change an image state on the digital displays of the VDPPCs. In some embodiments, the displayed image on the card only requires power to change state.

In some embodiments, the EGT has no central charging pad 858 but instead comprises a wireless power and/or charging pad 862 at each seating position at the table as well as the dealer seating position.

In some embodiments, the central charging pad 858 occupies or underlies most or all of the playing surface of the EGT and constantly and continuously emits an NFC field that not only transmits data to VDPPCs but also powers the VDPPCs 100 or 150. By way of example, the NFC field can cause the first or second digital displays of enrolled and/or checked out VDPPCs and one or more table displays to show a video broadcast or loop. When the player leaves the table, the video stops, and the card reverts back to a darkened or static image.

In some embodiments, the EGT comprises only the central charging pad 858 as a single, shared wireless power and/or charging place for the entire the table.

While the gaming table system 800 is depicted as having player station gaming devices 312*a-e*, it is to be understood that VDPPCs 100 or 150 may be used in an EGT not having gaming devices 312*a-e* or at a gaming table not having a table gaming server 804 or switch hub 816.

Figure 9:
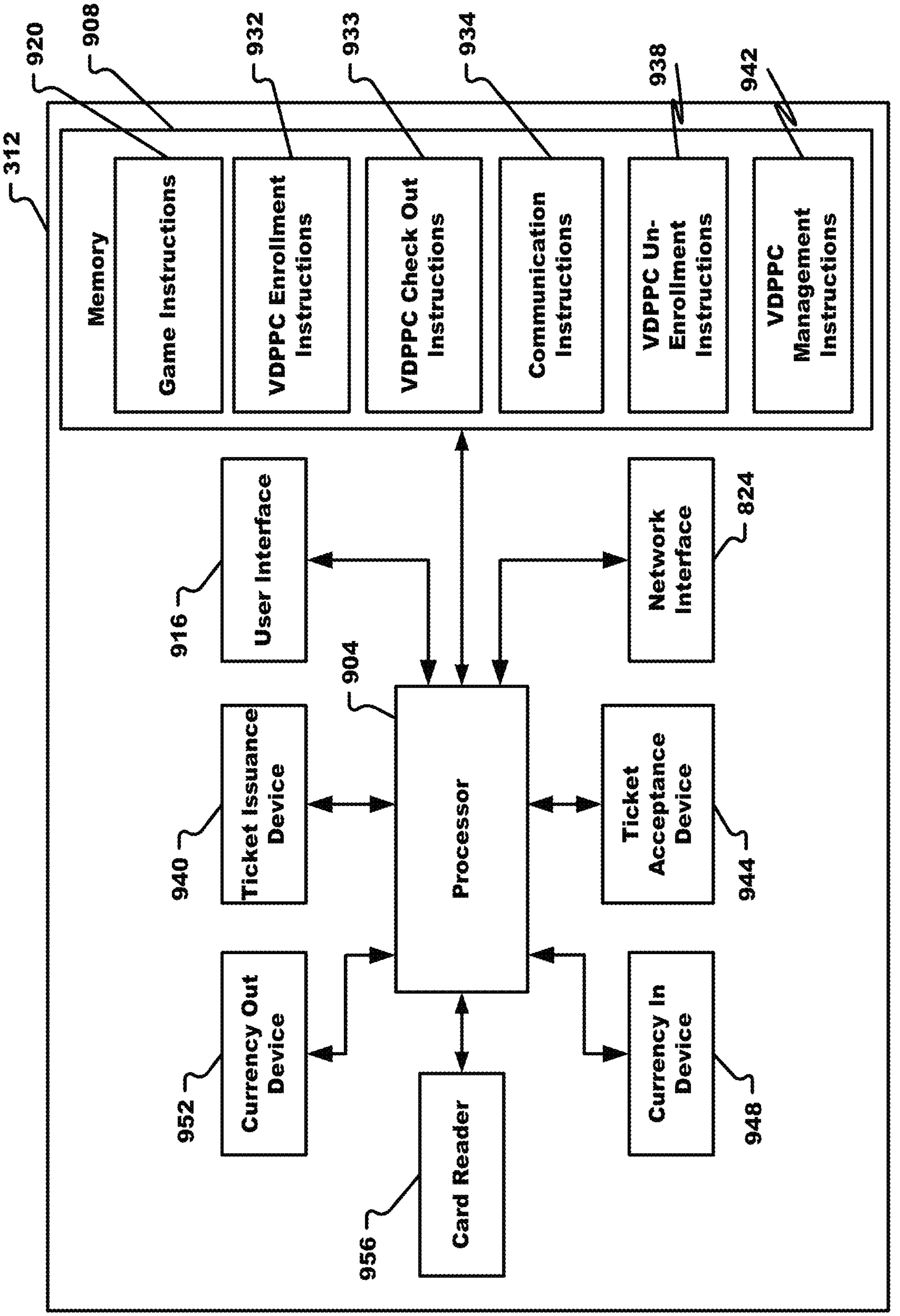
FIG. 9 depicts a gaming device configured for use with VDPPCs in accordance with embodiments of the present disclosure.

With reference to FIG. 9, additional details of the components that may be included in a gaming device 312 or any other gaming device will be described in accordance with at least some embodiments of the present disclosure.

A gaming device 312 may correspond to a portable or non-portable device used for executing a gaming application or multiple different gaming applications without departing from the scope of the present disclosure. Non-limiting examples of a gaming device 312 include an EGM, a VGM, EGT, EGT player station, VR gaming machine, AR gaming machine, a mobile communication device (e.g., a smartphone, laptop, wearable device, etc.), a laptop, a PC, etc. The illustrative gaming device 312 depicted herein may include a support structure, housing or cabinet, which provides support for a plurality of displays, inputs, controls and other features of a conventional gaming machine. In some embodiments, a player 324 plays gaming device 312 while sitting, however, the gaming device 312 is alternatively configured so that a player can operate it while standing or sitting. The illustrated gaming device 312 can be positioned on the floor but can be positioned alternatively (i) on a base or stand, (ii) as a pub-style table-top game (e.g., where the gaming device 312 is at a player station in communication with a central or gaming table server 804 or 316 as shown in FIG. 8 above), (iii) as a stand-alone computational device on the floor of a casino with other stand-alone computational devices, or (iv) in any other suitable manner. The gaming device 312 can be constructed with varying cabinet and display configurations.

The gaming device 312 is shown to include a processor 904, memory 908, a network interface 824, and a user interface 916.

In some embodiments, the processor 904 may correspond to one or many microprocessors, CPUs, microcontrollers, Integrated Circuit (IC) chips, or the like. For instance, the processor 904 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 904 may be provided as a microcontroller, microprocessor, Central Processing Unit (CPU), or plurality of microprocessors that are configured to execute the instructions sets stored in memory 908. In some embodiments, the instruction sets stored in memory 908, when executed by the processor 904, may enable the gaming device 312 to provide game play functionality.

The nature of the network interface 824 may depend upon whether the network interface 824 is provided in cabinet- or player station-style gaming device 312 or a mobile gaming device 312. Examples of a suitable network interface 824 include, without limitation, an Ethernet port, a USB port, an RS-232 port, an RS-485 port, a NIC, an antenna, a driver circuit, a modulator/demodulator, etc. The network interface 824 may include one or multiple different network interfaces depending upon whether the gaming device 312 is connecting to a single gaming network 304 or multiple different types of gaming networks 304. For instance, the gaming device 312 may be provided with both a wired network interface 824 and a wireless network interface 824 without departing from the scope of the present disclosure.

The user interface 916 may include a combination of user input devices and user output devices. For instance, the user interface 916 may include a display screen, speakers, buttons, levers, a touch-sensitive display, or any other device that is capable of enabling player 324 interaction with the gaming device 312. The user interface 916 may also include one or more drivers for the various hardware components that enable player 324 interaction with the gaming device 312.

The memory 908 may include one or multiple computer memory devices that are volatile or non-volatile. The memory 908 may include volatile and/or non-volatile memory devices. Non-limiting examples of memory 608 include Random Access Memory (RAM), Read Only Memory (ROM), flash memory, Electronically-Erasable Programmable ROM (EEPROM), Dynamic RAM (DRAM), etc.

The memory 908 may be configured to store the instruction sets depicted in addition to temporarily storing data for the processor 904 to execute various types of routines or functions. The instruction sets can enable user interaction with the gaming device 312 and game play at the gaming device 312. Examples of instruction sets that may be stored in the memory 908 include a game instruction set 920, VDPPC enrollment instruction set 932, playing card check out instruction set 933, communication instructions 934, VDPPC unenrollment instruction set 938, and VDPPC management instruction set 942. In addition to the instruction sets, the memory 908 may also be configured to store a random number generator or pseudorandom number generator (not shown) that is used by the game instruction set 920, for example, to provide game outputs and shuffle virtual cards. The communication instruction set 934 may enable the gaming device 312 to exchange electronic communications, either directly or indirectly, with a mobile device 328 or the VDPPC 100 or 150, respectively.

In some embodiments, the game instructions 920, when executed by the processor 904, may enable the gaming device 312 to facilitate one or more games of chance and/or skill and produce interactions with the player. In some embodiments, the game instruction set 920 may include subroutines that generate, such as by a random number generator, a playing card parameter (such as a playing card type (e.g., suit) or hierarchical value (e.g., rank) to be rendered by a selected VDPPC 100 or 150, subroutines that present one or more graphics to the player via the user interface 916, subroutines that calculate whether a particular card game wager using VDPPCs 100 or 150 has resulted in a win or loss during the game of chance and/or skill, subroutines for determining payouts for the player in the event of a win during the first game of chance, subroutines for exchanging communications with another device, such as central or table gaming server 316 or 804, and any other subroutine useful in connection with facilitating game play at the gaming device 312.

The VDPPC enrollment instructions 932, when executed by the processor 904, may permit the gaming device 312 or a dealer associated with the gaming device 312 or digital shoe to enroll a selected VDPPC 100 or 150 by associating the selected VDPPC 100 or 150 with a gaming table object, such as a dealer, an identifier of the EGT, and/or a seating position at the EGT, such as at a player station-style gaming device 312. In a non-limiting enrollment example during the process of opening the table, one or more VDPPCs 100 or 150 are associated with the table. The purpose of this enrollment is to prevent the use of VDPPCs 100 or 150 at other tables, or VDPPCs that may be manipulated by a player to display the wrong information. This enrollment process may include associating the serial number or asset number of a VDPPC with the table. The enrollment process may also involve the verification of any software installed on the VDPPC. The enrollment process may also be used to establish a secure communications channel between the VDPPCs and the table gaming server 804 of the dealer. This can include a session key used to secure all later wireless communications between the VDPPCs 100 or 150 and the table gaming server 804 or central gaming server 316 during the lifecycle of the open table. The enrollment could require a physical connection between the table gaming server 504 or digital shoe and each VDPPC 100 or 150, or it may only require a wireless connection, such as NFC, BLE, WiFi, etc.

The VDPPC check out instructions 933, when executed by the processor 904, may permit the gaming device 312 or digital shoe or a dealer associated with the gaming device 312 to check out a selected VDPPC 100 or 150 by associating the selected VDPPC 100 or 150 with a player 324 or player station. In a non-limiting example, as players 324 arrive at a gaming table, he or she will be issued one or more VDPPCs 100 or 150 by the dealer for use during a hand. The dealer may associate those cards with the player and/or table seating position. The dealer can perform this association by scanning each VDPPC 100 or 150 and then using a mouse, keyboard, or other user interface element (such as the main table display 808) of the table gaming server 804 to associate the VDPPCs 100 or 150 with the player's table seat or to note them as issued to a player 324. This information will then be stored in a data store, such as the player profile or playing card database 336 or 332. In one embodiment, the player may be required, or given the option to swipe his or her player tracking card in the card reader 956 or present their mobile device to start a player tracking session at the table.

The VDPPC unenrollment instructions 938, when executed by the processor 904, may permit the gaming device 312 or digital shoe to unenroll enrolled and/or checked out VDPPCs 100 or 150. By way of non-limiting example, at the end of a shift, the dealer may close the table. During the table close process, the dealer may have to account for the VDPPCs enrolled with the table. This may involve a process similar to that used during table enrollment. For instance, the dealer may have to tap to an NFC wireless radio (such as a table or gaming station antenna 850 or 854*a*-*e* or the digital shoe antenna) with each VDPPC 100 or 150 enrolled with the table to un-enroll each VDPPC 100 or 150. In any of the methods discussed herein, the gaming system 300 can use gesture recognition, such as by image processing and imaging devices (e.g., cameras and/or video recorders), to detect player or dealer movements and thereby determine an associated command. If one or more VDPPCs 100 or 150 is not tapped during the process of closing the table, then the dealer will mark, via a dealer interface (such as the main table display 808) the one or more VDPPCs 100 or 150 as missing. This event can be reported to the central or table gaming server 316 or 804 so that the missing VDPPCs 100 or 150 can be tracked and possibly prevented from being used at another table. The process of unenrolling a VDPPC 100 or 150 may also clear out any security information held on the VDPPC 100 or 150, such as connection information, or any security keys negotiated during initial enrollment. Unenrolling could also clear security information related to the VDPPCs associated with the gaming device, gaming table, table server, etc.

The VDPPC management instructions 942, when executed by the processor 904, may permit the gaming device 312 to perform one or more card game commands or operations, such as discarding a card, folding a hand, and determining a winning player at the end of a hand or card game.

The communication instructions 934, when executed by the processor 904, may enable the gaming device 312 to communicate with the central or table gaming servers 316 or 840 and/or mobile device 328 or multiple mobile devices 328 and/or VDPPC 100 or 150 or multiple VDPPCs 100 or 150. In some embodiments, the communication instruction set 934 may include instructions that enable the gaming device 312 to pair with a mobile device 328 or VDPPC 100 or 150 (as the case may be) and establish a communication channel with the mobile device 328 or VDPPC 100 or 150 via the pairing. As an example, the communication instruction set 934 may include instructions that enable NFC, Bluetooth®, WiFi, or other types of communication protocols. It should be appreciated that the communication instruction set 634 may also be updated to reflect when a mobile device 328 or VDPPC 100 or 150 (as the case may be) is paired with the gaming device 312 and such pairing information may include addressing information for the mobile device 328 or VDPPC 100 or 150 and/or identification information associated with the player 324 of the mobile device 328 or VDPPC 100 or 150. Alternatively or additionally, the communication instructions 934 may enable the gaming device 312 to identify a player 324 of the mobile device 328 or associated with a VDPPC 100 or 150. In some embodiments, the communication instructions 934 may be configured to operate or drive the network interface 824 to facilitate direct or indirect communications with a mobile device 328 or VDPPC 100 or 150 (as the case may be).

While shown as separate instruction sets, it should be appreciated that any of the playing card enrollment or unenrollment, playing card check out, sensory feedback, and/or playing card management instructions set 942 may correspond to a subroutine of the game instruction set 620 without departing from the scope of the present disclosure.

The gaming device 312 is further shown to include a ticket issuance device 940, a ticket acceptance device 944, a currency in device 948, a currency out device 952, and a card reader 956. The ticket issuance device 940 may be configured to print physical tickets, vouchers, or the like. The ticket acceptance device 944 may be configured to receive, scan, and/or recognize information from an input physical ticket, voucher, or cash. In some embodiments, the ticket issuance device 940 and ticket acceptance device 944 may operate in concert with a common piece of hardware that both accepts and produces physical tickets, vouchers, or the like. Tickets or vouchers printed by ticket issuance device 940 and recognizable by the ticket acceptance device 944 may correspond to physical lottery tickets, casino vouchers, paper coupons, and the like. Alternatively or additionally, the ticket issuance device 940 and/or ticket acceptance device 944 may be connected to ticket or cash reading hardware. In such an embodiment, the ticket issuance device 940 and ticket acceptance device 944 may operate as a driver and/or firmware component for the card reader.

Similarly, the currency in device 948 and currency out device 952 may include or operate in concert with a coin slot or any other type of coin delivery mechanism. The currency in device 948 and currency out device 952 may include hardware, drivers, or firmware that facilitate receiving or distributing tokens, coins, chips, etc. In some embodiments, the currency in device 948 may be configured to determine an amount of coins (an amount of tokens, an amount of chips, etc., input at the coin slot and convert the values into credits for playing games with the game instruction set 920. The currency out device 952 may correspond to hardware and software configured to output coins, tokens, chips, etc. if a player decides to cash out or convert playing credits back into coins, tokens, or chips, etc.

The card reader 956 may include hardware and/or software configured to read or accept any type of card, VDPPC 100 or 150, or portable credential (e.g., NFC, Bluetooth, WiFi, etc.). In some embodiments, the card reader 956 may include hardware and/or software that enable contactless reading of a card, token, VDPPC 100 or 150, or portable credential. In some embodiments, the card reader 956 may include hardware and/or software that enable contact-based reading of a card, token, VDPPC 100 or 150, or portable credential (e.g., magstripe, chip reader, electrodes, card-receiving slot, etc.). It should be appreciated that the card reader 956 may be configured to receive and reader a card or portable credential, token, or VDPPC 100 or 150 in any type of format (e.g., portable plastic card, magstripe card, key fob, etc.). It should also be appreciated that the card reader 956 may be configured to write information or data onto a card or portable credential or VDPPC 100 or 150. Furthermore, in some embodiments, the card reader 956 may be configured to read a player loyalty card in the form of a plastic credit-card shaped credential. In some embodiments, the card reader 956 may enable communications with a loyalty application operating on a player's mobile device 328. In some embodiments, the VDPPC 100 or 150 acts as a type of card or portable credential and wirelessly communicates to the gaming device 312 the identity, credential, and/or account information of the player. In some embodiments, the VDPPC 100 or 150 acts as a type of card or portable credential and wirelessly communicates to the network interface 824 or card reader 956 gaming device 312 game credits, thereby allowing the player to load game credits onto the gaming device 312.

Figure 10:
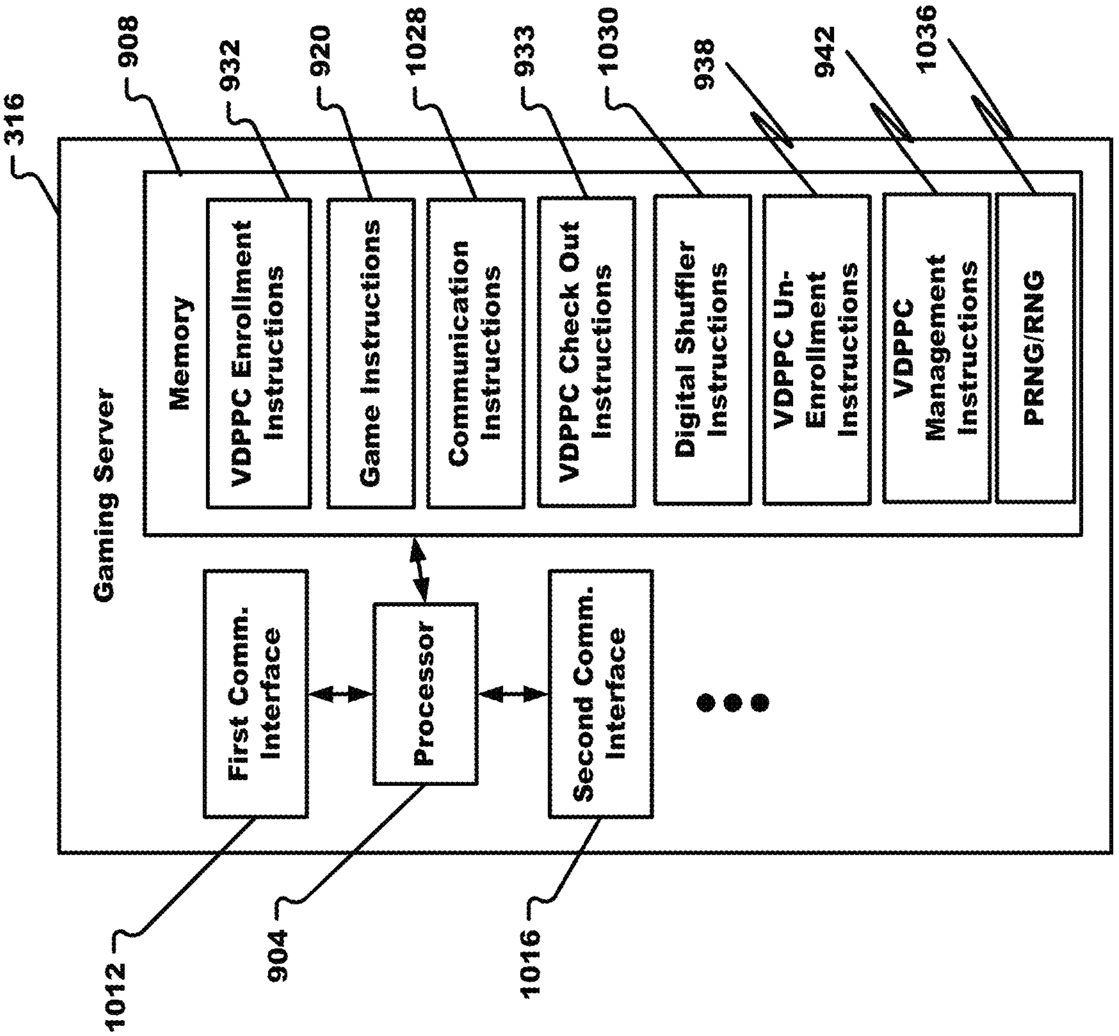
FIG. 10 depicts a gaming server configured for use with VDPPCs in accordance with embodiments of the present disclosure.

With reference now to FIG. 10, additional details of a central or table gaming server 316 or 804 (hereinafter referred to as "gaming server") will be described in accordance with embodiments of the present disclosure. The gaming server 316 or 804 is shown to include a processor 904, memory 908, and a plurality of communication interfaces 1012, 1016. These resources may enable functionality of the gaming server 316 or 804 as will be described herein. For instance, the first communication interface 1012 may provide the gaming server 316 or 804 with the ability to send and receive communication packets or the like over the gaming network 304. The first communication interface 1012 may be provided as a network interface card (NIC), a network port, drivers for the same, and the like. Communications between the components of the gaming server 316 or 804 and other devices connected to the gaming network 304 may all flow through the first communication interface 1012.

The gaming server 316 or 804 is also shown to include a second communication interface 1016 that facilitates communications with the mobile devices 328 via the communication network 308. In some embodiments, the second communication interface 1016 may be similar to the first communication interface 1012. For instance, the second communication interface 1016 may also include a NIC, network port, drivers for the same, and the like. In some embodiments, the first and second communication interfaces 1012, 1016 may be provided in a single physical component or set of components, but may correspond to different communication channels (e.g., software-defined channels, frequency-defined channels, amplitude-defined channels, etc.) that are used to send/receive different communications to the mobile devices 328 as compared to the gaming devices 312. In some embodiments, a single communication interface may facilitate communications with both the gaming devices 312 and mobile devices 328, especially if both devices communicate with the gaming server 316 or 804 via a common network.

The processor 904 may correspond to one or many computer processing devices. The processor 904 may be configured to execute one or more instruction sets stored in memory 908. Upon executing the instruction sets stored in memory 908, the processor 904 enables various authentication functions of the gaming server 316 or 804.

The memory 908 may include any type of computer memory device or collection of computer memory devices. The illustrative instruction sets that may be stored in memory 908 include, without limitation, a game instruction set 920, digital shuffler instruction set 1030, VDPPC enrollment instructions 932, VDPPC check out instructions 933, communication instructions 1028, pseudorandom number generator or random number generator (PRNG/RNG) 1036, VDPPC unenrollment instructions 938, and VDPPC management instructions 942. Functions of the gaming server 316 or 804 enabled by these various instruction sets will be described in further detail herein. It should be appreciated that the instruction sets depicted in FIG. 10 may be combined (partially or completely) with other instruction sets or may be further separated into additional and different instruction sets, depending upon configuration preferences for the gaming server 316 or 804. Said another way, the particular instruction sets depicted in FIG. 10 should not be construed as limiting embodiments described herein.

Although not depicted, the gaming server 316 or 804 may include instructions that enable a processor to store data into the player profile database 336 and/or playing card database 332 and retrieve information from the databases 336, 332. Alternatively or additionally, the player profile database 336 or data stored therein may be stored internal to the gaming server 316 or 804 (e.g., within the memory of the server 316 or 804 rather than in a separate database). Alternatively or additionally, the playing card database 332 or data stored therein may be stored internal to the gaming server 316 or 804.

The operations of the game instruction set 920, VDPPC enrollment instructions 932, VDPPC check out instructions 933, VDPPC unenrollment instructions 938, and VDPPC management instructions 942 have been discussed above with respect to FIG. 9.

The PRNG/RNG 1036 generate a sequence of numbers or symbols that cannot be reasonably predicted better than b random chance. The particular outcome sequence can contain some patterns detectable in hindsight but unpredictable to foresight. True random number generators can be hardware random number generators (HRNGS) that generate random numbers, wherein each generation is a function of the current value of a physical environment's attribute that is constantly changing in a manner that is practically impossible to model. In contrast, random number generations done by pseudorandom number generators (PRNGs) that generate numbers that only look random but are in fact pre-determined these generations can be reproduced simply by knowing the state of the PRNG. The series of values generated by such algorithms is generally determined by a fixed number called a seed.

The digital shuffler instruction set 1030 identify digital shuffler events and cause the PRNG/RNG 1036 to generate a new virtual deck and update the virtual deck database 336 accordingly. As noted, the digital shuffling event can be in response to dealer command, advancement of the first flag with respect to the second flag, and other gaming events.

The communication instruction set 1028, when executed by the processor 904, may enable the gaming server 316 or 804 to communicate with the other devices in the system 300. For instance, the communication instruction set 1028 may be configured to modulate/demodulate communications exchanged over the gaming network 304 and/or communication network 308, determine timings associated with such communications, determine addresses associated with such communications, etc. In some embodiments, the communication instruction set 1028 may be configured to allocate communication ports of the gaming server 316 or 804 for use as either the first or second communication interface 1012, 1016 as appropriate. The communication instruction set 1028 may further be configured to generate messages in accordance with communication protocols used by the networks 304, 308 and to parse messages received via the networks 304, 308.

Figure 11:
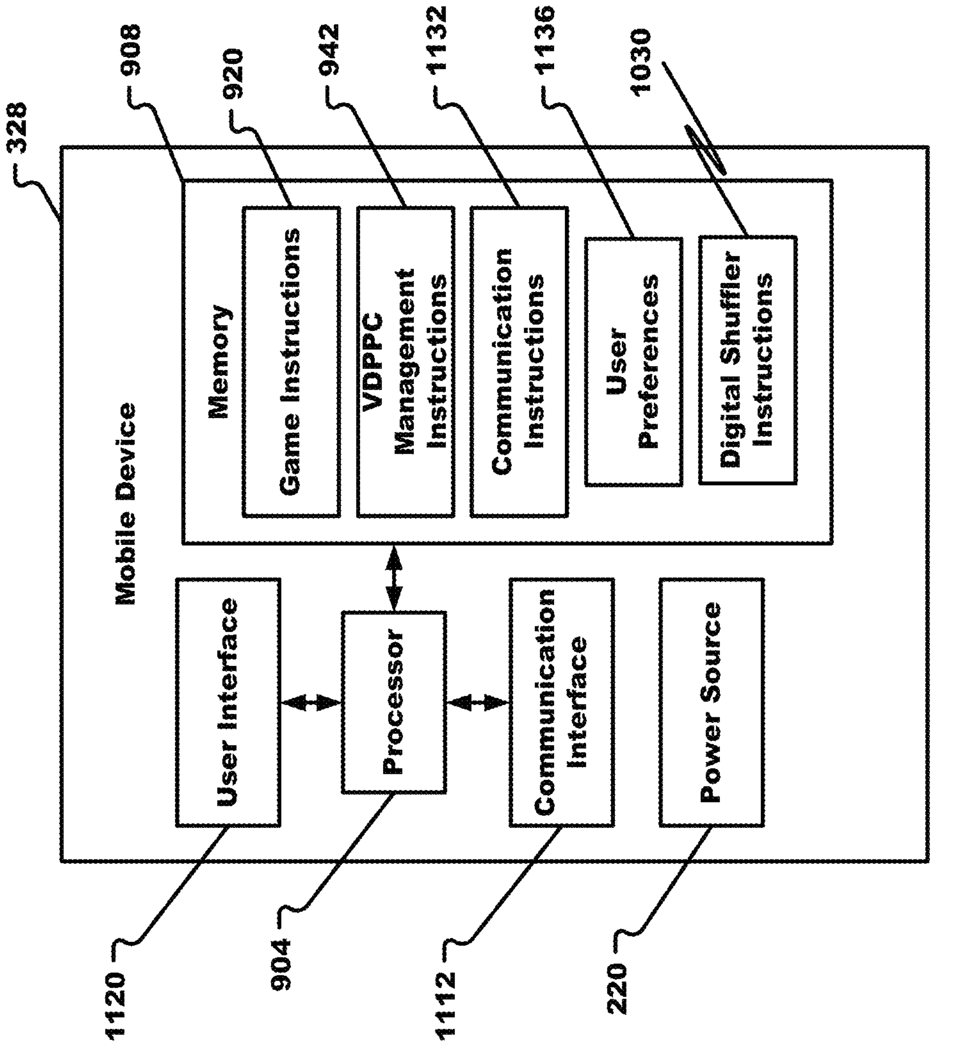
FIG. 11 depicts a mobile device configured for use with VDPPCs in accordance with embodiments of the present disclosure.

With reference now to FIG. 11, additional details of the components that may be included in a mobile device 328 will be described in accordance with at least some embodiments of the present disclosure. The mobile device 328 is shown to include a processor 904, memory 908, a communication interface 1112, power source 220, and a user interface 1120. The processor 904 may be configured to execute one or more instruction sets stored in memory 908. In some embodiments, the instruction sets stored in memory 908, when executed by the processor 904, may enable the mobile device 328 to provide game play functionality, interact with gaming devices 312, pair with gaming devices 312, pair with VDPPCs 100 or 150, or any other type of desired functionality.

The communication interface 1112 may be similar or identical to the network interface 824 and/or communication interfaces 1012, 1016 depicted and described herein. The nature of the communication interface 1112 may depend upon the type of communication network 308 for which the mobile device 328 is configured. Examples of a suitable communication interfaces 1112 include, without limitation, a WiFi antenna and driver circuit, a Bluetooth antenna and driver circuit, a cellular communication antenna and driver circuit, a modulator/demodulator, etc. The communication interface 1112 may include one or multiple different network interfaces depending upon whether the mobile device 328 is connecting to a single communication network 308 or multiple different types of communication networks. For instance, the mobile device 328 may be provided with both a wired communication interface 1112 and a wireless communication interface 1112 without departing from the scope of the present disclosure.

The user interface 1120 may include a combination of user input and user output devices. For instance, the user interface 1120 may include a display device, a microphone, a speaker, a haptic feedback device, a light, a touch-sensitive display, a button, or a combination thereof. The user interface 1120 may also include one or more drivers for the various hardware components that enable user interaction with the mobile device 328.

The memory 908 may be configured to store instruction sets that enable user interaction with the mobile device 328 and that enable game play at the mobile device 328. Examples of instruction sets that may be stored in the memory 908 include a game instruction set 620, VDPPC management instruction set 942, communication instruction set 1132, and digital shuffler instruction set 1030. In addition to the instruction sets, the memory 908 may also be configured to store data that is useable by the various instruction sets. Examples of such data that may be stored in memory 908 include, without limitation user preferences 1136.

The operations of the game instruction set 920, VDPPC management instruction set 942, and digital shuffler instructions 1030 have been discussed above with respect to FIGS. 9 and 10.

The communication instruction set 1132, when executed by the processor 904, may enable the mobile device 328 to communicate via the communication network 308. In some embodiments, the communication instruction set 1132 may be similar or identical to the communication instruction set 1000 and may be particular to the type of communication network 308 used by the mobile device 328. As an example, the communication instruction set 1132 may be configured to enable cellular, WiFi, and/or Bluetooth communications with other devices. The communication instruction set 1132 may follow predefined communication protocols and, in some embodiments, may enable the mobile device 328 to remain paired with a gaming device 312 or VDPPC 100 or 150 as long as the mobile device 328 is within a predetermined proximity (e.g., 20-30 feet, an NFC communication range, or a Bluetooth communication range) and paired with the gaming device 312.

In one embodiment, the communication instruction set 1132 allows the player 324 to use his or her mobile device 328 to receive and interact with VDPPCs 100 or 150 given to the player by the dealer/table through the playing card management instructions 942 loaded into the memory 908 of the player's mobile device 328. This will require the player to associate the mobile device 328 with the table when he or she sits down, which is discussed in copending U.S. patent application Ser. No. 15/992,424, filed May 30, 2018, entitled "Cardless Login at Table Games" and Ser. No. 14/924,391, filed Oct. 27, 2015, entitled "Project EGM Display onto Mobile Device"). The player 324 would then interact with the mobile device 328 to view his or her VDPPC dealt cards, hold cards, discard cards, or fold during the current game.

The user preferences 1136 may correspond to gaming or wager preferences that are desired by the player 324 of the mobile device 328. In some embodiments, where the mobile device 328 is not owned by the player 324, but rather is loaned to the player 324 by a casino operator, the user preferences 1136 may include default preferences defined by the casino as well as other preferences that are defined by the player 324 after receiving the mobile device 328. The user preferences 1136 may alternatively or additionally relate to communication preferences that drive operation of the communication instruction set 1132.

By way of illustration, player 324 can, by user preferences 1136, select the color or pattern rendered by the first or second digital displays 154 or 116 of the VDPPC 100 or 150. Alternatively or additionally, the user preferences 1136 can select the content or media or multimedia to be displayed by the first or second digital displays 154 or 116. For instance, the user preferences can be communicated to the VDPPC 100 or 150 by a mobile device 328, such as a mobile phone, smart watch, or Augmented Reality (AR) device. The player 324 can choose the color or color pattern via the mobile device 328, which then wirelessly informs the gaming server 316 or 804 or gaming device 312 about the selection.

Figure 12:
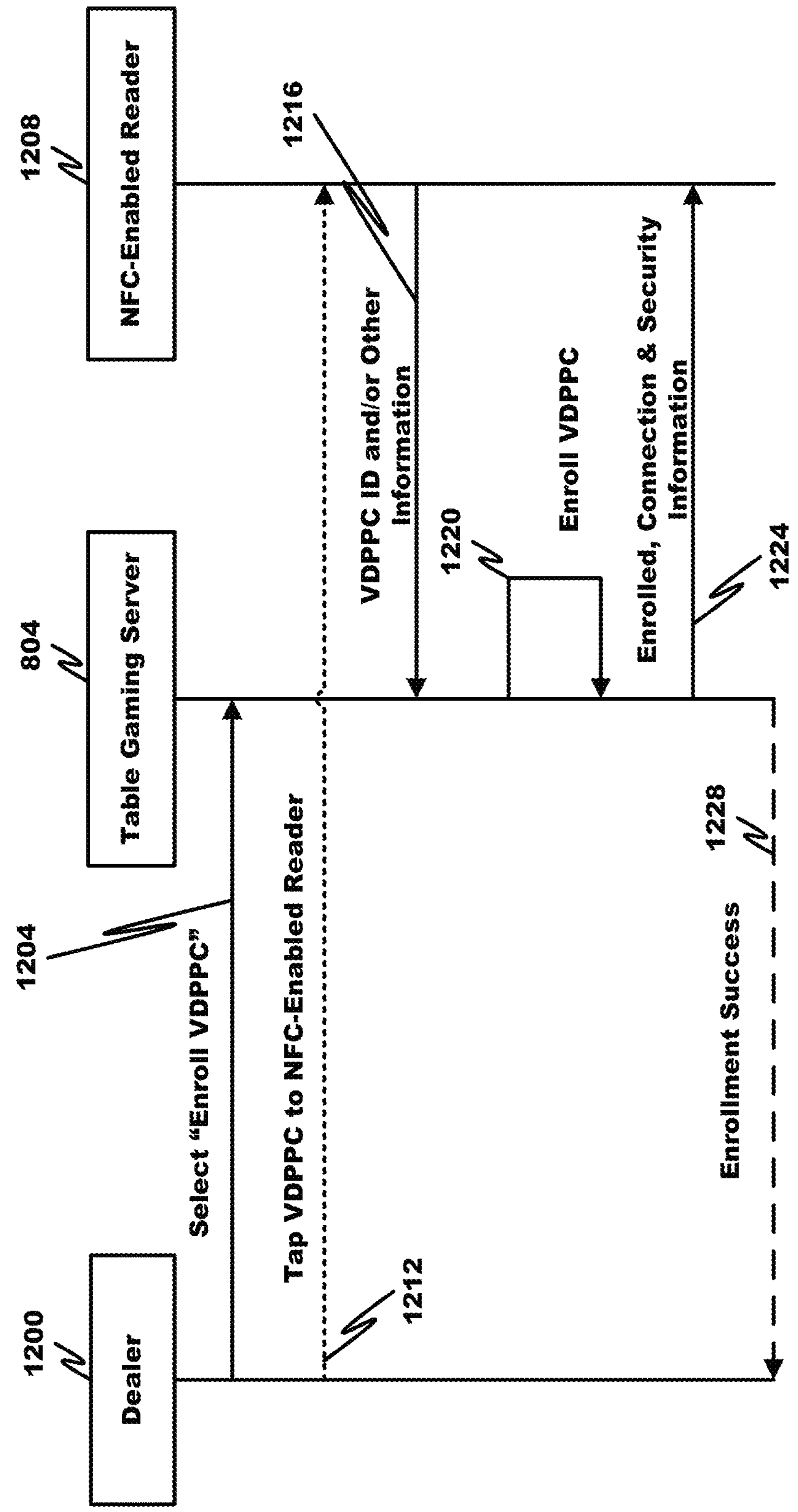
FIG. 12 depicts signal flows for VDPPC enrollment in accordance with embodiments of the present disclosure.
Figure 19:
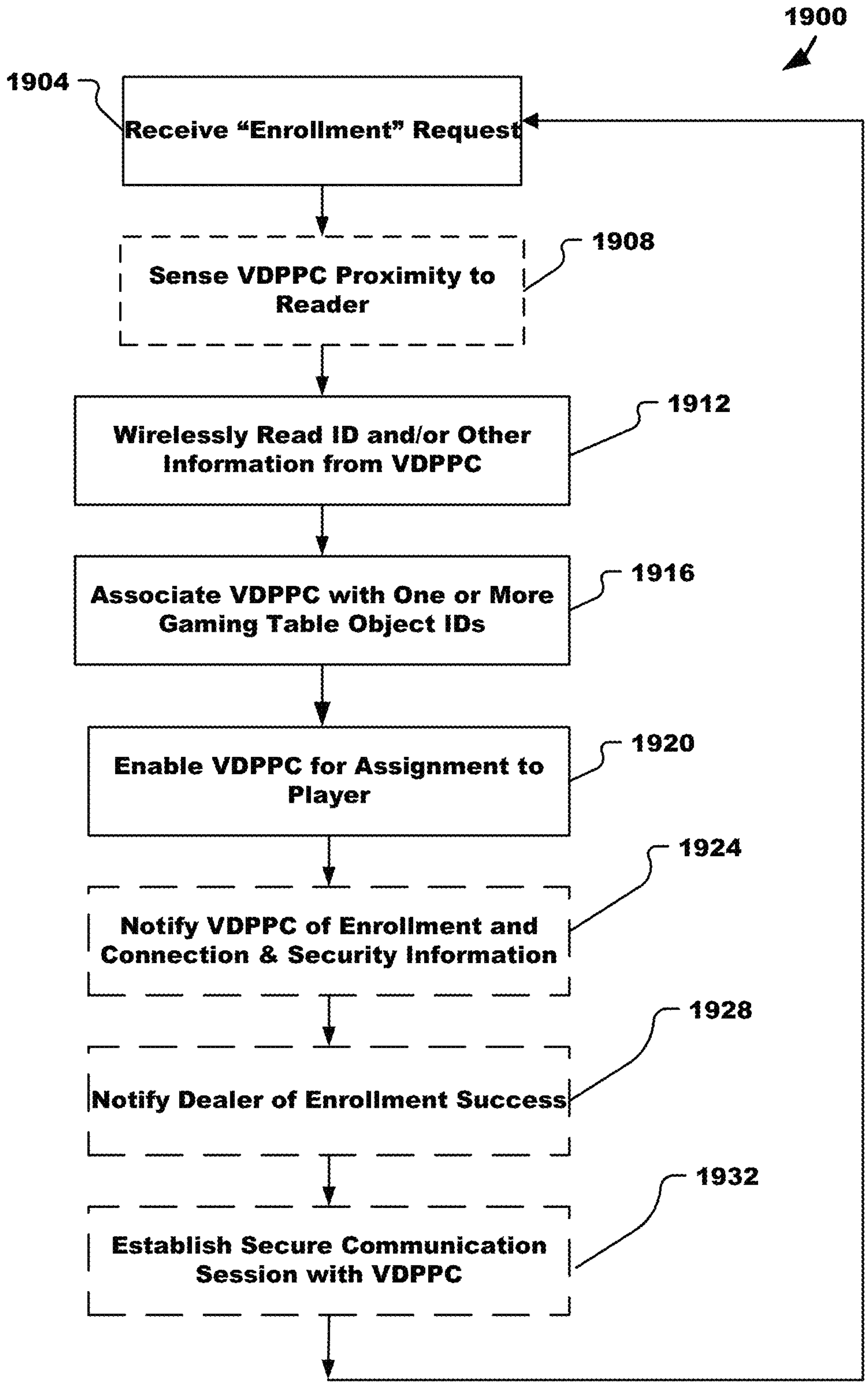
FIG. 19 is a flow chart illustrating VDPPC enrollment logic in accordance with embodiments of the present disclosure.

With reference now to FIGS. 12 and 19, various operations of a VDPPC 100 or 150, gaming device 312, table gaming server 504, central gaming server 316, digital shoe 350, and/or mobile device 328 will be described in accordance with at least some embodiments of the present disclosure.

The method 1900 begins when the table gaming server 804 or central gaming server 316 or digital shoe 350 receives an "enroll VDPPC" selection 1204 from a dealer 1204 (step 1904). During the process of opening a gaming table, one or more VDPPCs 100 or 150 are associated with the gaming table. The purpose of enrollment is to prevent the use of VDPPCs 100 or 150 at other gaming tables or VDPPCs 100 or 150 that may be manipulated by a player 324 to display wrong or incorrect information.

The method 1900 may continue by the table gaming server 804 or central gaming server 316 sensing VDPPC proximity to a Near Field Communication ("NFC")-enabled reader 1208 (optional step 1908). While any technique may be used to sense proximity of the VDPPC to be enrolled to the NFC-enabled reader 1208, the dealer in some embodiments taps 1212 the VDPPC 100 or 150 to the NFC-enabled reader 1208. Other non-contact methods can be employed, such as placement of the VDPPC 100 or 150 within a selected distance or range of distances from the NFC-enabled reader 1208.

The method 1900 can continue by the NFC-enabled reader 1208 wirelessly reading 1216 the VDPPC ID and/or other VDPPC information 290 from the memory 244 of the VDPPC 100 or 150 (step 1912). While the example is discussed with reference to the NFC communication protocol, it is to be understood that the wireless exchange may be done using any suitable wireless protocol, such as Bluetooth Low Energy ("BLE"), Wi-Fi, and the like. In some embodiments, a contact method is employed to exchange VDPPC information, such as a physical connection between the table gaming server 804 or central gaming server 316 and the selected VDPPC. In some embodiments, the VDPPC ID is a serial number or asset number of a VDPPC. In some embodiments, the VDPPC ID is generated by a security algorithm, such as a key derivation function, from a software and/or hardware image and/or state information of the VDPPC. The VDPPC information may include hardware or software configuration, specification, or requirement information to be used by the gaming system 300 in verifying selected hardware and/or software installed on the VDPPC 100 or 150.

The method 1900 may continue by the table gaming server 804 or central gaming server 316 associating or enrolling the VDPPC ID with one or more gaming table object IDs and updating the associated table game object IDs and check out & enrollment information fields 744 and 752 in the VDPPC database 332 (step 1916 and operation 1220). In some embodiments, the enrollment process may include associating a serial number or asset number of a VDPPC with an identifier of a gaming table. The enrollment process may also involve the verification of any hardware and/or software installed on the VDPPC as a precondition to successful enrollment.

The method 1900 may continue by the gaming system 300 enabling the selected VDPPC for assignment to a player 324 (step 1920). In some embodiments, this occurs when the VDPPC ID is not concurrently enrolled at a different gaming table, is not flagged in memory as being ineligible for enrollment (or stated differently is indicated as being eligible for enrollment), and is verified successfully.

The method 1900 may continue by the gaming system 300 notifying 1224 the selected VDPPC of enrollment and connection and security information (optional step 1924). The enrollment process may also be used to establish a secure communications channel between the selected VDPPC to be enrolled and the table gaming server 804 or central gaming server 316. This secure communications establishment can include generating and/or exchanging a session key to be used to secure all later wireless communications between the selected VDPPC and the table gaming server 804 or central gaming server 316 during the lifecycle of the open table or a particular card game.

The method 1900 can continue by the gaming system 300 notifying 1228 the dealer of enrollment success (optional step 1932), such as by displaying suitable notification via the main table display 808 of the EGT 800.

The method 1900 can continue by the gaming system 300 establishing a secure communication session with the selected, now successfully enrolled, VDPPC 100 or 150 (optional step 1928).

Figure 13:
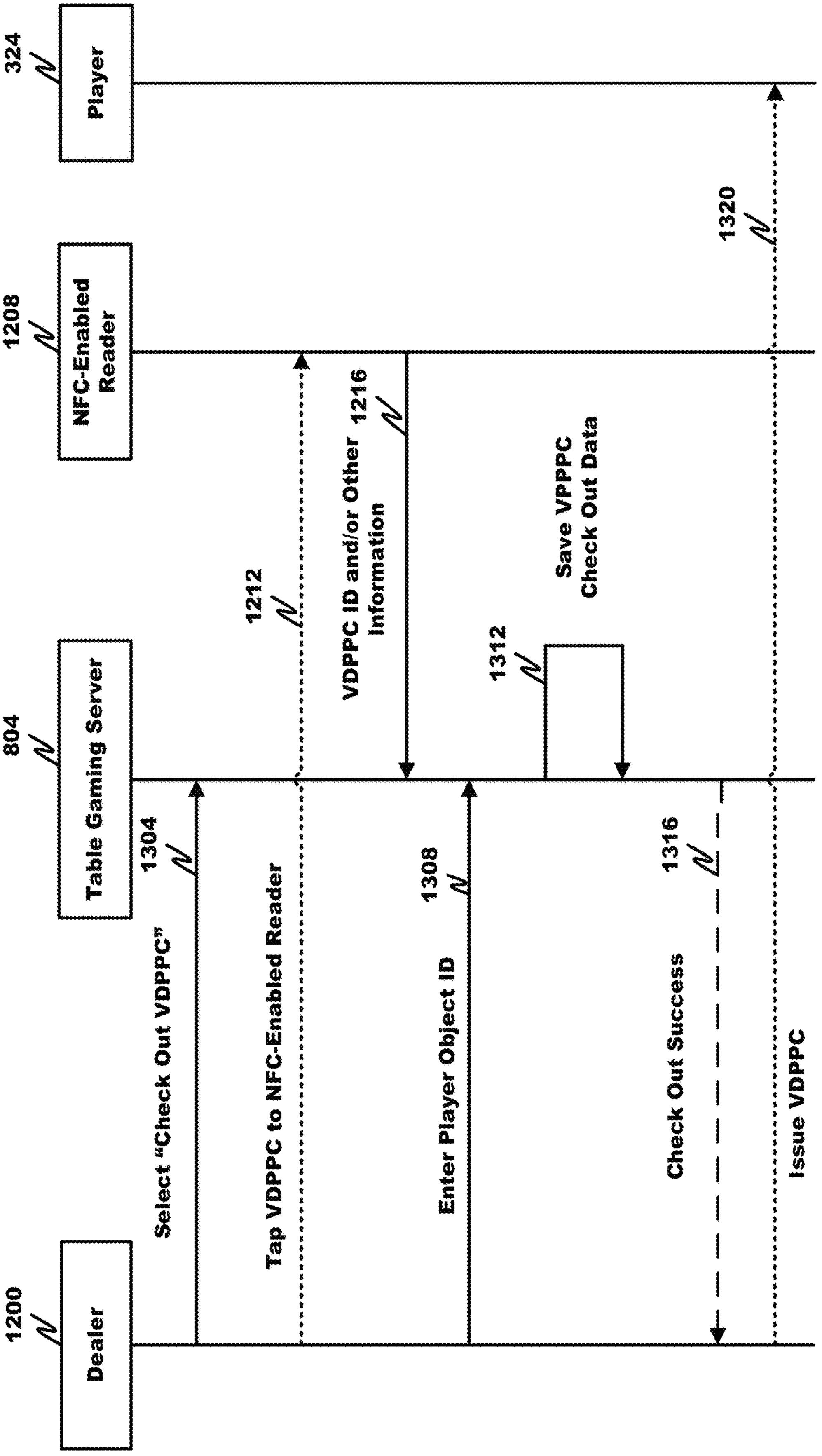
FIG. 13 depicts signal flows for VDPPC check out in accordance with embodiments of the present disclosure.
Figure 20:
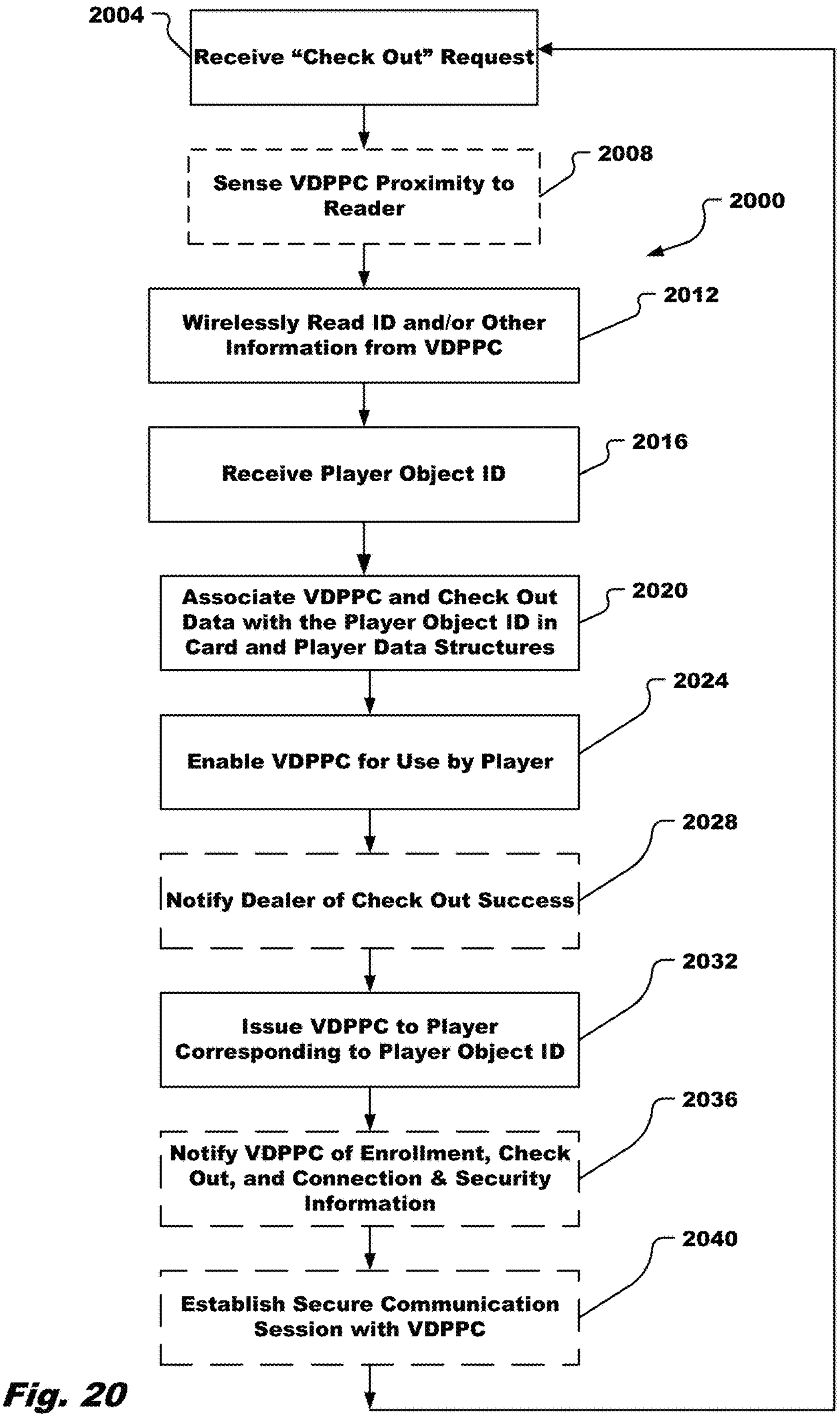
FIG. 20 is a flow chart illustrating VDPPC check out logic in accordance with embodiments of the present disclosure.

With reference now to FIGS. 13 and 20, various operations of a VDPPC 100 or 150, gaming device 312, table gaming server 804, central gaming server 316, digital shoe 350, and/or mobile device 328 will be described in accordance with at least some embodiments of the present disclosure.

The method 2000 begins when a table gaming server 804 or central gaming server 316 or digital shoe 350 receives a "check out" request 1304 from a dealer 1200 (step 2004). As players arrive at the table, they will be issued one or more VDPPCs 100 or 150 by the dealer for use during a hand.

The method 2000 can continue by sensing a VDPPC in proximity to the NFC-enabled reader (step 2008). While any technique may be used to sense proximity of the VDPPC to be checked out to the NFC-enabled reader 1208, the dealer 1200 or player 324 in some embodiments taps 1212 the VDPPC 100 or 150 to the NFC-enabled reader 1208.

The method 2000 can continue by the NFC-enabled reader 1208 wirelessly reading 1216 the VDPPC ID and/or other VDPPC information 290 from the memory 244 of the VDPPC 100 or 150 (step 2012).

The method 2000 can continue by the gaming system 300 receiving the player object ID of the player 324 to whom the dealer desires to assign the selected VDPPC 100 or 150. While FIG. 13 shows the dealer 1200 inputting or entering 1308 the player object ID, it is to be understood that the player object ID can be input by the player, obtained by the NFC-enabled reader 1208 wirelessly reading a physical player tracking card in the possession of the player 324, obtained from a mobile device 328 associated with the player 324, and other techniques. In some embodiments, the dealer may associate the selected VDPPC 100 or 150 with the player 324, or seating position of the player 324. The dealer could perform this association by scanning each VDPPC and then using a mouse, keyboard, or other user interface element of the table gaming server 804 to associate the VDPPCs 100 or 150 with the player's table seat or to note them as issued to a player.

The method 2000 can continue by the gaming system 300 associating the VDPPC and check out data with the player object ID by updating the assigned table game object IDs and assigned VDPPC IDs fields 744 and 724 and assigned player ID and check out & enrollment information fields 748 and 752 in the player profile and playing card databases 336 and 332, respectively (step 2020 and operation 1312). In some embodiments, the VDPPC and check out data is stored in a data store, such as one or more of the databases 332 and 336, in the table gaming server 804, or in a data store or database in a linked table management system maintained at the central gaming server 316. In some embodiments, the player 324 may be required, or given the option to swipe his or her player tracking card, or present his or her mobile device 328 to start a player tracking session at the table.

The method 2000 may continue by the gaming system 300 enabling the selected VDPPC for assignment to a player 324 (step 2024). In some embodiments, this occurs when the VDPPC ID is not concurrently checked out by a different player, is not flagged in memory as being ineligible for check out by a player (or stated differently is indicated as being eligible for player check out), and is verified successfully.

The method 2000 can continue by the gaming system 300 notifying 1316 the dealer 1200 of check out success (optional step 2028), such as by displaying suitable notification via the main table display 808 of the EGT 800.

The method 2000 can continue by the dealer 1200 issuing or delivering 1320 the VDPPC to the player 324 corresponding to the player object ID (optional step 2032).

The method 2000 can continue by the gaming system 300 notifying the selected VDPPC 100 or 150 of enrollment, check out (e.g., player object ID of the player 324 to whom the selected VDPPC is checked out), and/or connection and security information (optional step 2036).

The method 2000 can continue by the gaming system 300 establishing a secure communication session with the selected, now successfully checked out, VDPPC 100 or 150 (optional step 2040).

Figure 14:
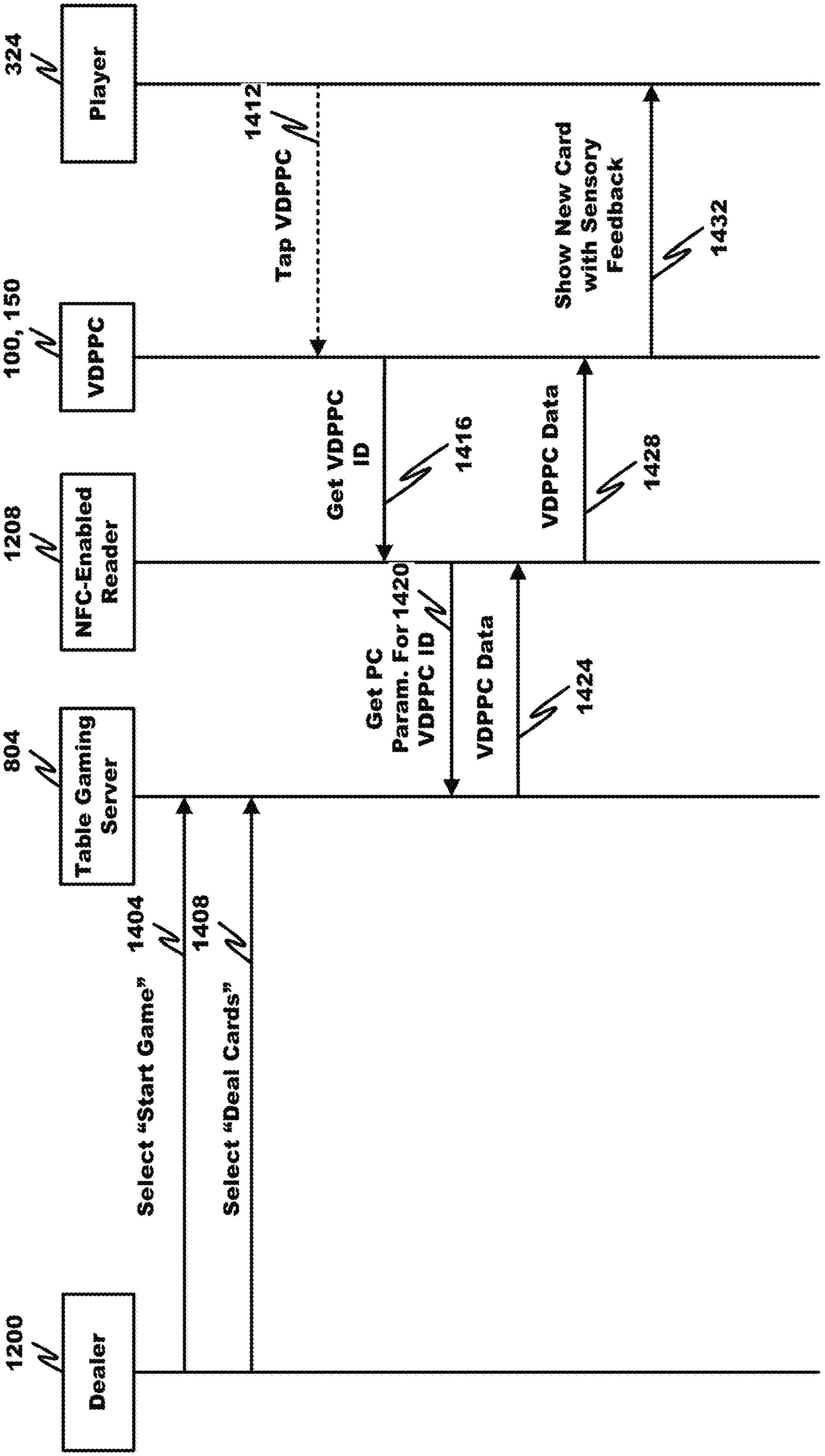
FIG. 14 depicts signal flows for VDPPC game play in accordance with embodiments of the present disclosure.
Figure 22:
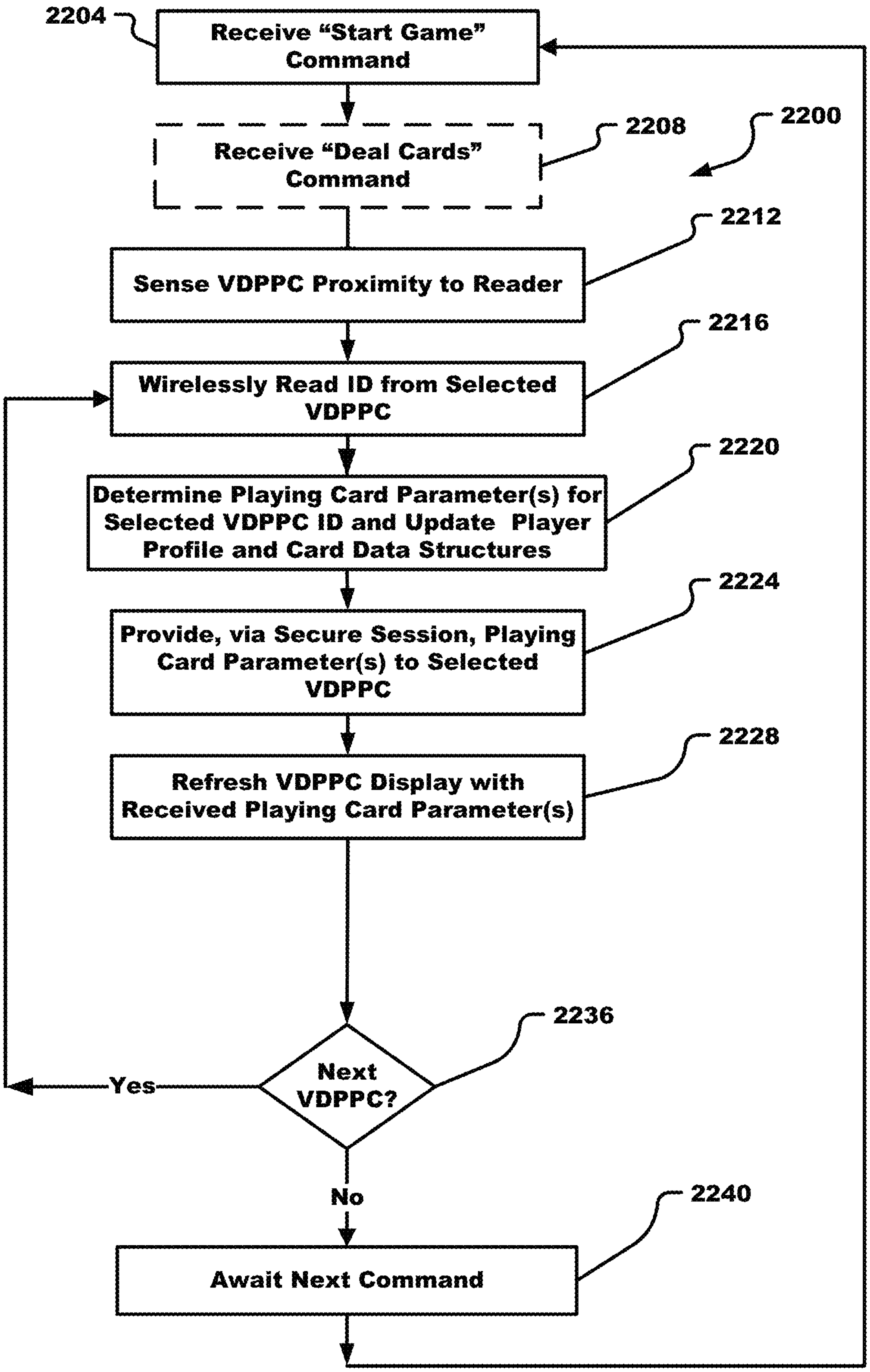
FIG. 22 is a flow chart illustrating VDPPC game play logic in accordance with embodiments of the present disclosure.

With reference now to FIGS. 14 and 22, various operations of a VDPPC 100 or 150, gaming device 312, table gaming server 804, central gaming server 316, digital shoe 350, and/or mobile device 328 will be described in accordance with at least some embodiments of the present disclosure.

The method 2200 begins when a table gaming server 804 or central gaming server 316 or digital shoe 350 receives a "start game" request 1404 from a dealer 1200 (step 2204) and in optional step 2208 a "deal cards" request 1408 from the dealer 1200 (step 2208). As players 324 play at the table, the gaming system 300 needs to control the issued VDPPCs 100 or 150 to participating players 324 as part of a game. In one embodiment, especially when the VDPPCs 100 or 150 are powered by their own power source, a wireless communications channel would be constantly established between a communications device of the table and the VDPPCs 100 or 150 held by each player 324. The communications channel can be established at any time, such as in steps 1932 (FIG. 19) or 2040 (FIG. 20).

The method 2200 can continue by sensing a selected VDPPC 100 or 150 in proximity to the NFC-enabled reader (step 2212). The VDPPC 100 or 150 can be positioned in proximity to the NFC-enabled reader 1208 by the dealer 1200 or a player 324 associated with the selected VDPPC 100 or 150. While any technique may be used to sense proximity of the VDPPC 100 or 150 to be checked out to the NFC-enabled reader 1208, the dealer 1200 or player 324 in some embodiments taps 1412 the VDPPC 100 or 150 to the NFC-enabled reader 1208.

In response to sensing VDPPC proximity, the NFC-enabled reader 1208 reads 1416 the VDPPC ID from the selected VDPPC 100 or 150 and provides the VDPPC ID to the table gaming server 804 with a request 1416 from the selected VDPPC 100 or 150 and a further request 1420 from the NFC-enabled reader 1208 to get a playing card parameter for the VDPPC 100 or 150 associated with the VDPPC ID.

The method 2200 can continue in a value assignment event by determining one or more playing card parameters for the selected VDPPC ID, updating the card parameter information field 764 in the playing card database 332 and the associated VDPPC ID field 654, associated table game object ID field 658, and status field 652 in the virtual deck database 336 for the virtual card 604 corresponding to the one or more playing card parameters, to reflect the determined one or more playing card parameters, and providing, via the secure session, the determined one or more playing card parameters to the selected VDPPC 100 or 150 (step 2224 and VDPPC data signals 1424 and 1428).

The playing card parameter(s) can be determined by a number of techniques. In some embodiments, the table gaming server 804 or digital shoe 350 can automatically deal cards out to each player's video display programmable playing cards, such as by determining the parameter(s) using a random number generator. This determination can be done on a VDPPC-by-VDPPC basis or for multiple VDPPCs in advance. As shown in FIG. 6, a virtual deck of virtual cards 604, each differing sets of playing card parameters, would be generated, with each virtual card (and corresponding set of playing card parameters) having a different queue position in the virtual deck and, as in a physical deck of cards, a set of playing card parameters at a selected queue position in the deck (e.g., at the head or end of the queue) would be "drawn" from the virtual deck and assigned to the selected VDPPC. This would be tracked by movement of the first flag 612 progressively and sequentially through the virtual deck as virtual cards are assigned to VDPPCs.

In another embodiment, the player may place his or her VDPPC 100 or 150 in a certain location, such as a central location on the table, or on a location in front of the individual player 324, to be dealt the card or cards to be transferred to the VDPPC 100 or 150 held by the player 324.

Figure 21:
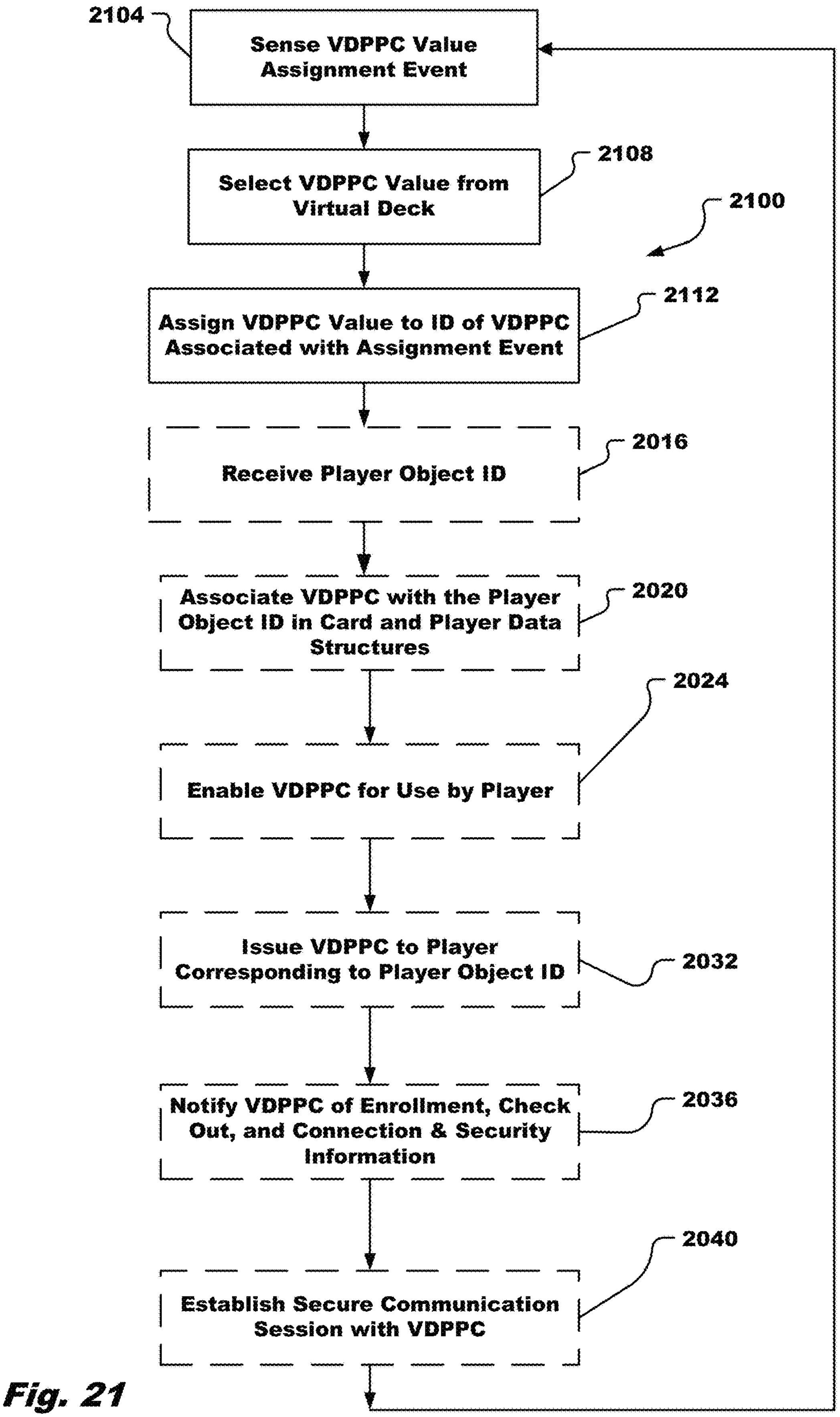
FIG. 21 is a flow chart illustrating VDPPC and digital shoe interaction logic in accordance with embodiments of the present disclosure.
Figure 24:
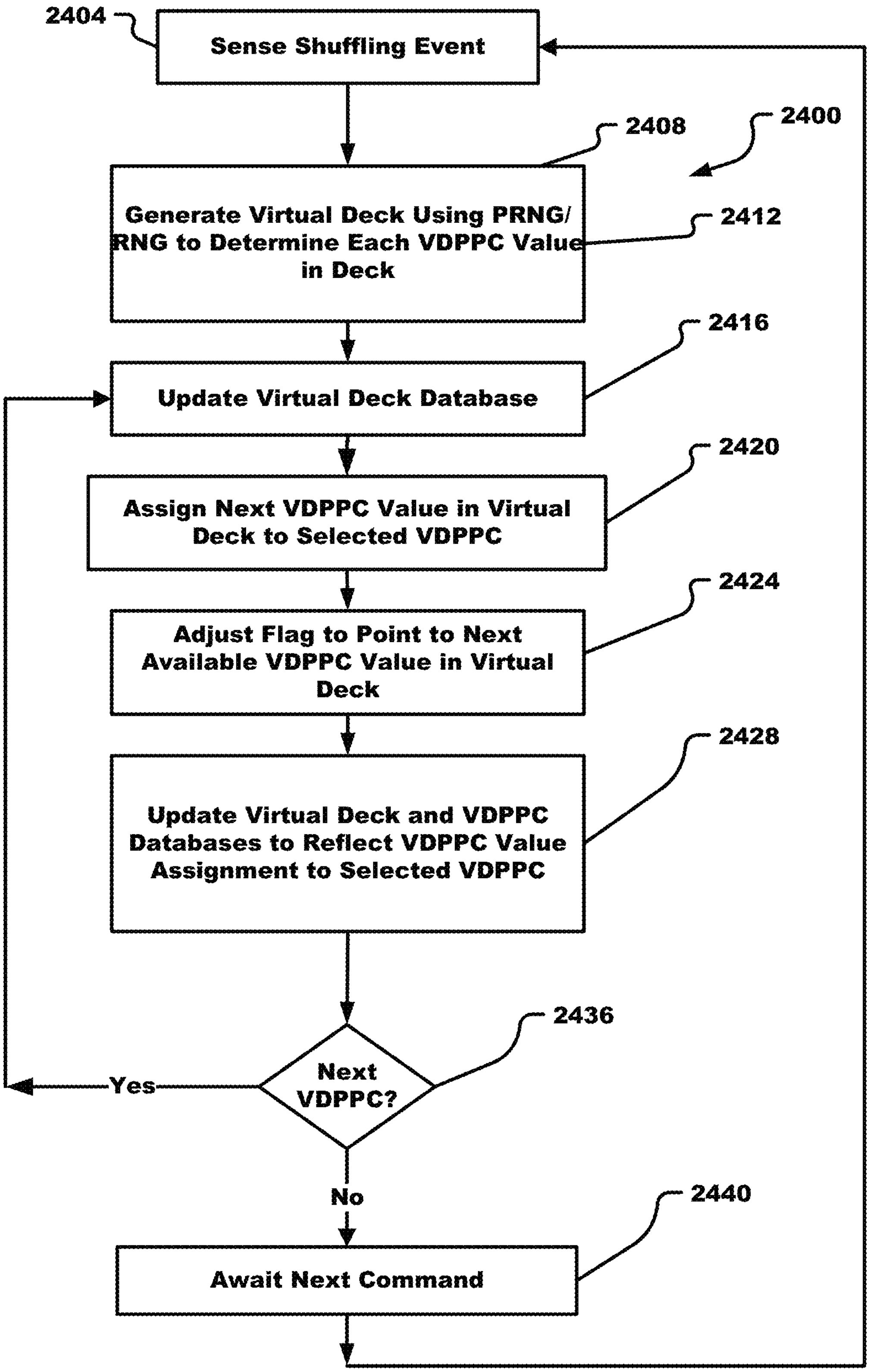
FIG. 24 is a flow chart of logic for shuffling a virtual deck in accordance with embodiments of the present disclosure.

In another embodiment, the assignment of a virtual card to a selected VDPPC can be done when the VDPPC is inserted into or removed from the digital shoe 350 or while the VDPPC is positioned within the digital shoe 350 (see FIGS. 21 and 24).

The method 2200 can continue by the selected VDPPC 100 or 150 receiving the playing card parameter(s) and, in response, refreshing the VDPPC digital display with the received playing card parameter(s) (step 2228) and optionally providing selected sensory feedback (step 2232 and operation 1432). The sensory feedback, for example, can be one or more of the processor 248 of a VDPPC 100 causing the VDPPC to emit selected sounds through a speaker, vibrate, display selected content on the first or second digital display simultaneous with or prior to display of the received playing card parameter(s).

The method 2200 can continue by the table gaming server 804 determining whether there is a next VDPPC (decision diamond 2236). If so, the table gaming server 804 can return to and repeat step 2216. If not, the table gaming server 804 can await the next command (step 2240).

Figure 17:
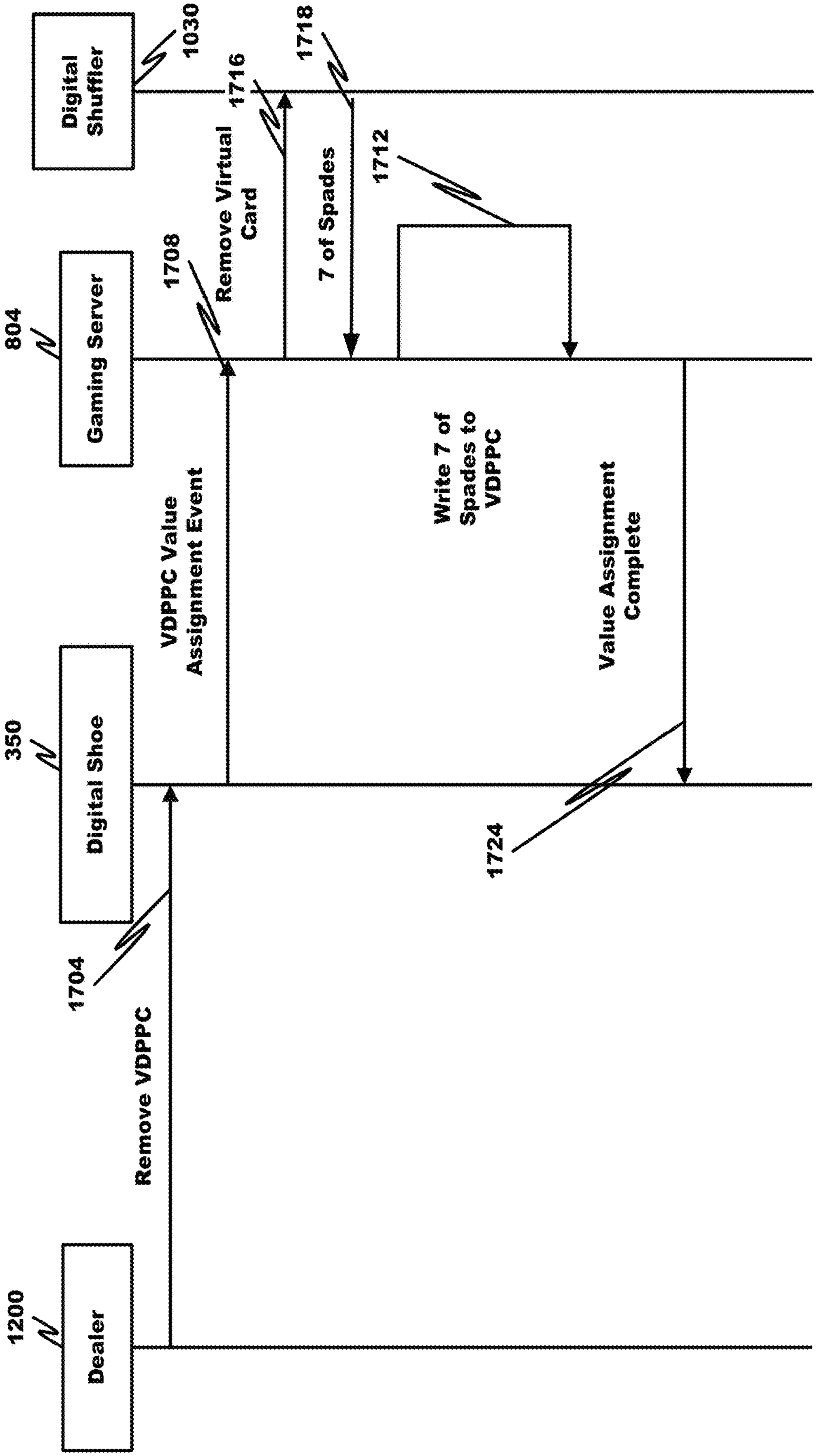
FIG. 17 depicts signal flows for VDPPC removal from a digital card shoe in accordance with embodiments of the present disclosure.
Figure 18:
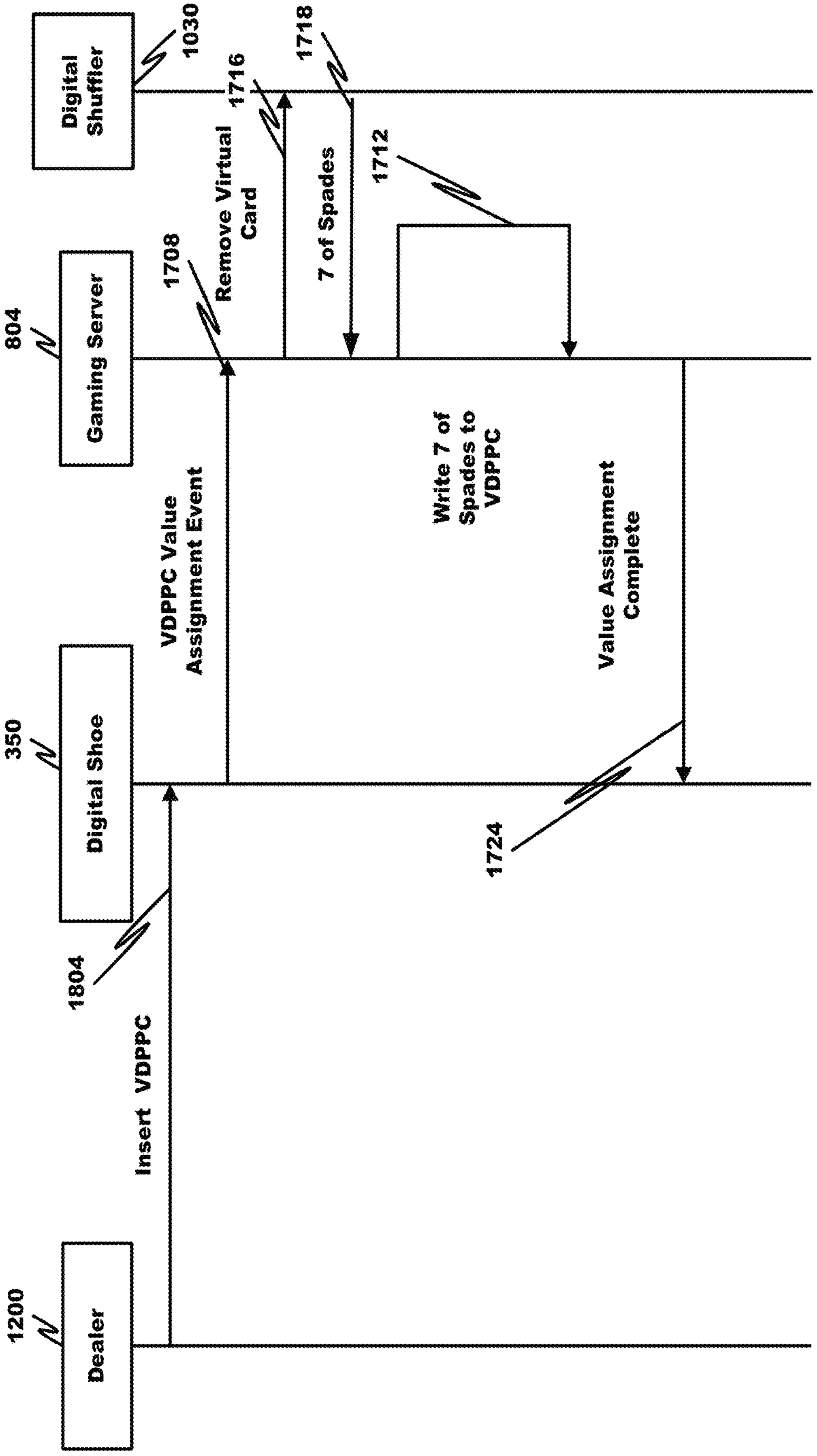
FIG. 18 depicts signal flows for VDPPC insertion into a digital card shoe in accordance with embodiments of the present disclosure.

With reference now to FIGS. 17, 18, and 21, various operations of a VDPPC 100 or 150, gaming device 312, table gaming server 804, central gaming server 316, digital shoe 350, and/or mobile device 328 will be described in accordance with at least some embodiments of the present disclosure.

The method 2100 begins when a dealer 1200 inserts a selected VDPPC 100 or 150 into the digital shoe 350 (operation 1804) or removes a selected VDPPC 100 or 150 from the digital shoe 350 (operation 1704) causing the digital shoe 350 to sense a VDPPC value assignment event (step 2104). As will be appreciated, during a card game players 324 discard and fold VDPPCs and VDPPCs are collected at the conclusion of the card game. The cards are collected by the dealer and inserted into the digital shoe 350.

The method 2100 can continue by the table gaming server 804 or digital shoe 350 selecting a next virtual card as the new VDPPC value from the virtual deck and assigning the VDPPC value to the identifier of the selected VDPPC (operations 1716 and 1718 and steps 2108 and 2112). In the example of FIGS. 17-18, the virtual card assigned to the selected VDPPC has a set of playing card parameters equivalent to a 7 of spades, though any set of playing card parameters can be assigned depending on the application. The VDPPC management instructions 942 cause the processor in the gaming server 804 writes the newly assigned virtual card to the selected VDPPC (operation 1712) and notifies the digital shoe 350 that the value assignment operation is completed (operation 1724). The table gaming server 804 updates, for the removed virtual card, the associated VDPPC ID field 654 and status field 662 in the virtual deck database 336 and, for the selected VDPPC, the card parameter information field 764 to reflect the newly assigned virtual card.

In some embodiments, the selected VDPPC is selected based on the order in which the VDPPCs are arranged in the digital shoe. The ordering of the VDPPCs can be determined based on VDPPC's communication with each other through communication interfaces positioned on either side of each VDPPC and aligned with an adjacent communication interface on the next VDPPC in the VDPPC stack to determine their respective positions in the digital shoe, each VDPPC interconnecting with a port or other communication interface positioned in the digital shoe at each VDPPC position in the VDPPC stack that enables the digital shoe to inform each VDPPC of the queue position assigned to its corresponding VDPPC identifier, a short range wireless network within the digital shoe could be used to locate each VDPPC using known triangulation techniques or relative received signal strengths of location signals emitted by a signal emitter of the network to locate a position for each VDPPC in the stack, and the like. In some embodiments, the selected VDPPC is selected based on the ordering of VDPPC identifiers, which may cause the selected VDPPC to be positioned in the digital shoe in a different location than the prior embodiments. When positioned in the digital shoe, VDPPCs are typically not in sequential order based on VDPPC identifiers.

As will be appreciated, the digital shuffler 1030 can trigger a digital deck shuffling event if the virtual deck is empty or a randomly determined re-shuffle card is encountered. The reshuffling event is discussed with reference to FIG. 24.

The method 2300 can continue by the table gaming server 804 or digital shoe 350 selecting a next virtual card as the VDPPC value from the virtual deck (operation 1716 and step 1608).

The method can continue by performing steps 2016, 2020, 2024, 2032, 2036, and 2040 of FIG. 21 with respect to the selected VDPPC.

The method can return to step 2104 and await a next sensed VDPPC value assignment event.

With reference now to FIGS. 6 and 24, various operations of a table gaming server 804, central gaming server 316, digital shoe 350, and/or mobile device 328 will be described in accordance with at least some embodiments of the present disclosure.

The method 2400 begins when the central gaming server 316, digital shoe 350, and/or mobile device 328 sense a shuffling event (step 2402). The shuffling event can be based on any game event but typically is sensed when the first flag 608 is in a predetermined location relative to the second flag 612. The second flag 612 can represent a reshuffle card. In some embodiments, only the first flag 608 is employed and a deck shuffling event is detected when the first flag reaches a predetermined location in the virtual deck (e.g., at an end or last virtual card of the virtual deck).

The method can continue by the central gaming server 316 or gaming server 804 generating a virtual deck using the PRNG/RNG 1036 using a secure seed value. As noted, each virtual card in the virtual deck corresponds to a set of playing card parameters. As will be appreciated, the number of virtual cards in the virtual deck depends on a number of (physical) card decks desired for the type of card game to be played. For instance, for certain card games the virtual deck comprises a number of virtual cards equivalent to N>1 decks of physical cards and, like the number of decks, each unique set of card parameters (e.g., 7 of spades) only occurs in the virtual deck N times.

The method can continue in step 2416 by the central gaming server 316 or gaming server 804 updating the virtual card field 648, virtual deck position field 650, and status field 662 of the virtual deck database 336 to reflect each virtual card in the generated virtual deck.

The method can continue in step 2420 by the central gaming server 316 or gaming server 804 assigning a next virtual card (or VDPPC value) in the virtual deck to a selected VDPPC in response to occurrence of a value assignment event as described in FIG. 21.

The method can continue in step 2424 by the central gaming server 316 or gaming server 804 updating the virtual deck to indicate that the first flag 608 has advanced to a next virtual card following the queue or deck position of the assigned virtual card.

As discussed in FIG. 21, the central gaming server 316 or gaming server 804 updates the VDPPC and virtual card databases 332 and 336 to reflect the virtual card assignment to the selected VDPPC (step 2428).

The method can continue in decision diamond 2436 to determine if a next VDPPC is the subject of a value assignment event. If so, the central gaming server 316 or gaming server 804 returns to step 2416 and, if not, proceeds to step 2440 in which the central gaming server 316 or gaming server 804 awaits a next command.

Figure 15:
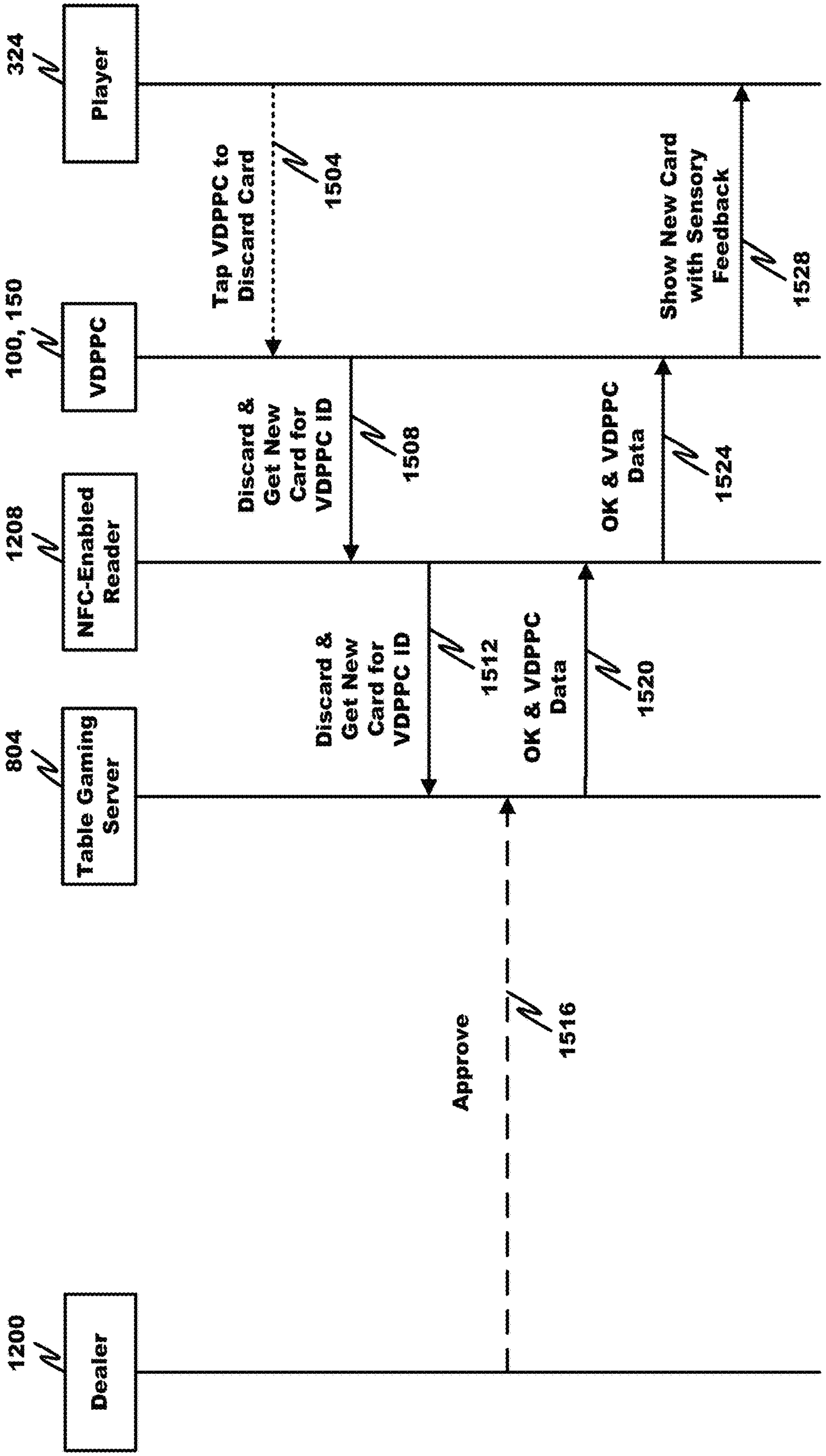
FIG. 15 depicts signal flows for VDPPC discard in accordance with embodiments of the present disclosure.
Figure 23:
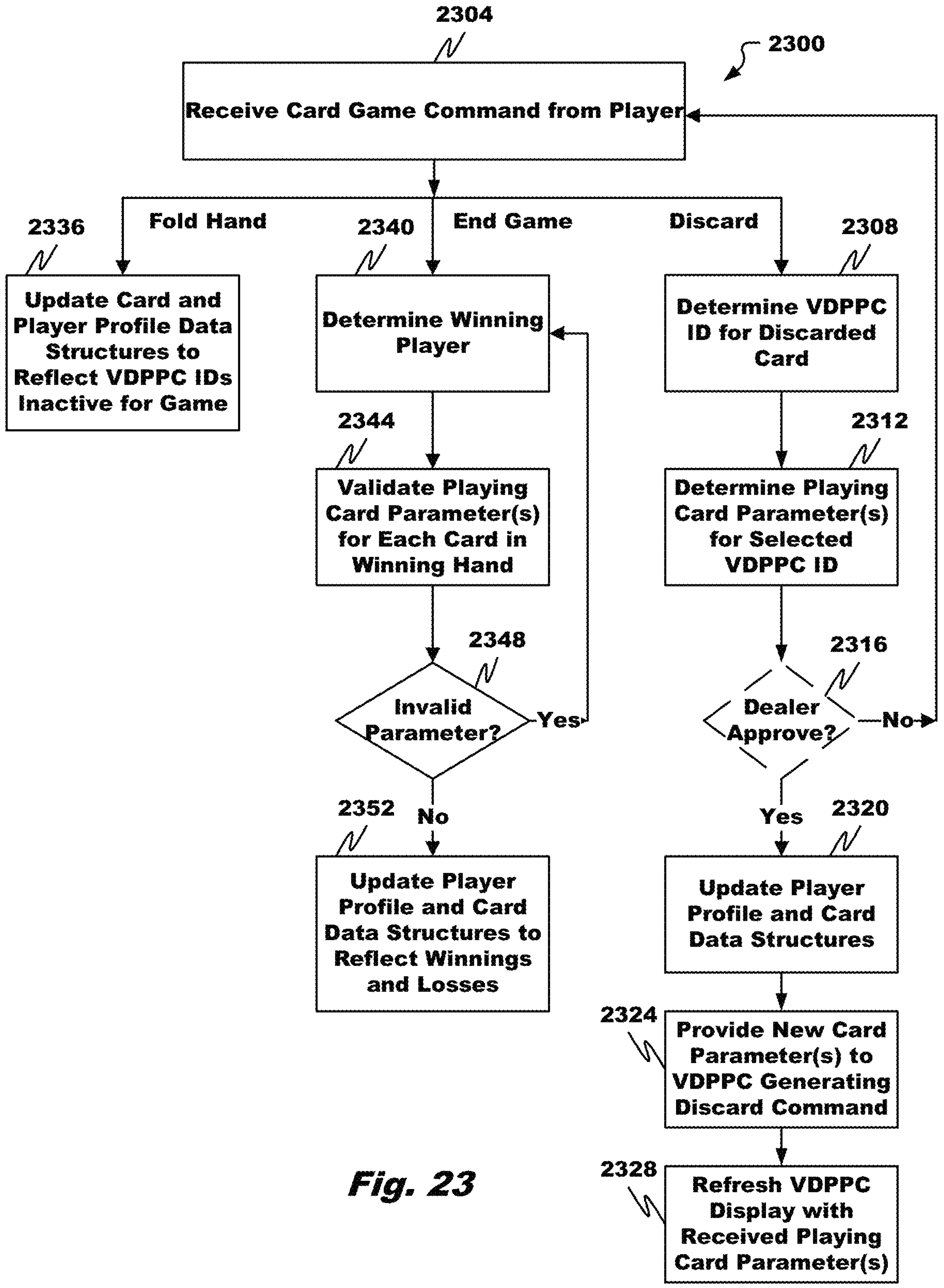
FIG. 23 is a flow chart illustrating VDPPC game play logic in accordance with embodiments of the present disclosure.

With reference now to FIGS. 15 and 23, various operations of a VDPPC 100 or 150, gaming device 312, table gaming server 504, central gaming server 316, digital shoe 350, and/or mobile device 328 will be described in accordance with at least some embodiments of the present disclosure.

The method 2300 begins when a table gaming server 804 or central gaming server 316 receives a card command from a player 324 or dealer 1200 (step 2304). As players 324 play at the table, the gaming system 300 needs to control the issued VDPPCs 100 or 150 to participating players 324 as part of a game. In one embodiment, especially when the VDPPCs 100 or 150 are powered by their own power source, a wireless communications channel would be constantly established between a communications device of the table and the VDPPCs 100 or 150 held by each player 324. The communications channel can be established at any time, such as in steps 1932 (FIG. 19) or 2040 (FIG. 20).

The method 2300 can continue by performing different operations depending on the received card command, namely discard, fold hand, or end game.

When the received card command is to discard, the method 2300 can continue by determining the VDPPC ID 100 or 150 for the discarded card (step 2308). In many card games, players can hold certain cards and request replacements of one or more cards. In one embodiment shown in FIG. 15, the player 324 can tap 1504 the first or second digital display on the VDPPC 100 or 150 he or she wishes to discard. This would send a first message 1508 over a wireless communications channel between the VDPPC 100 or 150 and the NFC-enabled reader 1208 and a second message 1512 from the reader 1208 to the table gaming server 804 to discard and get a new card for the selected VDPPC 100 or 150. These messages can include information identifying the playing card parameter(s) on the VDPPC that is/are being discarded or reference the serial number (or other VDPPC ID) of the VDPPC that is being discarded.

When the table gaming server 804 receives the second message 1512, the method 2300 can continue by the table gaming server 804 determining the new playing card parameter(s) for the selected VDPPC ID (step 2312). In some embodiments, the table gaming server 804 first validates that the VDPPC 100 or 150 being discarded is owned by the VDPPC 100 or 150 requesting the discard action, validate that the VDPPC 100 or 150 is active for the table and may also validate if the VDPPC 100 or 150 is assigned to a player 324.

The method 2300 can continue by the table gaming server 804, prior to providing the new playing card parameters requesting that the dealer 1200 approve the discard (decision diamond 2316). When the dealer fails to approve the discard, the method can continue by returning to step 2300 and awaiting a next card game command. Upon successful VDPPC validation and dealer approval, the table gaming server 804 can continue by generating or drawing the next card or set of playing card parameters in the virtual deck for issuance to the player's selected VDPPC 100 or 150 and updating the player profile, virtual deck, and VDPPC data structures in the databases 226, 336, and 332, respectively, to reflect the determined one or more playing card parameters and the status change of the discarded virtual card (step 2320).

The method 2300 can continue by the table gaming server 804 providing, via the secure session, the determined one or more playing card parameters to the selected VDPPC 100 or 150 (step 2324 and VDPPC data signals 1520 and 1524).

The method 2300 can continue by the selected VDPPC 100 or 150 receiving the playing card parameter(s) and, in response, refreshing the VDPPC digital display with the received playing card parameter(s) (step 2328) and optionally providing selected sensory feedback based on sensed context (step 2332 and operation 1528).

In some embodiments, the dealer receives the discarded VDPPC and deals a new VDPPC from the digital shoe 350 to the player. In this case, the newly dealt VDPPC commonly does not provide selected sensory feedback. A card game according to such embodiments, resembles a conventional card game in which cards are dealt from a card shoe or electromechanical shuffler.

When the received card command is to fold a hand, the method 2300 can continue by updating the player profile, virtual deck, and VDPPC data structures in the databases 226, 336, and 332, respectively, to reflect the VDPPC IDs of the VDPPCs and/or associated virtual cards assigned to the player folding the hand and therefore inactive for the remainder of the game (step 2336). A player 324 may fold during the process of the game. If this occurs, the player 324 can press or tap a physical button or digital button on one or more of his or her VDPPCs 100 or 150 to fold for the current hand in the game. Alternatively, they can tap one or more of his or her VDPPCs 100 or 150 on the NFC-enabled reader 1208 or an antenna 854 or at a seating location (or player station or marked player location) assigned to the player or an assigned or shared charge and data pad 862 or 858 comprising a wireless radio for the table. This process helps the table gaming server 804 determine and track a current state of the game. Alternatively, the dealer 1200 could be responsible for recording in the table gaming server 804 operated by the dealer 1200 or at the central gaming server 316 as one or more players 324 fold during the game.

When the table gaming server 804 receives an end game command (step 2300), the method 2300 can continue by the table gaming server 804 determining a winning player in the game (step 2340). At the end of a hand in a typical card game, for instance, the winning player 324 needs to be determined. Once the betting has completed on the table, the dealer 1200 can interact with the table gaming server 804, such as by issuing an end game command, to complete the current game. At this point, remaining players 324 in the card game may place their hidden cards face up on the table for other players 324 to view the displayed playing card parameters on the second digital display of the VDPPCs.

The method 2300 can continue by the table gaming server 804 requesting that the dealer 1200, prior to determining or displaying the winnings of each player 324, validating the displayed playing card parameter(s) on the second digital display of each VDPPC 100 or 150 in the hand of each remaining player or only in the hand of each of the winning players (step 2344). This is typically done by the table gaming server 804 determining, for the VDPPC ID of each such VDPPC, the virtual card or playing card parameter values stored in the card parameter information field 764 in the playing card database 332 and/or in the virtual deck position field 650 in the virtual deck database 336, displaying the determined card parameter values on a display of a dealer's graphical user interface for viewing by the dealer 1200, and receiving confirmation by the dealer's graphical user interface that the VDPPC and graphical user interface displayed playing card parameters match. This validation is repeated VDPPC by VDPPC until each winning hand is validated. In some embodiments, the table gaming server 804 determines, based on the playing card parameters stored for each player in the playing profile and VDPPC databases 336 and 332, which of the hands of the remaining players 324 is a winning hand, or entitled to winnings from the game, and identifies the winning players 324 having winning hands via the dealer's graphical user interface. The foregoing validation process is thereafter initiated by the dealer 1200.

If there is a mismatch in playing card parameters between the displayed values, or an invalid playing card parameter displayed by a selected VDPPC in the winning hand, detected by the dealer 1200, it is likely that the respective player 324 has somehow manipulated one or more VDPPCs at the table, or one or more VDPPCs are malfunctioning (decision diamond 2348). In response, the table gaming server 804 returns to step 2340.

When the validation of the playing card parameters in the winning is successful, the central gaming server 316 updates the data structures in the playing profile and VDPPC databases 336 and 332 to reflect the winnings and losses from the game (step 2352) and in the virtual deck database 336 to reflect that the outstanding virtual cards have been played in a completed card game and are now inactive.

Figure 16:
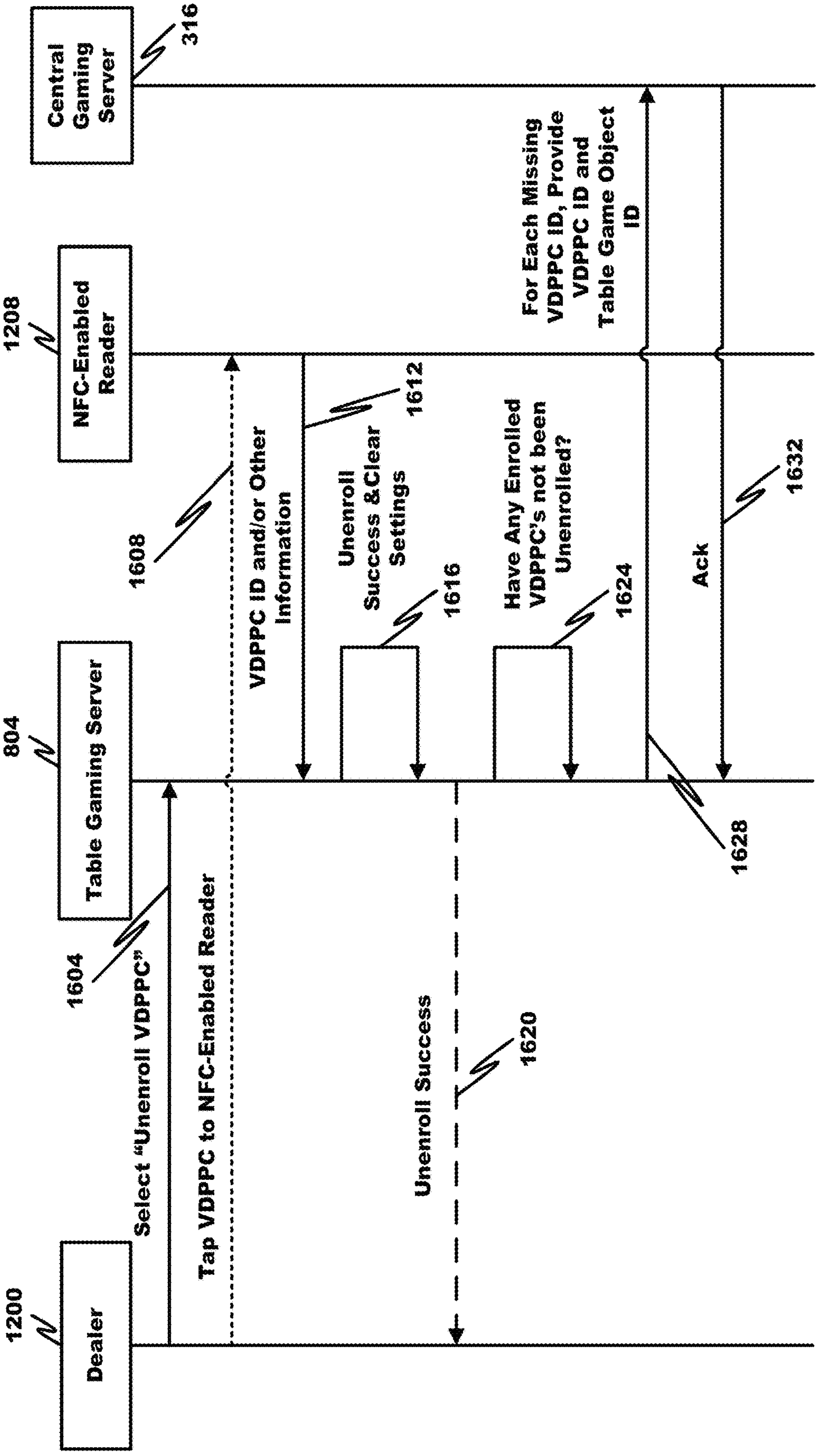
FIG. 16 depicts signal flows for VDPPC unenrollment in accordance with embodiments of the present disclosure.
Figure 25:
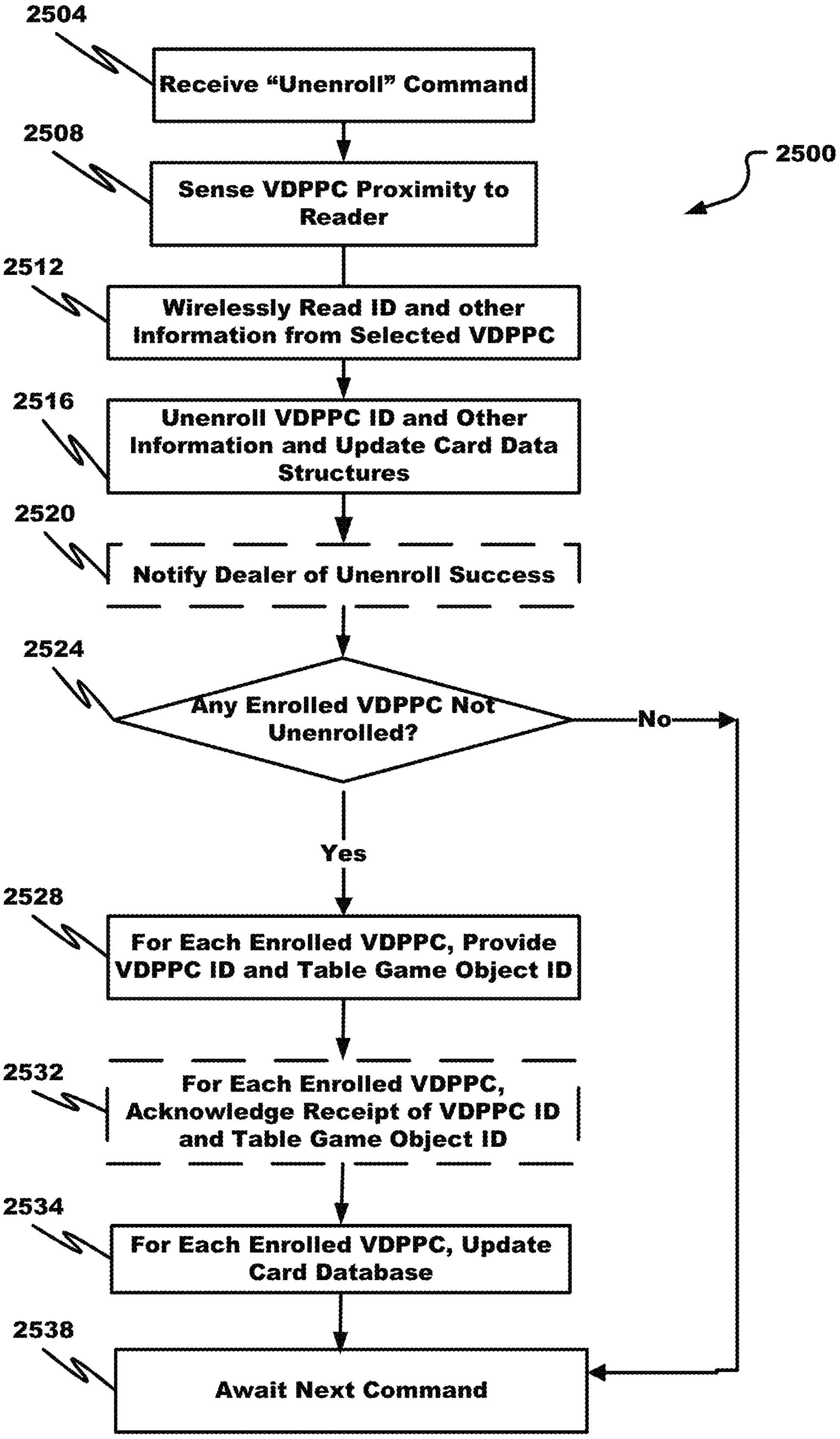
FIG. 25 is a flow chart illustrating VDPPC unenrollment logic in accordance with embodiments of the present disclosure.

With reference now to FIGS. 16 and 25, various operations of a VDPPC 100 or 150, gaming device 312, table gaming server 504, central gaming server 316, digital shoe 350, and/or mobile device 328 will be described in accordance with at least some embodiments of the present disclosure.

The method 2500 begins when a table gaming server 804 receives a "unenroll VDPPC" command 1604 from a dealer 1200 (step 2504). At the end of the shift, for example the dealer 1200 may close the table. During the table close process, the dealer may have to account for the table VDPPC inventory. While the method 2500 depicts a process similar to that used during table enrollment, it is to be understood that other processes may be employed.

The method 2500 can continue by the NFC-enabled reader 1208 proximally sensing a selected VDPPC 100 or 150 (step 2508) and wirelessly reading the VDPPC ID and other information 1612 from the selected VDPPC 100 or 150 (step 2512). For example, the dealer may have to tap 1608 the NFC-enabled reader 1208 (or other wireless radio) with each VDPPC 100 or 150 in the table VDPPC inventory to un-enroll each VDPPC 100 or 150.

The method 2500 can continue by the table or central gaming server unenrolling the VDPPC ID and other information of the selected VDPPC 100 or 150 and updating the assigned VDPPC IDs field 724, associated table game object IDs field 744, assigned player ID field 746, enrollment information field 752, and other data structures in the playing profile and VDPPC databases 336 and 332 to reflect that the corresponding VDPPC 100 or 150 is currently not enrolled by a dealer or table or associated with a player. This operation 1616 can further erase from the VDPPC memory 244 of the VDPPC information 290. For example, the process of unenrolling a VDPPC may also clear out any security information held in memory by the VDPPC, such as connection information, or any security keys negotiated during initial enrollment.

The method 2500 can continue by the table gaming server 804 notifying the dealer 1200 of enroll success for the selected VDPPC 100 or 150 (step 2520 and signal 1620).

At the conclusion of VDPPC unenrollment of the VDPPCs assigned to the dealer's table, the method 2500 can continue by the table or central gaming server determining whether any enrolled VDPPC has not yet been unenrolled (decision diamond 2524 and operation 1624). For example if a VDPPC is not tapped on the NFC-enabled reader 1208 during the process of closing the table, then the dealer 1200 will be forced to mark one or more VDPPCs 100 or 150 associated with a table game object ID corresponding to the table or dealer as missing.

When one or more VDPPCs remain enrolled, the method 2500 can continue by the table gaming server 804 providing by signal 1628 to the central gaming server 316 the corresponding VDPPC ID and table game object ID (step 2528), and, for each enrolled VDPPC, acknowledging by the central gaming server 316 receipt by signal 1632 of the VDPPC ID and table game object ID (optional step 2532).

The method 2500 can continue by the central gaming server 316, for each enrolled VDPPC, updating the assigned VDPPC IDs field 724, associated table game object IDs field 744, assigned player ID field 746, enrollment information field 752, and other data structures in the playing profile and VDPPC databases 336 and 332 to reflect that the VDPPC is missing so that the missing VDPPC(s) can be tracked and possibly prevented from being used at another table (step 2534).

The method 2500 can continue by the table gaming server 804 awaiting a next command (step 2538).

It should be appreciated that the enhanced physical player interaction provided by the present disclosure, in addition to being implemented in a gaming device configured to be located on a casino floor, can be implemented in one or more personal gaming devices, such as desktop computers, laptop computers, tablet computers or computing devices, personal digital assistants, mobile phones, and other mobile computing devices.

In some embodiments, casino table game systems are leveraged to track operational activities of the gaming tables at a casino (opening and closing of tables, funds given to dealers/tables, etc.) and to track player activity at table games so they can earn loyalty rewards for their table game play. The digital shoe 350 may communicate with the table gaming server 804 or other table-level computing device that is connected with the table gaming server 804. The table gaming server 804 or table-level computing device could be informed by the digital shoe, or by the VDPPCs themselves, of the cards dealt to specific players during the course of a table game and player actions during the game related to the cards they have been dealt. This information can then be used by the resident table system to track the skill of the player, which can later be used by the table game system to adjust the loyalty reward earn rate for specific players. For example, a highly skilled table game player may earn less loyalty rewards than a lesser skilled table game player.

In certain embodiments, VDPPCs may have security features. One security feature can help protect a player from revealing the current value of their cards inadvertently. For example, the VDPPC can have sensors that inform the VDPPC about its orientation (face up, or face down), etc. In one embodiment, when the card is face down, the value of the VDPPC can be displayed, but if the VDPPC is face up, then the value of the VDPPC could be hidden or not displayed. During a card game, some cards may actually be required to be face up, such as dealer cards, or community cards. The behavior of the VDPPC with regards to this feature can be determined based upon how the VDPPC is removed from the digital shoe or stack, or where the VDPPC is placed on the table. In one embodiment, the dealer can hit a button on the digital shoe when they remove a VDPPC that is meant for the dealer or as a community card in which event content displayed by one or more of the VDPPC's digital displays can be different from other VDPPCs representing non-community cards or display parameters of one or more of the VDPPC's digital displays can be different from other VDPPCs representing non-community cards. In another embodiment, the behavior of the VDPPC can be changed based upon whether the VDPPC detects whether the VDPPC has been placed in range of an NFC field that represents the community card area of the table. In another embodiment, the table gaming server can inform the digital shoe or VDPPC about the current state of the table game in order for the VDPPC to know if the VDPPC is a community card or a card dealt to a specific player. In another embodiment, the VDPPC may have one or more cameras to detect the area of the table where it is placed, or communicate with another device that has a larger view of the table game as a whole to determine where on the table the VDPPC is placed in order for the VDPPC to adjust its behavior based upon the type of card it is (player-dealt card or community card, etc.).

In some embodiments, a VDPPC can contain a button or user interface to change part of the state, or all of the state of one or more surfaces of the VDPPC to offer player's tips or guidance about the game they are playing. For example, the player could press a physical button, or virtual button on the VDPPC to display the rules of the current game. In another embodiment, the player could activate a change of state of the VDPPC to display information about the player's current hand (although this would require each VDPPC to be aware of the value assigned to adjacent VDPPCs). The tips or guidance display can be closed or eliminated based upon expiration of a timer, or upon detection that the card has been flipped over.

In some embodiments, VDPPCs can display information or custom screens related to the player who has been assigned a card. When a VDPPC is dealt to a player, the cards can be placed in an electronic field associated with each seat and which is tied to a player, and the VDPPC can then display information that is specific to that player, such as: a custom card back representing the rank or the player, a value or indicator on how the player is playing at the table over their current session or stay at the casino, etc.

In some embodiments, If VDPPCs have a persistent connection to the computer of the table, then they can display information or feedback about other players at the table. In one embodiment, the VDPPC can display odds information for every player at the table based upon communications with the computer tracking what cards have been given to each player at the table.

A number of variations and modifications of the disclosure can be used. It would be possible to provide for some features of the disclosure without providing others.

For example in one alternative embodiment, a digital shoe is not required to perform the various operations and methods discussed herein. A designated location on the casino table game, such as the central charging pad 858, can exist where the dealer stacks all of the collected VDPPCs between games. The stacking of a determined number of VDPPCs at the designated location can trigger a digital deck shuffling event and/or a VDPPC value assignment event.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

As will be appreciated by one skilled in the art, aspects of the present disclosure may be illustrated and described herein in any of a number of patentable classes or circumstances including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the disclosure of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

What is claimed is:

1. A system comprising:

a communication interface;

a microprocessor coupled with the communication interface; and a non-transitory computer-readable storage medium coupled with the microprocessor, the non-transitory computer-readable storage medium storing data thereon that enables the microprocessor to:

identify a shuffle event based on one or more of a position of a next eligible virtual card in a first plurality of virtual playing cards, a relative position in the first plurality of virtual cards of a shuffle card to the position of the next eligible virtual card, a counter value indicating a number of ineligible virtual cards, and a counter value indicating a number of remaining eligible virtual cards;

in response to identifying a shuffle event, generate, by a pseudorandom or random number generator and based on a secure seed value, a second plurality of virtual playing cards, each virtual card in the second plurality of virtual playing cards corresponding to a different set of playing card parameters;

update the non-transitory computer-readable storage medium to reflect the different sets of playing card parameters assigned to the second plurality of virtual playing cards;

identify a value assignment event;

in response to identifying the value assignment event, assign a respective set of playing card parameters for each virtual playing card of the second plurality of virtual playing cards to a corresponding one of a plurality of physical playing cards, each physical playing card comprising an on-board power source, microprocessor, memory, digital display;

update the non-transitory computer-readable storage medium to reflect the assignment of each respective set of playing card parameters to a corresponding identifier associated with each physical playing card; and transmit, by the communication interface, each assigned respective set of playing card parameters to a communication address associated with the corresponding identifier of a selected physical playing card to enable the digital display of the selected physical playing card to render the assigned respective set of playing card parameters.

2. The system of claim 1, wherein each set of playing card parameters comprises a rank and suit, and wherein a number of the second plurality of virtual playing cards is greater than a number of the plurality of physical playing cards.

3. The system of claim 1, wherein the second plurality of virtual playing cards corresponds to multiple decks of virtual playing cards and wherein the microprocessor is operable to:

receive a physical playing card from a player of one or more players and/or player locations;

assign a next virtual playing card of the second plurality of virtual playing cards to the received physical playing card; and update a previously stored set of playing card parameters of the received physical playing card to the set of playing card parameters of the next virtual playing card.

4. The system of claim 3, wherein the second plurality of virtual playing cards comprises a reshuffle virtual card and, when the reshuffle virtual card is a next virtual playing card to be assigned to the next virtual playing card, the microprocessor reshuffles the second plurality of virtual playing cards and assigns each physical playing card to one or more players and/or player locations in a gameplay session.

5. The system of claim 3, wherein the microprocessor assigns the next virtual playing card of the second plurality of virtual playing cards to the received physical playing card when the received physical playing card is inserted into or removed from a card shoe, the card shoe comprising a charging and data coil to recharge the on-board power source and exchange data with the microprocessor of the physical playing card.

6. The system of claim 1, wherein the microprocessor assigns each virtual playing card of the second plurality of virtual playing cards to a corresponding one of a plurality of physical playing cards when the plurality of physical playing cards are in a card shoe.

7. The system of claim 1, wherein one or more players and/or player locations in a gameplay session comprises one or more player locations and wherein the microprocessor tracks a spatial location of each of the physical playing cards and, when a tracked physical playing card is moved to a different player location, disables or changes a value of the tracked physical playing card.

8. The system of claim 1, wherein a card shoe counts a number of physical playing cards in the card shoe and, when a threshold number of physical playing cards is located in the card shoe, the microprocessor reshuffles the second plurality of virtual playing cards and assigns selected virtual playing cards of the reshuffled second plurality of virtual playing cards to corresponding ones of the plurality of physical playing cards.

9. A method, comprising:

identifying a shuffle event based on one or more of a position of a next eligible virtual card in a plurality of virtual playing cards, a position in the plurality of virtual playing cards of a shuffle card relative to the position of the next eligible virtual card, a counter value indicating a number of ineligible virtual cards, and a counter value indicating a number of remaining eligible virtual cards;

in response to identifying a shuffle event, generating, by a pseudorandom or random number generator and based on a secure seed value, a different set of playing card parameters, for each of the plurality of virtual playing cards to form a shuffled plurality of virtual playing cards;

updating a non-transitory computer-readable storage medium to reflect the different sets of playing card parameters assigned to the plurality of virtual playing cards;

assigning selected virtual playing cards of the shuffled plurality of virtual playing cards to a corresponding one of a plurality of physical playing cards, each physical playing card comprising an on-board power source, microprocessor, memory, and digital display;

updating the non-transitory computer-readable storage medium to reflect the assignment of each selected virtual playing card of the shuffled plurality of virtual playing cards to a corresponding identifier associated with each physical playing card; and transmitting, for each virtual playing card in the shuffled plurality of virtual playing cards, a respective set of playing card parameters to a communication address associated with the corresponding identifier of a physical playing card to enable the digital display of the physical playing card to render the transmitted respective set of playing card parameters.

10. The method of claim 9, wherein each set of playing card parameters comprises a rank and suit and wherein a number of the shuffled plurality of virtual playing cards is greater than a number of the corresponding physical playing cards.

11. The method of claim 9, wherein the shuffled plurality of virtual playing cards corresponds to multiple decks of virtual playing cards and further comprising:

receiving a physical playing card from a player of one or more players and/or player locations;

assigning a next virtual playing card of the shuffled plurality of virtual playing cards to the received physical playing card; and updating a previously stored set of playing card parameters of the received physical playing card to the set of playing card parameters of the next virtual playing card.

12. The method of claim 11, wherein the shuffled plurality of virtual playing cards comprises a reshuffle virtual card and further comprising:

when the reshuffle virtual card is a next virtual playing card to be assigned to the next virtual playing card, randomly and/or pseudo randomly reshuffling the shuffled plurality of virtual playing cards; and assigning each of the physical playing cards to one or more players and/or player locations in a gameplay session.

13. The method of claim 11, wherein the assigning the next virtual playing card comprises:

assigning the next virtual playing card of the shuffled plurality of virtual playing cards to the received physical playing card when the received physical playing card is inserted into or removed from a card shoe, the card shoe comprising a charging and data coil to recharge the on-board power source and exchange data with the microprocessor of the physical playing card.

14. The method of claim 9, wherein the assigning of the selected virtual playing cards of the shuffled plurality of virtual playing cards to a corresponding one of a plurality of physical playing cards occurs when the plurality of physical playing cards are in a card shoe.

15. The method of claim 9, wherein one or more players and/or player locations in a gameplay session comprises one or more player locations and further comprising:

tracking a spatial location of each of the physical playing cards; and when a tracked physical playing card is moved to a different player location, disabling or changing a value of the tracked physical playing card.

16. The method of claim 9, wherein a card shoe counts a number of physical playing cards in the card shoe and further comprising:

when a threshold number of physical playing cards is located in the card shoe, reshuffling the shuffled plurality of virtual playing cards and assigning selected virtual playing cards of the reshuffled plurality of virtual playing cards to corresponding ones of the plurality of physical playing cards.

17. A card shoe comprising:

a housing to hold a plurality of physical playing cards for dealing to players of a card game, the housing having an input to receive and an output to discharge the plurality of physical playing cards, each physical playing card of the plurality of physical playing cards comprising an on-board power source, microprocessor, memory, and digital display to receive and render a value of an assigned virtual playing card;

a communication interface to send and receive communications;

a physical playing card sensor to detect that a selected physical playing card has been one or more of inserted into the input and removed from the output;

a microprocessor coupled with the communication interface and the physical playing card sensor; and a non-transitory computer-readable storage medium coupled with the microprocessor, the non-transitory computer-readable storage medium comprising microprocessor-executable instructions that, when executed by the microprocessor, cause the microprocessor to:

receive input from the physical playing card sensor that the selected physical playing card has been one or more of inserted into the input and removed from the output;

determine, via data in a communication received from the selected physical playing card, an identifier of the selected physical playing card;

transmit, by a communication, data comprising the identifier to a gaming server;

determine, via data received in a communication from the gaming server, a set of playing card parameters in a virtual playing card of a plurality of virtual playing cards assigned to the selected physical playing card; and provide by a communication data comprising the set of playing card parameters to the selected physical playing card.

18. The card shoe of claim 17, wherein the set of playing card parameters of the assigned virtual playing card comprises a rank and suit, wherein a number of the plurality of virtual playing cards is greater than a number of a plurality of physical playing cards to be received by the card shoe, wherein the plurality of virtual playing cards corresponds to multiple decks of virtual playing cards and wherein the microprocessor is operable to:

receive a physical playing card from a player;

assign a next virtual playing card of the plurality of virtual playing cards to the received physical playing card; and update a previously stored value of the received physical playing card to the value of the next virtual playing card.

19. The card shoe of claim 17, wherein the microprocessor assigns the virtual playing card to the physical playing card in response to detecting that the physical playing card has been inserted into the input and further comprising a wireless charger to wirelessly charge the physical playing card when positioned in the housing and wherein the communications comprise wireless signals and the communication interface comprises:

an antenna to send and receive encoded wireless signals;

a demodulator to demodulate received wireless signals;

a decoder to decode R and determine received data in each of the demodulated received wireless signals;

an encoder to encode data; and a modulator to modulated encoded data for transmission by the antenna.

20. The card shoe of claim 17, wherein the microprocessor assigns the virtual playing card to the physical playing card in response to detecting that the physical playing card has been removed from the output and wherein the card shoe counts a number of physical playing cards in the card shoe and, when a threshold number of physical playing cards is located in the card shoe, the microprocessor causes a random and/or pseudo random reshuffling of the plurality of virtual playing cards and assigns selected virtual playing cards of the plurality of virtual playing cards to corresponding ones of the plurality of physical playing cards.

* * * * *